(12) United States Patent
Oshihara et al.

(10) Patent No.: US 8,846,271 B2
(45) Date of Patent: Sep. 30, 2014

(54) ELECTRODE MATERIAL

(75) Inventors: Kenzo Oshihara, Yokohama (JP); Katsuo Suga, Yokohama (JP); Masahiro Kishida, Fukuoka (JP); Sakae Takenaka, Fukuoka (JP)

(73) Assignees: Nissan Motor Co., Ltd., Yokohama-shi (JP); Kyushu University, National University Corporation, Fukuoka-shi (JP)

( * ) Notice: Subject to any disclaimer, the term of this patent is extended or adjusted under 35 U.S.C. 154(b) by 691 days.

(21) Appl. No.: 12/302,158

(22) PCT Filed: May 25, 2007

(86) PCT No.: PCT/JP2007/060737
§ 371 (c)(1),
(2), (4) Date: Nov. 24, 2008

(87) PCT Pub. No.: WO2007/139038
PCT Pub. Date: Dec. 6, 2007

(65) Prior Publication Data
US 2009/0291352 A1 Nov. 26, 2009

(30) Foreign Application Priority Data

May 25, 2006 (JP) .................. 2006-145929
May 24, 2007 (JP) .................. 2007-138371

(51) Int. Cl.
*H01M 4/02* (2006.01)
*H01M 4/92* (2006.01)
*H01M 4/88* (2006.01)
*H01M 8/10* (2006.01)

(52) U.S. Cl.
CPC ............. *H01M 4/8807* (2013.01); *H01M 4/92* (2013.01); *H01M 2008/1095* (2013.01); *H01M 4/8842* (2013.01); *H01M 4/926* (2013.01); *Y02E 60/50* (2013.01); *H01M 4/8817* (2013.01)

USPC ........................................... 429/523; 429/524

(58) Field of Classification Search
USPC ............................................................ 429/524
See application file for complete search history.

(56) References Cited

U.S. PATENT DOCUMENTS

| | | | |
|---|---|---|---|
| 2004/0072061 A1* | 4/2004 | Nakano et al. ................. | 429/44 |
| 2005/0238947 A1* | 10/2005 | Cho .............................. | 429/40 |
| 2006/0099485 A1* | 5/2006 | Yamaguchi et al. ........... | 429/42 |
| 2006/0172179 A1* | 8/2006 | Gu et al. ....................... | 429/44 |
| 2009/0098441 A1 | 4/2009 | Suga | |

FOREIGN PATENT DOCUMENTS

| | | |
|---|---|---|
| EP | 1 887 642 A1 | 2/2008 |
| GB | 2 394 597 A | 4/2004 |
| JP | 6-235083 A | 8/1994 |
| JP | 2000-268828 A | 9/2000 |
| JP | 2004-172098 A | 6/2004 |
| JP | 2005-222812 A | 8/2005 |
| JP | 2006-086037 A | 3/2006 |
| WO | WO 2005/106994 A1 | 11/2005 |
| WO | WO 2006/019128 A1 | 2/2006 |
| WO | WO 2006/126349 A1 | 11/2006 |

OTHER PUBLICATIONS

Japanese Office Action and English Language Translation dated Sep. 11, 2012 (6 pages).
Japanese Office Action and English Language Translation dated Dec. 4, 2012 (5 pages).

* cited by examiner

*Primary Examiner* — Ula C Ruddock
*Assistant Examiner* — Jacob Marks
(74) *Attorney, Agent, or Firm* — Foley & Lardner LLP

(57) ABSTRACT

An electrode material, including: catalyst particles formed by performing inclusion, by a porous inorganic material, for a conductive support and metal particles arranged on the conductive support and/or metal particles brought into contact with the conductive support.

17 Claims, 22 Drawing Sheets

Pt-SUPPORTED AMOUNT : 4.2wt%(XRF)
Ni-SUPPORTED AMOUNT : 0.2wt%(XRF)

NP-1

Pt-SUPPORTED AMOUNT : 1.0wt%(XRF)
Ni-SUPPORTED AMOUNT : 1.3wt%(XRF)

NP-2

Pt-SUPPORTED AMOUNT : 1.9wt%(XRF)
Ni-SUPPORTED AMOUNT : 13.3wt%(XRF)

Pt-SUPPORTED AMOUNT : 4.0wt%(XRF)
Ni-SUPPORTED AMOUNT : 2.0wt%(XRF)

NP-5

Pt-SUPPORTED AMOUNT : 0.6wt%(XRF)
Ni-SUPPORTED AMOUNT : 6.3wt%(XRF)

SILICA-COAT Ni-Pt PARTICLES,
NP-2 ; CARBON FORMATION METHOD,
$C_2H_4$ DECOMPOSITION AT 700°C FOR 30 MIN.

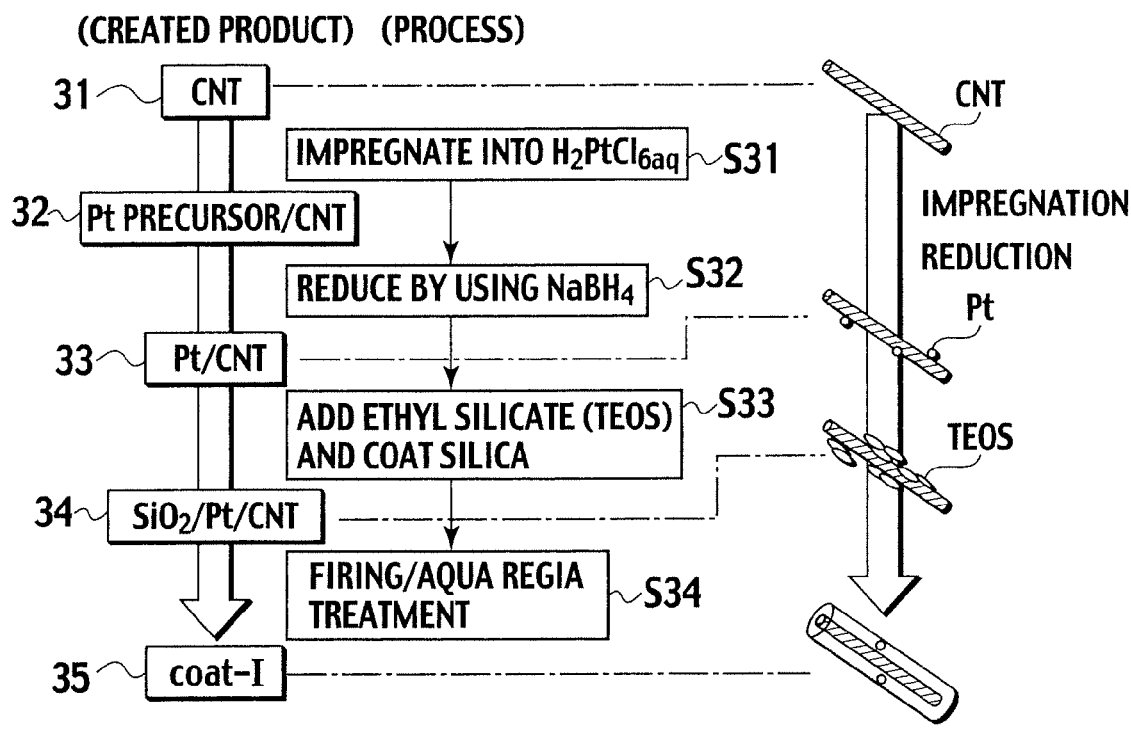
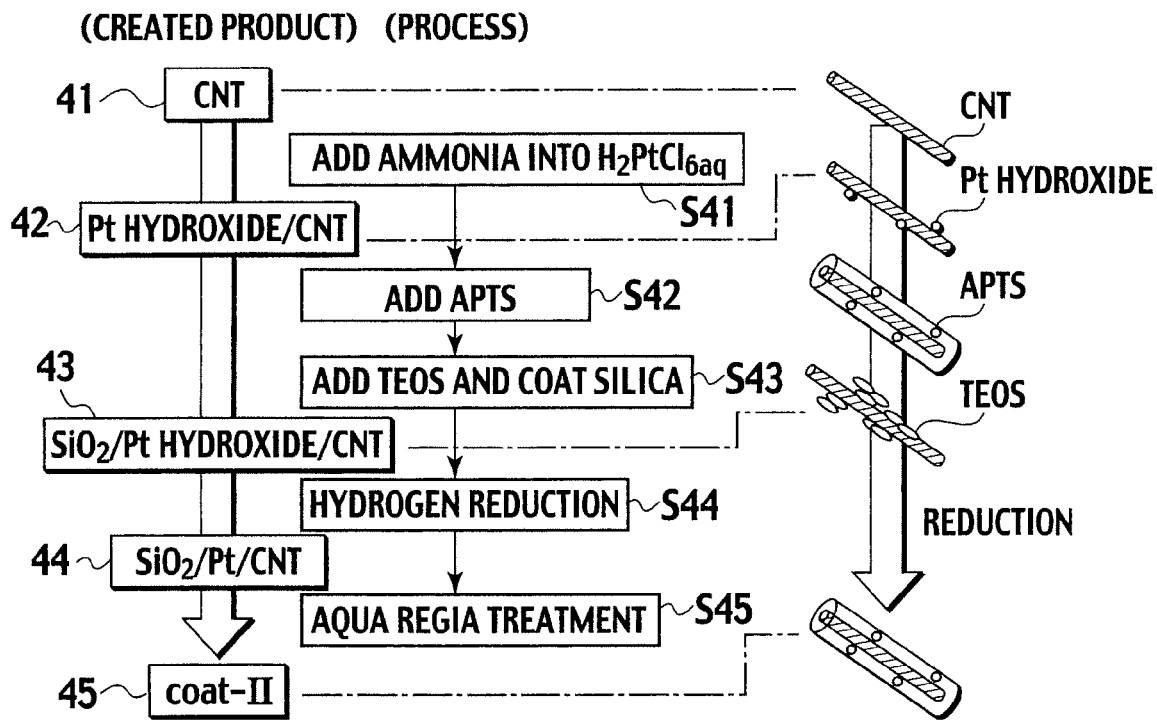

ELECTRODE MATERIAL

TECHNICAL FIELD

The present invention relates to an electrode material for a fuel cell, a variety of sensors, and the like and to a production method thereof, as well as to an electrode formed of the electrode material produced by the production method of the electrode material and to a fuel cell composed by including the electrode.

BACKGROUND ART

A fuel cell generates power by supplying fuel to one of electrodes and supplying an oxidizer to the other electrode. In Patent Document 1, there is proposed a fuel cell, in which a catalyst layer is formed on one surface of at least one of the electrodes, the catalyst layer is a mixture of catalyst particles and other inorganic matter (silica) particles, and molecules which contain ion-conductive functional groups functioning as an electrolyte are chemically bonded to surfaces of at least one of the catalyst particles, the silica particles and a porous membrane.

In accordance with the fuel cell thus composed, at least one of the electrodes includes the thin-film electrolyte, the catalyst and such an electron-conductive substance, thus making it possible to reduce elution of the electrolyte in the catalyst layer, and to reduce a decrease of a voltage, which is caused following the elution.
Patent Document 1: Japanese Patent Laid-Open Publication No. 2004-172098

DISCLOSURE OF THE INVENTION

However, in accordance with the fuel cell described in Patent Document 1, since the catalyst layer is one composed by simply mixing the catalyst metal (Pt) particles and the other inorganic matter (silica) particles with each other, surfaces of the catalyst metal (Pt) particles in the catalyst layer are exposed except portions in contact with adjacent particles. Therefore, the catalyst metal (Pt) particles are eluted as metal (Pt) ions into the electrolyte membrane, and thereby lose active sites, and accordingly, there is a possibility that a performance decrease of the fuel cell may be brought up.

In this connection, the present invention has been made in order to solve the above-described problem, and it is an object of the present invention to provide an electrode material capable of preventing the elution of the metal particles and suppressing the performance decrease of the fuel cell, the sensors and the like, to provide an electrode formed of the electrode material, and to provide a fuel cell including the electrode.

Specifically, in the present invention, the above-described object is achieved by an electrode material characterized by including: catalyst particles formed by performing inclusion, by a porous inorganic material, for a conductive support and metal particles arranged on the conductive support.

BRIEF DESCRIPTION OF THE DRAWINGS

FIG. 11 is a diagram showing process table and chart of a brief concept of preparation of catalyst particles of Example 1 of the present invention.

FIG. 12 is a diagram showing process table and chart of a brief concept of preparation of catalyst particles of Example 2 of the present invention.

BEST MODE FOR CARRYING OUT THE INVENTION

An electrode material according to the present invention is one characterized by including: catalyst particles formed by performing inclusion, by a porous inorganic material, for conductive supports and metal (noble metal) particles arranged on the conductive supports. This is because it becomes difficult to ensure electron conductivity when the inclusion of the metal particles (Pt particles and the like) is performed simply by the porous inorganic material ($SiO_2$ and the like) in the case of performing the inclusion by the porous inorganic material in order to prevent elution of the metal (noble metal) particles. The metal particles (Pt particles and the like) are supported (arranged) on the conductive supports, and the inclusion is performed while putting the metal particles (Pt particles and the like) into centers of the conductive supports, thus making it possible to ensure such electron conduction while suppressing movement of such metal (Pt and the like).

Note that the electrode material of the present invention is one that differs depending on a usage purpose thereof, and just needs to be decided as appropriate in response to the usage purpose. Specifically, the electrode material of the present invention is not limited only to use for a fuel cell, and is widely usable for electrodes of a variety of electrochemical cells of the fuel cell, various sensors and the like. A description will be made below of the electrode material of the present invention while taking as an example the case of using the electrode material as an electrode material for the fuel cell; however, the usage purpose of the electrode material of the present invention is not limited at all by this. In the case of using the electrode material of the present invention as the electrode material for the fuel cell, the electrode material is one that mainly contains an electrolyte (also referred to as a binder or an ionomer) having proton conductivity, as well as the above-described catalyst particles. A description will be made below for each of these constituent materials.

(1) Catalyst Particle

Each of the catalyst particles is one formed by performing the inclusion, by the porous inorganic material, for the conductive support and the metal particles arranged on the conductive support. A description will be made below of the preset invention by using the drawings.

Figure 1A:
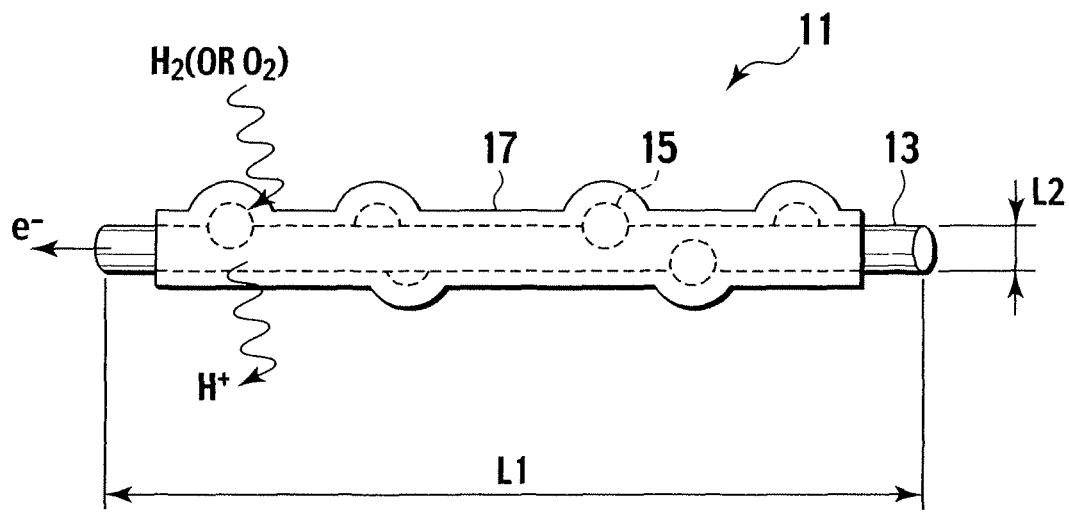
FIG. 1A is a schematic view showing a typical configuration serving as an embodiment (defined as a first embodiment) of a catalyst particle of an electrode material for a fuel cell according to the present invention.
Figure 1B:
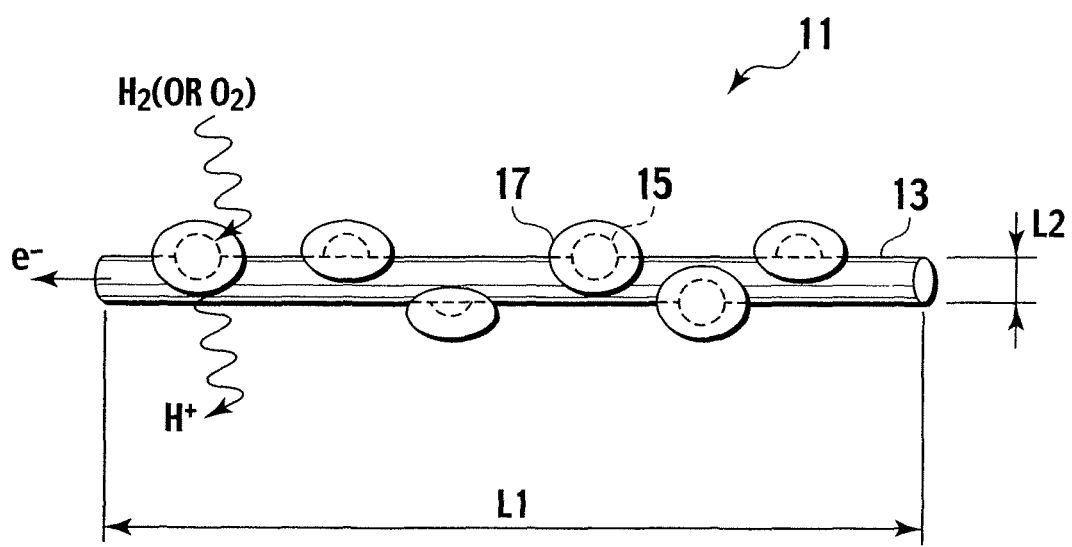
FIG. 1B is a schematic view showing another typical configuration serving as the embodiment (defined as the first embodiment) of the catalyst particle of the electrode material for the fuel cell according to the present invention.

FIG. 1A is a schematic view showing a typical configuration serving as an embodiment (defined as a first embodiment) of the catalyst particle of the electrode material for the fuel cell according to the present invention, and FIG. 1B is a schematic view showing another typical configuration serving as the embodiment (defined as the first embodiment) of the catalyst particle of the electrode material for the fuel cell according to the present invention. FIG. 2 is a schematic view showing a configuration serving as another embodiment (defined as a second embodiment) of the catalyst particle of the electrode material for the fuel cell according to the present invention.

As shown in FIGS. 1 and 2, a catalyst particle 11 that composes the electrode material for the fuel cell according to the present invention is formed by performing the inclusion, by a porous inorganic material 17, for a conductive support 13 and metal particles 15 of Pt and the like, which have catalytic activity and are arranged on the conductive support 13. In accordance with an electrode material for a fuel cell, which includes the catalyst particle 11 as described above, the metal particles 15 are subjected to the inclusion by the porous inorganic material 17. Accordingly, the metal particles 15 of Pt and the like, which have the catalytic activity, can be prevented from being eluted into an electrolyte membrane (not shown), and a performance decrease of the fuel cell, which is caused following the elusion of the metal particles into the electrolyte membrane, can be suppressed. A description will be made below for each of constituent members of the catalyst particle.

(i) Metal Particle 15

Here, metal particles for use in a cathode catalyst layer are not particularly limited as long as the metal particles are those having a catalytic function for a reduction reaction of oxygen, and a publicly known catalyst is usable in a similar way. Moreover, metal particles for use in an anode catalyst layer are not particularly limited, either, as long as the metal particles are those having a catalytic function for an oxidation reaction of hydrogen, and a publicly known catalyst is usable in a similar way. Specifically, such metals of the particles are selected from metals such as platinum, gold, iridium, rhodium, palladium, tungsten, lead, iron, nickel, manganese, vanadium, molybdenum, gallium, aluminum and lithium, alloys of these, and the like. Particles containing at least platinum among them are preferably used in order to enhance the catalytic activity, and to enhance poisoning resistance and heat resistance against carbon monoxide and the like. With regard to a composition of such an alloy as described above, though depending on a type of the metal to be alloyed with platinum, platinum is recommended to occupy 30 to 90 atom %, and the metal to be alloyed therewith is recommended to occupy 10 to 70 atom %. A composition of the alloy in the case of using the alloy for the cathode catalyst layer differs depending on the type of the metal to be alloyed with platinum, and on some other conditions, and can be selected as appropriate; however, it is preferable that platinum occupy 30 to 90 atom % and that the other metal to be alloyed with platinum occupy 10 to 70 atom %. Note that, in general, the alloy is a generic name of those having metallic property, in each of which one type or more of metal elements or base metal elements are added to a metal element. As constitutions of the alloy, there are: an eutectic alloy as a so-called mixture in which component elements become separate crystals; one in which the component elements are completely solved together to become a solid solution; one in which the component elements form an intermetallic compound or a compound of metal and nonmetal; and the like, and in this application, any of these is adoptable. In this case, the metal particles for use in the cathode catalyst layer and the metal particles for use in the anode catalyst layer can be appropriately selected from those described above. In the following description, unless otherwise specified, a definition in the description of the metal particles for the cathode catalyst layer and a definition in the description of the metal particles for the anode catalyst layer are similar therebetween, and the metal particles for both of the catalyst layers are referred to as "metal particles" in a collective manner. However, it is not necessary that the metal particles for the cathode catalyst layer and the metal particles for the anode catalyst layer be the same, and the metal particles for both of the catalyst layers are appropriately selected so as to exert desired functions as described above.

A shape and size of the above-described metal particles are not particularly limited, and a shape and a size, which are similar to those of the publicly known metal particles, can be used; however, it is preferable that the metal particles be particulate.

As an average particle diameter of the above-described metal particles is smaller, an effective electrode area where an electrochemical reaction progresses is increased, and accordingly, oxygen reduction activity of the metal particles is also enhanced. Therefore, the smaller average particle diameter is preferable. However, in actual, when the average particle diameter is too small, a phenomenon is observed that the oxygen reduction activity is decreased on the contrary. Hence, the average particle diameter of the metal particles is preferably 1 to 30 nm, more preferably 1.5 to 20 nm, still more preferably 2 to 10 nm, and particularly preferably 2 to 5 nm. From viewpoints of easiness in supporting the metal particles on the conductive support 13 in the first embodiment shown in FIG. 1A and FIG. 1B, or of easiness in performing the inclusion for the metal particles by the porous inorganic material ($SiO_2$ and the like) 17 in the second embodiment shown in FIG. 2, it is preferable that the average particle diameter be 1 nm or more, and from a viewpoint of a catalyst utilization ratio, it is preferable that the average particle diameter be 30 nm or less. Note that "the average particle diameter of the metal particles" in the present invention can be measured by an average value of crystallite diameters obtained by half widths of diffraction peaks of the metal particles in X-ray diffraction or by an average value of particle diameters of the metal particles, which are investigated by means of a transmission electron microscope.

Note that an average particle diameter of the metal particles in the case of supporting the metal particles on a surface of the conductive support subjected to affinity treatment just needs to be 1 to 30 nm; however, it is preferable that the metal particles be particulate with an average particle diameter of preferably 2 to 30 nm, more preferably 2.5 to 10 nm, and still more preferably 3 to 5 nm.

It is recommended that a supported amount of the above-described metal particles 15 be set at preferably 10 to 80 mass %, and more preferably 30 to 70 mass % with respect to a total amount of the catalyst particle 11. When the above-described supported amount is 80 mass % or less, there is an advantage in that excellent dispersivity of the metal particles 15 on the conductive support 13 can be effectively maintained, resulting in that an effect of enhancing power generation performance can be effectively exerted (particularly in the first embodiment). Moreover, when the supported amount of the above-described metal particles 15 is 10 mass % or more, the catalyst particle 11 is excellent in catalytic activity per unit mass, and can obtain desired power generation performance corresponding to the supported amount of the metal particles 15. Therefore, the catalyst particle 11 is excellent in that it is possible to relatively easily perform design of the supported amount, which is for the purpose of ensuring desired cell performance. Note that the supported amount of the metal particles can be investigated by inductively coupled plasma (ICP) emission spectroscopy.

(ii) Conductive Support 13

(1) As shown in FIG. 1A and FIG. 1B, the above-described conductive support may be one having a specific surface area for supporting the metal particles 15 thereon in a desired dispersed state, and as a current collector, having sufficient electron conductivity. Alternatively, (2) as shown in FIG. 2, as a current collector, each of the conductive supports 13 may be one having sufficient electron conductivity, in which the metal particle 15 is supported on at least an end portion.

Moreover, there are no particular limitations on a shape of the above-described conductive support, and the conductive support may have any of spherical, columnar and tubular shapes. Specifically, for example, there are mentioned: those with the spherical shape, such as carbon black, and carbon black subjected to high-temperature (graphitization) treatment; and those with the columnar and tubular shapes, such as a carbon nanotube, a carbon nanohorn and a carbon fibril structure. Moreover, such columnar and tubular conductive supports also include a form of a conductive support (300 nm) in which metal is filled into hollow $SiO_2$ with a hexagonal column shape, and the like. This is one that can be said to be a form of a catalyst particle. Specifically, it can be said that this is one composed into a form in which the metal (series of particles) introduced into an inside of the hollow of such a prism-like hollow $SiO_2$ composes a columnar and/or tubular conductive support, and in addition, also composes the metal particle (catalyst), and this metal particle is subjected to the inclusion by the prism-like hollow $SiO_2$ as the porous inorganic material. Besides this, the columnar conductive support includes other forms of a conductive oxide fiber and the like. Note that the above-described carbon black subjected to the high-temperature (graphitization) treatment stands for carbon black subjected to the high-temperature treatment and carbon black subjected to graphitization treatment. Specifically, the carbon black is graphitized by being treated at high temperature. It can also be said that it is necessary to treat the carbon black at the high temperature in order to graphitize the carbon black.

In the case of each of the above-described columnar and tubular conductive supports, it is desirable that a ratio (L1/L2) of a major-axis length (L1: refer to FIG. 1A, FIG. 1B and FIG. 2) of the conductive support and a minor-axis length (L2: refer to FIG. 1A, FIG. 1B and FIG. 2) thereof be double, preferably 2 to 50 times, and more preferably 5 to 20 times. If the ratio of the major-axis length and minor-axis length of each of the columnar and tubular conductive supports is double or more, then the catalyst particle 11 is excellent in that the electric conduction can be ensured by a small amount of inclusion particles (catalyst particles 11).

An average major-axis length (L1) of each of the columnar and tubular conductive supports is not particularly limited; however is desirably 10 nm or more. If the major-axis length (L1) of each of the above-described columnar and tubular conductive supports is 10 nm or more, then a length necessary for the electric conduction can be ensured by the small amount of inclusion particles (catalyst particles 11). Moreover, an upper limit value of the major-axis length (L1) of each of the columnar and tubular conductive supports is not particularly limited, and just needs to be appropriately decided in consideration for a length of a carbon nanotube (CNT) or the like suitable for each embodiment, at which it is easy to fabricate each of the columnar and tubular conductive supports, and for the length necessary for the electric conduction.

An average particle diameter of such a spherical conductive support as described above is not particular limited, and the existing average particle diameters are adoptable. However, it is desirable that the average particle diameter be within a range similar to that for the average major-axis length (L1) of each of the above-described columnar and tubular conductive supports, and it is desirable that the average particle diameter be 10 nm or more.

As a current collector, a material (raw material) of the conductive support just needs to be one having sufficient electron conductivity as described above. However, a carbonic material is preferably desirable since the carbonic material is stable in an acidic atmosphere, electric resistance thereof is low, and a length thereof is controllable. As the carbonic material concerned, specifically, for example, there can be mentioned carbon black, graphite, carbon black subjected to the high-temperature (graphitization) treatment, carbon nanotube, carbon nanohorn, carbon nanofiber, a carbon fibril structure, a carbonic porous material, and the like. As each of the columnar and tubular conductive supports, particularly suitable are the carbon nanotube, the carbon nanofiber, the carbon nanohorn and the carbon fibril structure since they are stable in the acidic atmosphere, electric resistances thereof are lower, and lengths thereof are easily controllable. In the case of the spherical conductive support, the carbon black and the carbon black subjected to the high-temperature (graphitization) treatment are suitable since electric resistances thereof are low and they are excellent in durability.

A BET specific surface area of the above-described conductive support just needs to be a specific surface area sufficient for supporting the metal particles in a highly dispersed state. In the case of the columnar and/or tubular conductive support, the BET specific surface area is recommended to be set at preferably 1 to 2000 $m^2/g$, and more preferably 50 to 1500 $m^2/g$. When the above-described specific surface area is 1 $m^2/g$ or more, the catalyst particle 11 is excellent in that the dispersivities of the metal particles and the polymer electrolyte on the columnar and/or tubular conductive support are enhanced, resulting in that sufficient power generation performance can be obtained. Meanwhile, when the specific surface area is 2000 m²/g or less, the catalyst particle 11 is excellent in that high effective utilization ratios of the metal particles and the polymer electrolyte can be effectively maintained. The above-described suitable range of the BET specific surface area is particularly effective in the first embodiment as an embodiment in which the metal particles 15 are supported in the highly dispersed state on the columnar and/or tubular conductive support 13.

Figure 2A:
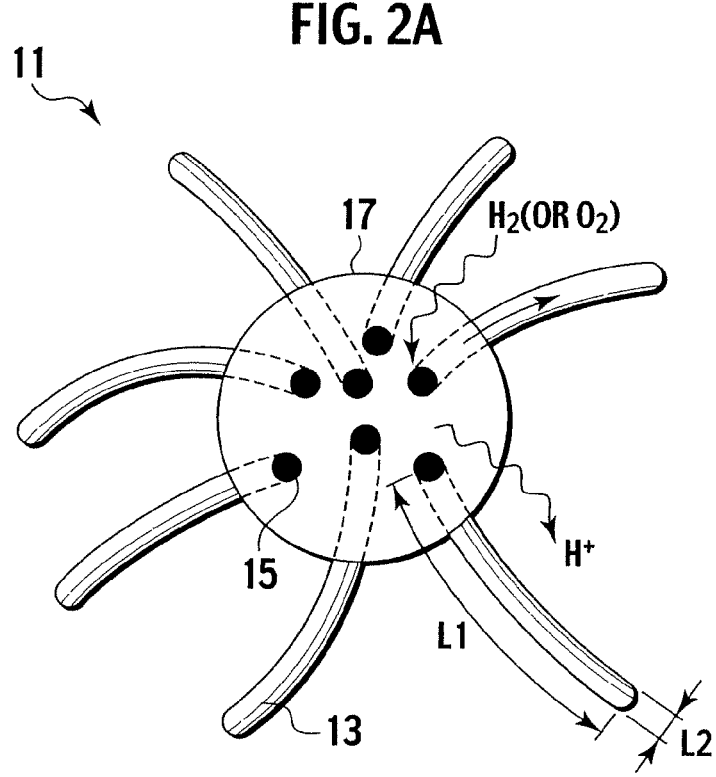
FIG. 2A is a schematic view showing a configuration serving as another embodiment of the catalyst particle of the electrode material for the fuel cell according to the present invention.

Meanwhile, in the second embodiment shown in FIG. 2A, by a production method thereof, a structure is formed, in which the metal particles 15 are arranged on one-side end portions of the columnar and/or tubular conductive supports 13 and vicinities thereof. Accordingly, the specific surface area sufficient for supporting the metal particles 15 in the highly dispersed state on the conductive supports 13 does not necessarily have to be ensured. Accordingly, the above-described suitable range of the BET specific surface area is not necessarily necessary. Note that, in the case of further combining the first embodiment with the above-described second embodiment, it can be said that it is desirable to set the above-described BET specific surface area within the suitable range.

Moreover, in each of the above-described conductive supports 13, it is desirable that at least the one-side end portion thereof not be subjected to the inclusion by the non-conductive porous inorganic material so that the conductive support 13 can be imparted with a function to ensure the electric conduction in a section from the catalyst metal particle 15 having the catalytic activity to an electrode current collector (not shown) in such a manner that a form having a major axis, such as the columnar shape and the tubular shape, is imparted to the conductive support 13 concerned (refer to FIG. 1A, FIG. 1B and FIG. 2A). In particular, in FIG. 1A, owing to a production method thereof, there is also such a case where the entirety of the conductive support 13 is subjected to the inclusion. In such a case, measures just need to be taken, in which the conductive support 13 is formed in advance so that the major-axis length thereof can be somewhat longer, and such a long conductive support is cut appropriately. In such a way, in the obtained conductive support, the portion (end surface) that is not subjected to the inclusion by the non-conductive porous inorganic material can be obtained on at least the end portion on the cut portion side.

Next, in the case of each of the spherical conductive supports, the BET specific surface area thereof is recommended to be set at preferably 5 to 2000 m²/g, and more preferably 50 to 1500 m²/g. When the above-described specific surface area is 5 m²/g or more, the catalyst particle 11 is excellent in that the dispersivities of the metal particles and the polymer electrolyte on the spherical conductive support are enhanced, resulting in that the sufficient power generation performance can be obtained. Meanwhile, when the specific surface area is 2000 m²/g or less, the catalyst particle 11 is excellent in that the high effective utilization ratios of the metal particles and the polymer electrolyte can be effectively maintained. The above-described suitable range of the BET specific surface area is particularly effective in the first embodiment as an embodiment in which the metal particles 15 are supported in the highly dispersed state on the spherical conductive support 13. Particularly preferably, the conductive support 13 is acetylene black, Vulcan, Ketjen Black and Black Pearl with a BET specific surface area of 50 to 2000 m²/g.

Figure 2B:
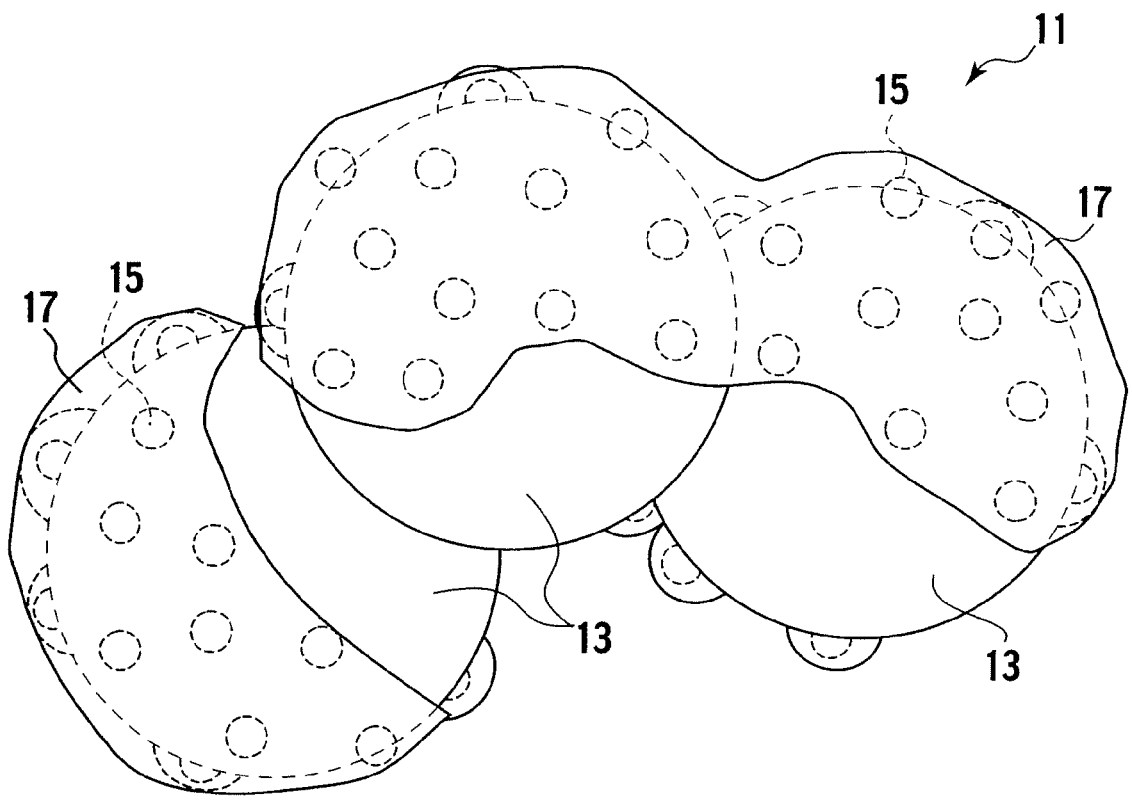
FIG. 2B is a schematic view showing a configuration serving as another embodiment of the catalyst particle of the electrode material for the fuel cell according to the present invention.

Meanwhile, in the second embodiment shown in FIG. 2B, by a production method thereof, a structure is formed, in which the metal particles 15 are arranged on a part of the surface of each of the spherical conductive supports 13. Accordingly, it is desirable that the specific surface area sufficient for supporting the metal particles 15 in the highly dispersed state on the spherical conductive support 13 be ensured. Accordingly, the above-described suitable range of the BET specific surface area is provided. Note that, in the case of further combining the first embodiment with the above-described second embodiment, it can be said that it is desirable to set the above-described BET specific surface area within the suitable range.

Moreover, in the carbon black subjected to the high-temperature (graphitization) treatment, which is one of the spherical conductive supports, it is desirable that an average interplanar spacing $d_{002}$ of a [002] plane, which is calculated from the X-ray diffraction, range from 0.343 to 0.358 nm, and that a BET specific surface area range from 100 to 300 m²/g.

Figure 1C:
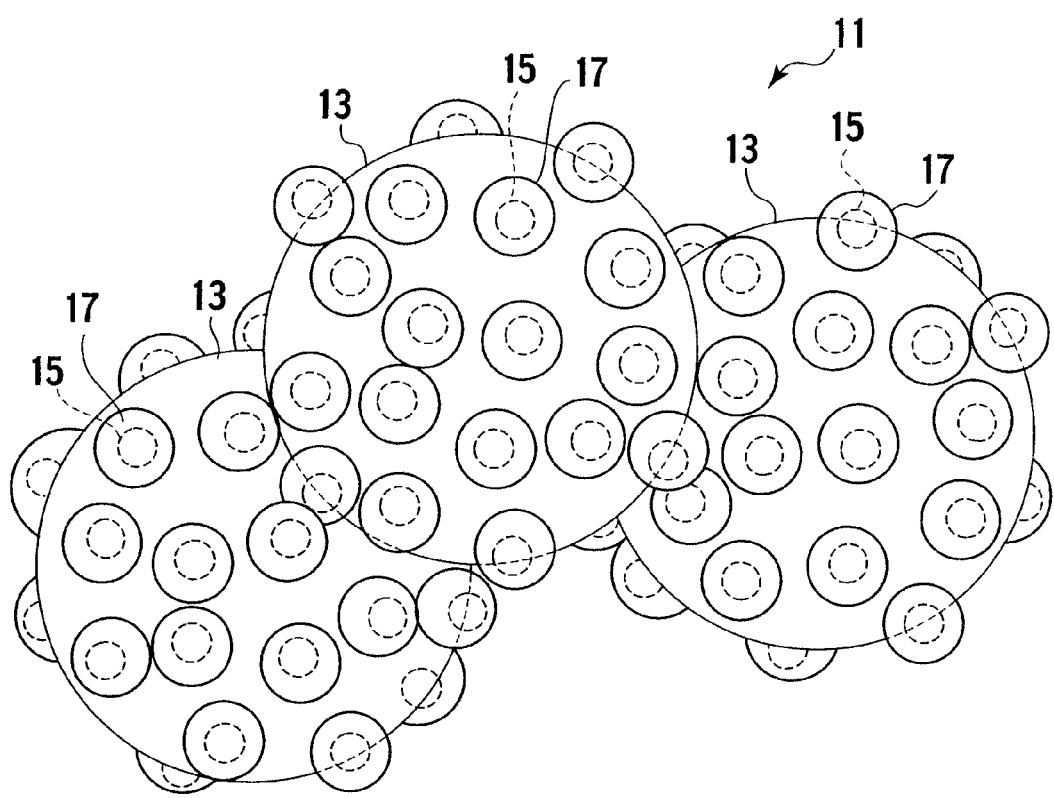
FIG. 1C is a schematic view showing a typical configuration serving as the embodiment (defined as the first embodiment) of the catalyst particle of the electrode material for the fuel cell according to the present invention.
Figure 1D:
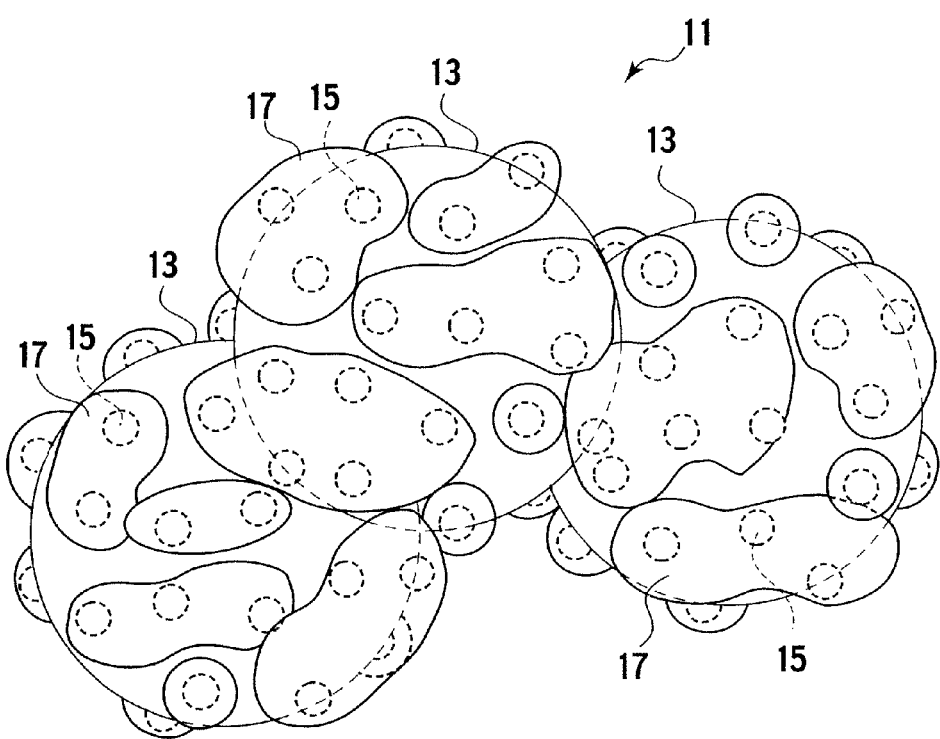
FIG. 1D is a schematic view showing another typical configuration serving as the embodiment (defined as the first embodiment) of the catalyst particle of the electrode material for the fuel cell according to the present invention.

Furthermore, in each of the above-described conductive supports 13, it is desirable that at least a part of the spherical conductive support 13 not be subjected to the inclusion by the non-conductive porous inorganic material so that the conductive support 13 can be imparted with a function to ensure the electric conduction in a section from the catalyst metal particle 15 having the catalytic activity to an electrode current collector (not shown) (refer to FIG. 1C, FIG. 1D and FIG. 2B). In particular, in FIG. 1C, owing to a production method thereof, there is also such a case where the entirety of the conductive support 13 is subjected to the inclusion. In such a case, measures just need to be taken, in which the conductive support is milled at the time of preparing catalyst ink, whereby the conductive support is cut appropriately. In such a way, in the obtained conductive support, the portion (end surface) can be obtained, in which at least a part of the surface is exposed, and which is not subjected to the inclusion by the non-conductive porous inorganic material.

(iii) Porous Inorganic Material 17

The porous inorganic material is one composed by forming the catalyst particle 11 by performing the inclusion for the above-described conductive support 13 and the metal particles 15 arranged on the conductive support 13.

A material of the above-described porous inorganic material may be any as long as it maintains contact between the metal particles having the catalytic activity and the conductive support, can prevent the elution of the metal particles, and is stable and is not eluted in the case of being used for the electrode of the fuel cell. Specifically, $SiO_2$, $ZrO_2$, $TiO_2$ and the like are mentioned as such porous inorganic materials capable of performing the inclusion for the conductive support 13 and the metal particles 15. This is because a porous structure is achieved by using such a relatively inexpensive material as these $SiO_2$, $ZrO_2$ and $TiO_2$. Preferably, one is desirable, which is composed by containing at least one or more components of $SiO_2$, $ZrO_2$ and $TiO_2$. Here, the reason why the porous inorganic material is composed by containing at least one or more components of $SiO_2$, $ZrO_2$ and $TiO_2$ is that there are also included, for example, a case where the porous inorganic material is composed by complexing two or more of the components like $TiO_2$—$SiO_2$ (titania-silica composite oxide), a case where the porous inorganic material is composed by simply mixing $TiO_2$ and $SiO_2$ with each other, a case where $TiO_2$ and $SiO_2$ are used separately (for example, such a case of using $TiO_2$ as the porous inorganic material 17 of the first embodiment and using $SiO_2$ as the porous inorganic material 17 of the second embodiment in such case where the first and second embodiments are combined with each other), and the like. Here, as the case where $TiO_2$ and $SiO_2$ are used separately, for example, there is mentioned such a case of using $TiO_2$ as the porous inorganic material 17 of the first embodiment and using $SiO_2$ as the porous inorganic material 17 of the second embodiment. However, a composition of the porous inorganic material 17 is not particularly limited to these. For example, such a case is also mentioned, where the catalyst particles 11 using $TiO_2$ as the porous inorganic material 17 and the catalyst particles 11 using $TiO_2$ as the porous inorganic material 17 are appropriately mixed with each other.

In the case where two or more of the porous inorganic materials are contained as described above, a blend ratio thereof is not particularly limited, either.

Note that the above-described suitable porous inorganic material may be any as long as it contains one or more of the components of $SiO_2$, $ZrO_2$ and $TiO_2$, and it is needless to say that appropriate amounts of other components than these may be blended thereto. Also in this case, it is required that the porous inorganic material be processable into a porous material, be capable of maintaining the contact between the metal particles and the conductive support, and be capable of preventing the elution of the particles of the metal such as Pt. Accordingly, it can be said that any component may be blended as long as it can effectively exert such desired characteristics described above. Such a component as capable of imparting the electron conductivity to the inorganic material concerned is particularly effective.

It is desirable that a pore diameter of the above-described porous inorganic material be preferably 1 to 5 nm, and more preferably 2 to 3 nm. This is because, if the pore diameter of the porous inorganic material is within the above-described range, then the diffusion of the gas and the elution prevention of the particles of the metal such as Pt can be made compatible with each other. This is because a too large pore diameter is not desirable in order to prevent the elution of the particles of the metal such as Pt though a pore diameter with a fixed size is necessary for a gas flow passage.

However, this is a condition for the pore diameter in the inside of the porous inorganic material, which is in charge of a function to prevent the elution of the metal particles, and a pore diameter of an outer layer portion of the porous inorganic material, which is located outside of the metal particles when viewed therefrom and is not in charge of the function to prevent the elution of the metal particles, may be larger. Specifically, if an average pore diameter of the pore diameters including those of the above-described inside of the porous inorganic material is within a range from 1 to 100 nm, then, as shown in FIG. 1A, FIG. 1B, FIG. 1C and FIG. 1D, the gas ($H_2$ and $O_2$) from the outside can be substantially diffused (transmitted) to the surfaces of the metal particles by the diffusion, $H^+$ (protons) generated by the catalytic function on the surfaces of the metal catalysts can be conducted as ions through the electrolyte in the vicinity of the catalyst particles, and the elution of the metal particles can be prevented.

Moreover, in the case of performing (1') the step of performing the affinity treatment for the surface of the conductive support in a first preparation method to be described later, contact between the conductive support and the porous inorganic material ($SiO_2$ and the like) becomes good (refer mainly to FIG. 18). Hence, in the catalyst particles obtained by the production method as described above, even if the thickness of the porous inorganic material ($SiO_2$ and the like) is thin, sufficient diffusion of the gas and the elution prevention of the particles of the metal such as Pt can be made compatible with each other, and in addition, good power generation performance can be obtained (refer to embodiments to be described later).

Figure 10:
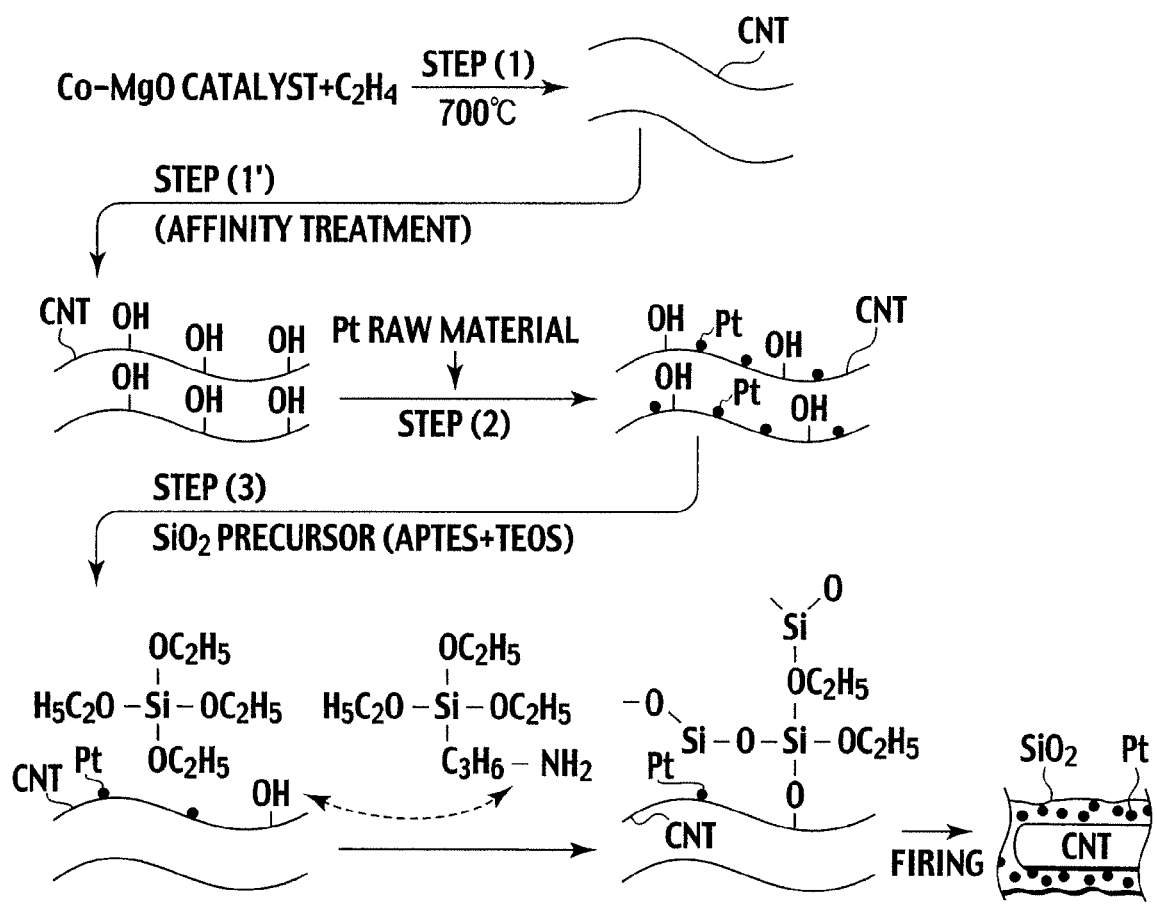
FIG. 10 is a schematic process view schematically showing a specific example of the first preparation method including the step (1') of performing the affinity treatment (surface treatment by hot mixed acid (oxidizing strong acid)) for the surface of the conductive support (CNT).
Figure 18:
FIG. 18 shows a drawing of catalyst particles, in which Pt particles supported on the CNTs and the CNTs supporting the Pt particles thereon are subjected to the inclusion by $SiO_2$, the catalyst particles being obtained by performing the affinity treatment for the CNTs and by being fired at 500° C. in the embodiment (first preparation method) of the production method of the catalyst particles of the electrode material for the fuel cell according to the present invention, and the drawing being obtained by means of the transmission electron microscope (TEM).

Note that, as shown in FIG. 10 and FIG. 18, which are to be described later, with regard to "the metal particles arranged on the conductive support" mentioned in the present invention, all the metal particles do not have to be arranged so as to directly contact the conductive support, and the metal particles may be those arranged (supported) by being subjected to the inclusion (fixed) by the porous inorganic material ($SiO_2$ and the like) on the conductive support, or may be contained in a part of the porous inorganic material. However, it is considered necessary that the above-described metal particles be electrically connected to the conductive support.

Moreover, the above-described porous inorganic material just needs to perform the inclusion for the metal particles and the conductive support so as to be capable of maintaining the contact between the metal particles and the conductive support, and to be capable of preventing the elution of the particles of the metal such as Pt. Hence, as shown in FIG. 1A and FIG. 1C, the porous inorganic material may perform the inclusion for the substantial entirety of the conductive support containing the metal particles, or as shown in FIG. 1B, FIG. 1D and FIG. 2, the porous inorganic material may perform the inclusion for only the vicinities of the metal particles 15. In particular, in the embodiments of FIG. 1B, FIG. 1D and FIG. 2, a surface of the conductive support in regions other than the vicinities of the metal particles are not subjected to the inclusion by the porous inorganic material. Accordingly, the porous inorganic material has an advantage in that a conductive network can be constructed in such a manner that the conductive supports close to one another contact one another, resulting in that it becomes easy to ensure the electron conduction in the section from the metal particles to the current collector.

Here, a content of the porous inorganic material 17 with respect to the total amount of the catalyst particles 11 is recommended to be set at preferably 10 to 90 mass %, and more preferably 20 to 70 mass %. In the case where the content of the porous inorganic material 17 is within the above-described range, there is an advantage in that the porous inorganic material 17 can suitably perform the inclusion for the metal particles 15 which are arranged on or in contact with the conductive support 13, resulting in being capable of preventing the elution of the metal particles. Note that the content of the porous inorganic material 17 can be investigated by the inductively coupled plasma (ICP) emission spectroscopy.

Moreover, a combination of the above-described metal particles and the above-described porous inorganic material that performs the inclusion for the metal particles is not particularly limited, and for example, there are mentioned a combination of Pt and $SiO_2$, a combination of Pd and $SiO_2$ or a titania-silica composite oxide, a combination of Rh and $SiO_2$ or $ZrO_2$, a combination of Au and $SiO_2$, and the like.

(2) Electrolyte

Besides the above-described catalyst particles 11, the electrolyte is contained in the electrode material for the fuel cell according to the present invention. The above-described electrolyte is not particularly limited, and a polymer electrolyte similar to the one used for the electrolyte membrane for the fuel cell can be used. Such an electrolyte for use in the electrolyte membrane for the fuel cell and such an electrolyte for use in the electrode material for the fuel cell may be the same or different from each other; however, it is preferable that both thereof be the same from a viewpoint of enhancing intimate contact between the catalyst layer (electrode for the fuel cell) formed by using the electrode material for the fuel cell and the electrolyte membrane for the fuel cell. Specifically, the electrolyte for use in the electrode material for the fuel cell is not particularly limited, and publicly known ones can be used; however, the electrolyte just needs to be a member at least having high proton conductivity. The electrolyte usable in this case is broadly classified into a fluorine electrolyte that contains fluorine atoms in the entirety or part of a polymer skeleton and a hydrocarbon electrolyte that does not contain the fluorine atoms in the polymer skeleton.

As suitable examples of the above-descried fluorine electrolyte, specifically, there are mentioned: a perfluorosulfonic acid polymer such as Nafion (registered trademark, made by DuPont Corporation), Aciplex (registered trademark, made by Asahi Kasei Corporation), and Flemion (registered trademark, made by Asahi Glass Co., Ltd.); a polytrifluorostyrene sulfonic acid polymer; a perfluorocarbon phosphonic acid polymer; a trifluorostyrene sulfonic acid polymer; an ethylene tetrafluoroethylene-g-styrene sulfonic acid polymer; an ethylene-tetrafluoroethylene copolymer; a polyvinylidene fluoride-perfluorocarbon sulfonic acid polymer; and the like.

As suitable examples of the above-described hydrocarbon electrolyte, specifically, there are mentioned: polysulfone sulfonic acid; polyaryletherketone sulfonic acid; polybenzimidazole alkylsulfonic acid, polybenzimidazole alkylphosphonic acid; polystyrene sulfonic acid; polyetheretherketone sulfonic acid; polyphenyl sulfonic acid; and the like.

It is preferable that the polymer electrolyte contain the fluorine atoms since the fluorine atoms are excellent in heat resistance and chemical stability. Among them, fluorine electrolytes such as Nafion (registered trademark, made by DuPont Corporation), Aciplex (registered trademark, made by Asahi Kasei Corporation), and Flemion (registered trademark, made by Asahi Glass Co., Ltd.) are preferably mentioned.

A mass ratio of the above-described electrolyte and the catalyst particles is not particularly limited as long as the functions and effects of the present invention can be exhibited effectively. The mass ratio just needs to be appropriately decided so that good ion conductivity can be imparted into the electrode (catalyst layer) for the fuel cell, which is formed by using the electrode material for the fuel cell, and that the gas diffusion in the electrode (catalyst layer) for the fuel cell and discharge of water (vapor) can be performed smoothly.

(3) Other Components

A water-repellent polymer and other various additives may be further coated on and contained in the electrode material for the fuel cell. By the fact that the water-repellent polymer is contained, water repellency of the electrode (catalyst layer) for the fuel cell, which is formed by using the electrode material for the fuel cell, can be enhanced, and the water and the like, which are generated at the time of the power generation, can be discharged rapidly.

A mixed amount of the above-described water-repellent polymer can be appropriately decided within a range where the functions and effects of the present invention are not affected.

As the above-described water-repellent polymer, for example, there can be used: polypropylene; polyethylene; fluorine polymer materials such as PTFE, polyvinylidene fluoride (PVDF), polytetrafluoroethylene, polyhexafluoropropylene, and copolymers (for example, tetrafluoroethylene-hexafluororopropylene copolymer and the like) of these monomers; or the like.

Moreover, besides the above-described catalyst particles 11 and electrolyte, the existing electrode catalyst composed by supporting metal particles on conductive supports, the existing reinforcement material, and the like may by further contained according to needs in the electrode material for the fuel cell according to the present invention.

Among them, the existing electrode catalyst is one composed by supporting catalyst metal particles on the conductive supports. Note that, desirably, the electrode catalyst concerned is also subjected to the inclusion by the porous inorganic material. This is because the elution of the particles of the metal such as Pt can be prevented by performing the inclusion by the porous inorganic material such as $SiO_2$. However, in this case, it becomes difficult to ensure the conductivity by the mutual contact between the conductive supports (in more detail, between the surfaces of the conductive supports, which are not subjected to the inclusion by the porous inorganic material). Therefore, it is desirable that only the vicinities of the catalyst metal particles on the conductive supports be subjected to the inclusion by the porous inorganic material.

Here, there are no particular limitations on the electrode catalyst for use in the cathode catalyst layer as long as the electrode catalyst is one having the catalytic function for the reduction reaction of oxygen, and a publicly known catalyst is usable in a similar way. Moreover, there are no particular limitations on the electrode catalyst for use in the anode catalyst layer, either, as long as the electrode catalyst is one having the catalytic function for the oxidation reaction of hydrogen, and a publicly known catalyst is usable in a similar way. Specifically, the material of the electrode catalysts is selected from metals such as platinum, ruthenium, iridium, rhodium, palladium, osmium, tungsten, lead, iron, chromium, cobalt, nickel, manganese, vanadium, molybdenum, gallium and aluminum, alloys of these, and the like. The electrode catalysts containing at least platinum among them are preferably used in order to enhance the catalytic activity, and to enhance the poisoning resistance and the heat resistance against carbon monoxide and the like. With regard to a composition of such an alloy as described above, though depending on a type of the metal to be alloyed with platinum, platinum is recommended to occupy 30 to 90 atom %, and the metal to be alloyed therewith is recommended to occupy 10 to 70 atom %. A composition of the alloy in the case of using the alloy for the cathode catalyst differs depending on the type of the metal to be alloyed with platinum, and on the like, and can be selected as appropriate. In this case, the material of the electrode catalyst, which is usable for the cathode catalyst layer, and the material of the electrode catalyst, which is usable for the anode catalyst layer, can be appropriately selected from those described above. In the following description, unless otherwise specified, a definition in the description of the electrode catalyst for the cathode catalyst layer and a definition in the description of the electrode catalyst for the anode catalyst layer are similar therebetween, and the electrode catalysts for both of the catalyst layers are referred to as "electrode catalyst" in a collective manner. However, it is not necessary that the electrode catalyst for the cathode catalyst layer and the electrode catalyst for the anode catalyst layer be the same, and the electrode catalysts for both of the catalyst layers are appropriately selected so as to exert desired functions as described above.

A shape and size of such an electrode catalyst are not particularly limited, and a shape and a size, which are similar to those of the publicly known electrode catalyst, can be used; however, it is preferable that the electrode catalyst be particulate. In this case, as an average particle diameter of the electrode catalyst is smaller, the effective electrode area where the electrochemical reaction progresses is increased, and accordingly, the oxygen reduction activity of the electrode catalyst is also enhanced, and the smaller average particle diameter is preferable. However, in actual, when the average particle diameter is too small, the phenomenon is observed that the oxygen reduction activity is decreased on the contrary. Hence, the average particle diameter of the electrode catalyst is preferably 1 to 30 nm, more preferably 1.5 to 20 nm, still more preferably 2 to 10 nm, and particularly preferably 2 to 5 nm. From a viewpoint of easiness in supporting the electrode catalyst, it is preferable that the average particle diameter be 1 nm or more, and from a viewpoint of the catalyst utilization ratio, it is preferable that the average particle diameter be 30 nm or less. Note that "the average particle diameter of the electrode catalyst" in the present invention can be measured by an average value of crystallite diameters obtained by half widths of diffraction peaks of the catalyst particles in the X-ray diffraction or by an average value of particle diameters of the catalyst particles, which are investigated by means of the transmission electron microscope.

The above-described conductive support just needs to be one having a specific surface area for supporting the metal particles thereon in a desired dispersed state, and as a current collector, having sufficient electron conductivity. It is preferable that a main component of the conductive support be carbon. Specifically, carbon particles composed of carbon black, activated carbon, coke, natural graphite, artificial graphite and the like are mentioned. Note that "the main component is carbon" in the present invention stands for that carbon atoms are contained as a main component, and is a concept including both of "the conductive support is composed only of the carbon atoms" and "the conductive support is substantially composed of the carbon atoms". Depending on the case, elements other than the carbon atoms may be contained in order to enhance the characteristics of the fuel cell. Note that "the conductive support is substantially composed of the carbon atoms" stands for that contamination of impurities with approximately 2 to 3 mass % or less is permitted.

The BET specific surface area of the above-described conductive support just needs to be a specific surface area sufficient for supporting the metal particles in a highly dispersed state. In the case of the columnar and/or tubular conductive support, the BET specific surface area of the conductive support is recommended to be preferably set at approximately 1 $m^2/g$ to 2000 $m^2/g$. When the above-described specific surface area is approximately 1 $m^2/g$ or more, the dispersivities of the metal particles and the polymer electrolyte on the above-described conductive support are enhanced, and sufficient power generation performance can be obtained. Meanwhile, when the specific surface area is approximately 2000 $m^2/g$ or less, high effective utilization ratios of the metal particles and the polymer electrolyte can be effectively maintained.

Moreover, in the case of the spherical conductive support, the BET specific surface area thereof is recommended to be set at preferably 5 to 2000 $m^2/g$, and more preferably 50 to 1500 $m^2/g$. Particularly preferably, the spherical conductive support is acetylene black, Vulcan, Ketjen Black and Black Pearl with a BET specific surface area of 50 to 2000 $m^2/g$.

Furthermore, a size of the above-described conductive support is not particularly limited; however, an average particle diameter thereof is recommended to be set at approximately 5 to 1000 nm, and preferably at approximately 50 to 700 nm from viewpoints of easiness in supporting the metal particles thereon, of controlling the catalyst utilization ratio and the thickness of the catalyst layer in appropriate ranges, and the like.

In the electrode catalyst in which the metal particles are supported on the conductive support, it is recommended that the supported amount of the metal particles be set at preferably 10 to 80 mass %, and more preferably 30 to 70 mass % with respect to a total amount of the electrode catalyst. When the above-described supported amount is 80 mass % or less, there is an advantage in that excellent dispersivity of the metal particles on the conductive support can be effectively maintained, resulting in that an effect of enhancing power generation performance corresponding to an increase of the supported amount can be effectively exerted. Moreover, when the above-described supported amount is 10 mass % or more, the electrode catalyst is excellent in catalytic activity per unit mass, and can obtain desired power generation performance corresponding to the supported amount of the metal particles. Therefore, the electrode catalyst is excellent in that it is possible to relatively easily perform design of the supported amount, which is for the purpose of ensuring desired cell performance. Note that the supported amount of the catalyst particles can be investigated by the inductively coupled plasma (ICP) emission spectroscopy.

Moreover, in the above-described electrode catalyst, in the case of performing the inclusion for the conductive support and the metal particles supported on the conductive support by the porous inorganic material, the inclusion just needs to be performed by using a porous inorganic material similar to that for the above-described catalyst particles 11. With regard to a usage amount of the porous inorganic material in this case, it is desirable that, by using an appropriate amount thereof, only the vicinities of the catalyst metal particles on the conductive support be subjected to the inclusion so that the elution of the particles of the metal such as Pt can be prevented, and that the conductivity can be ensured by the mutual contact between such conductive supports (in more detail, between the surfaces of the conductive supports, which are not subjected to the inclusion by the porous inorganic material).

Furthermore, the supporting of the metal particles on the conductive support can be performed by a publicly known method. For example, publicly known methods such as an impregnation method, a liquid-phase reducing/supporting method, an evaporation-to-dryness method, a colloid adsorption method, a spray pyrolysis method, and reversed micelle (microemulsion method) can be used. Moreover, a commercially available article may be used as the electrode catalyst. Furthermore, an inclusion method by the porous inorganic material can be performed in a similar way to production methods (first preparation method and the like) of the catalyst particles, which are to be described later.

A mixed amount of the above-described electrode catalyst into the electrode material for the fuel cell according to the present invention can be appropriately decided within a range where the functions and effects of the present invention are not affected.

Moreover, in the case where the electrode material for the fuel cell according to the present invention is used for the cathode-side electrode, a potential is raised on the cathode-side electrode. In this process, oxidized films are formed on the metal particles, for example, on the Pt particles, and the metal particles are stabilized; however, for this while, Pt is prone to be ionized in a potential range from 0.6V to 0.85V, and is eluted as Pt ions, and this has been a problem. From such a viewpoint, it is effective to use the electrode material for the fuel cell according to the present invention as the cathode-side electrode. This is because, in such a way, the elution of the metal (Pt) particles on the cathode-side electrode where the potential is raised can be prevented effectively. However, the electrode material for the fuel cell electrode according to the present invention is not particularly limited, and for example, may be used for the anode-side electrode, may be used for both of the cathode-side electrode and the anode-side electrode, and so on.

Next, a description will be made of the production method of the electrode material of the present invention, and particularly, of the catalyst particles thereof.

A typical embodiment (first preparation method) of the production method of the electrode material of the present invention, and particularly, of the catalyst particles thereof is characterized by including:

(1) the step of creating a conductive support;
(2) the step of supporting (arranging) metal particles on the conductive support; and
(3) the step of performing inclusion, by a porous inorganic material, for the conductive support on which the metal particles are supported (arranged).

In accordance with such a production method, the step of performing the inclusion for the peripheries of the metal particles by the porous inorganic material such as $SiO_2$, whereby the basic object of the present invention is achieved. Specifically, the peripheries of the metal particles are subjected to the inclusion by the porous inorganic material, whereby the elution of the metal particles can be prevented, and in addition, the conductive support is used as the support that supports the metal particles thereon, whereby the electron conductivity can be maintained. In such a way, in the formation of the electrode for the fuel cell, it will be sufficient if catalyst slurry containing the catalyst particles and the electrolyte is applied.

A description will be made below for each of the steps. Note that an order of these steps is not particularly limited as long as it is possible to produce the desired catalyst particles, and according to needs, a plurality of the steps may be performed collectively (in one step), or the steps may be performed while changing the order thereof. Note that, though the description will be made below by taking the columnar and/or tubular conductive support as an example of the conductive support, the spherical conductive support can also be produced in a similar way.

(1) Step of Forming the Columnar and/or Tubular Conductive Support

The step of forming the conductive support concerned is not particularly limited, and the conductive support can be produced by using a method conventionally known in public.

The description will be made below by taking as an example a method of growing the columnar and/or tubular conductive support in HC by using a usual Ni catalyst in the case where the columnar and/or tubular conductive support is a carbon nanotube (also abbreviated as CNT); however, the present invention is not limited to these. For example, the carbon nanofiber and the other columnar and/or tubular conductive supports can also be formed by using the existing production method. Moreover, besides the carbon nanotube, the carbon nanofiber and the other columnar and/or tubular conductive supports, one appropriately selected from among those already commercially available may be used. In the latter case, the step of forming the columnar and/or tubular conductive support can be omitted, and the step can be substituted by the step of preparing the conductive support such as the commercially available carbon nanotube. In a similar way, also with regard to the spherical conductive support, the step can be substituted by step of preparing a conductive support such as the commercially available carbon black.

In the step of forming the columnar and/or tubular CNT, first, a Ni—MgO catalyst is synthesized by using a citric acid method, a dry-up method and the like.

Next, CNT is synthesized by an ethylene decomposition reaction, and is subjected to acid treatment, whereby Ni—MgO is removed. The synthesis of CNT and the removal of Ni—MgO at this stage can be confirmed, for example, by means of the transmission electron microscope (TEM).

(2) Step of Supporting the Metal Particle on the Conductive Support

This step (2) of supporting the metal particles on the conductive support is not particularly limited, either, and a variety of production methods of supporting the metal catalyst particles on a carbon support (carbon black support and the like) as a spherical conductive support conventionally known in public can be used appropriately. Specifically, the method of supporting the metal particles on the conductive support is not particularly limited, and metal particles prepared in advance may be supported on the conductive support, and for example, a method may be adopted, in which the metal particles are adhered onto the conductive support, followed by firing, whereby the metal particles are supported (fixed) thereon. For example, there is such a method in which the conductive support is dispersed into a solution containing the metal particles, the solution is mixed/stirred, and the metal particles and the conductive support are made to react with each other at 70 to 100° C. for 3 to 12 hours, whereby the metal particles are supported on the conductive support. Note that, according to needs, a reducer and precipitant of metal components of the metal particles may be added to the solution.

As the above-described solution containing the metal particles, for example, there is a metal colloid solution. In order to support the metal particles on the conductive support by using this solution, the conductive support is dispersed into the metal colloid solution, followed by firing. In such a way, the metal particles can be supported on the conductive support. Note that an aqueous metal solution and the like may be used in place of this colloid solution.

In the method of the present invention, the metal type of the metal particles is not particularly limited, and is as already described. It is preferable to use at least one noble metal selected from the group consisting of platinum, palladium, rhodium, osmium, ruthenium and iridium since the noble metal is excellent in catalytic activity in the case of being used for the electrode for the fuel cell. Among them, it is preferable to use platinum, palladium and/or iridium. Supply sources of the noble metals are not particularly limited, and a variety of compounds containing these can be used. As the compounds as described above, there can be mentioned compounds containing the above-described noble metals, which are: nitrates such as palladium nitrate and rhodium nitrate; halides such as palladium chloride, platinum chloride and rhodium chloride; ammine complexes such as dinitrodiamine palladium, tetraammine palladium (II) nitrate and tetraammine palladium (II) nitrate; sulfates such as palladium sulfate and rhodium sulfate; acetates such as palladium acetate and rhodium acetate; other compounds; and the like. For example, the compounds can be appropriately selected depending on types and pH of solvents which dissolve these. Among them, for industrial use, nitrates, carbonates, oxides, hydroxides and the like are preferable. In conversion to metal, noble metal ion concentrations of these are preferably 0.1 to 50 mass %, and more preferably 1 to 30 mass %. Note that the reducer just needs to be added in order to prepare the above-described (noble) metal colloid solution.

Moreover, as the reducers of the above-described (noble) metals, there are mentioned hydrogen, hydrazine, sodium hydrogenborate, sodium thiosulfate, citric acid, sodium citrate, L-ascorbic acid, sodium tetrahydroborate, formaldehyde, methanol, ethanol, ethylene, carbon monoxide, and the like. One such as hydrazine, which is capable of being prepared as an aqueous solution, may be prepared as an aqueous solution with a concentration of 0.1 to 30 mass %, and may be directly added to the solution. A substance such as hydrogen, which is gaseous at the room temperature, can also be supplied by bubbling.

Moreover, transition metal that serves as the above-described metal particles and is usable by being alloyed with the above-described noble metal is at least one transition metal selected from the group consisting of vanadium, chromium, manganese, iron, cobalt, nickel, copper and zinc. As supply sources of the above-described transition metals, there can be mentioned compounds containing these transition metals, which are: inorganic salts such as nitrates, sulfates, ammonium salts, amines, carbonates, bicarbonates, haloids, nitrites and oxalic acid; carboxylates such as formates; hydroxides; alkoxides; oxides; and the like. The compounds can be appropriately selected depending on type and pH of solvents which dissolve these. A noble metal alloy of the noble metal and the transition metal is used, whereby the catalytic activity can be further enhanced. In particular, when the transition metal is used, mass activity (activity of the noble metal per unit mass) can be enhanced, and this is advantageous. Moreover, a mixing ratio of the noble metal and the transition metal just needs to be adjusted so that a ratio of the noble metal in the alloy can be a desired one.

As precipitants of the above-described metals, ammonia, ammonia water, urea, tetramethylammoniumhydroxide, and the like are mentioned. Each of the ammonia water, the tetramethylammoniumhydroxide and the like may be prepared as an aqueous solution with a concentration of 0.1 to 30 mass %, and may be directly added to the solution.

The conductive support usable in the present invention is as already described, and accordingly, the description thereof is omitted here. However, it is preferable that a particle diameter (uniaxial length) of the conductive support be 30 to 100 nm in order to uniformly disperse the above-described (noble) metal particles. Note that, in an alkaline solution such as a sodium hydroxide solution, a potassium hydroxide solution and calcium hydroxide solution, it is more preferable that the conductive support be one in which depositions on a surface are washed away.

In order to support the (noble) metal particles by using the above-described solution, the reducer is added to the above-described solution, the conductive support is dispersed into a resultant solution, followed by mixing and stirring, and an obtained mixture is kept warm at 70 to 100° C., and more preferably at 80 to 95° C. When the temperature falls down below 70° C., the reduction reaction is not accelerated, and this is disadvantageous in supporting a desired amount of the (noble) metal. Meanwhile, when the temperature exceeds 100° C., the aqueous solution boils, and it becomes difficult to control the operation. The (noble) metal or the (noble) metal alloy is supported on the conductive support while causing a reaction therebetween for 3 hours to 24 hours, and more preferably 6 to 12 hours as a reaction time. Moreover, in the case where the iridium or the like, which is other than the platinum, is made to contain as the (noble) metal, for example, a procedure may be adopted, in which a reducer for iridium ions is added to a solution containing the iridium ions, a solution containing platinum ions is mixed with an obtained solution, and a reducer for the platinum ions is added thereto. The same is also applied to the transition metal.

In order to support the noble metal alloy particles, the transition metal just needs to be further supported on the conductive support on which the noble metal particles are supported. Specifically, the precipitant is added to a solution containing the transition metal, and the conductive support on which the noble metal is previously supported is dispersed into an obtained solution, followed by mixing and stirring, and then an obtained mixture is kept warm at 30 to 100° C., and more preferably at 30 to 50° C. When the temperature falls down below 30° C., this is disadvantageous in accelerating the precipitation reaction. Meanwhile, when the temperature exceeds 100° C., the aqueous solution boils, and it becomes difficult to control the operation. The transition metal is supported on the conductive support while causing a reaction therebetween for 1 hour to 12 hours, and more preferably 3 to 6 hours as a reaction time.

Moreover, in order to support the noble metal alloy particles, the noble metal may be further supported on the conductive support on which the transition metal particles are first supported. Specifically, the solution containing the transition metal and the conductive support are mixed with each other, and the reducer is subsequently added thereto, whereby the transition metal particles are supported on the conductive support, a resultant is then subjected to filtration/drying/firing, and the conductive support on which the transition metal particles are supported is obtained. The conductive support on which the transition metal particles are supported is added to the noble metal solution, and the reducer is further added to an obtained solution, followed by mixing, stirring and heat keeping.

The conductive support on which the (noble) metal (alloy) particles as described above are supported is separated from the solution by a method such as centrifugal separation, filtration and washing, followed by washing and drying. As a drying method, for example, natural drying, an evaporation-to-dryness method, drying by a rotary evaporator, a spray dryer and a drum dryer, and the like can be used. A drying time just needs to be appropriately selected in response to the method for use. Depending on the case, the drying may be performed in the firing step without performing the drying step. Micro milling is performed after the drying, whereby a precursor of the catalyst particles is obtained, and further, the precursor concerned is fired under the presence of inert gas and oxidizing gas. In comparison with methods by firing of metal salt and by firing of a certain type of organic salt, the precursor of the catalyst particles can be formed into the catalyst particles composed of the noble metal by the firing at a lower temperature. Accordingly, in the case where the conductive support is a carbonic material (carbon material), the precursor of the catalyst particles is heated/fired in an inert (non-oxidizing) atmosphere of argon, nitrogen, helium or the like so as to prevent the oxidation of the carbon. Specifically, it is preferable to perform the step of firing the precursor at 200 to 1100° C., and more preferably 200 to 800° C. in the inert gas atmosphere, and thereafter, further holding the precursor at 200 to 600° C., and more preferably 200 to 400° C.

Moreover, in another method than the above, for example, the (noble) metal (alloy) particles are supported on the conductive support, the conductive support concerned is sequentially impregnated into a solution in which the reducer is added to the solution containing the noble metal and/or into a solution in which the precipitant is added to the solution containing the transition metal, and the noble metal and the transition metal are further supported on the noble metal alloy particles. Thereafter, in a similar way to the above, the conductive support concerned is separated from the solution by the method such as the centrifugal separation, the filtration and the washing, followed by washing, drying and micro milling, whereby a precursor of the catalyst particles is obtained. In the case where the conductive support is a carbonic material (carbon material), the precursor of the catalyst particles is fired in an inert (non-oxidizing) atmosphere of argon, nitrogen or the like so as to prevent the oxidation of the carbon. It is preferable to perform the step of firing the precursor at 200 to 1100° C., and more preferably 200 to 800° C. in the inert gas atmosphere, and thereafter, further holding the precursor at 200 to 600° C., and more preferably 200 to 400° C.

Moreover, in the step of the present invention, the metal particles can also be arranged on the conductive support by using a reversed micelle solution. When the reversed micelle solution is used, the fine (noble) metal particles can be efficiently supported on the conductive support, the utilization of the noble metal in the electrode for the fuel cell can be enhanced.

For example, in the case where the reducer for noble metal ions is added to a reversed micelle solution (A) containing an aqueous solution of the noble metal ions in micelle insides, and further, the noble metal alloy particles are used as the metal particles, then a reversed micelle solution (B) containing an aqueous solution of transition metal ions in micelle insides is subsequently mixed with the solution concerned, the precipitant for the transition metal ions is added thereto, the conductive support is dispersed into the solution, the noble metal alloy is supported on the conductive support, and a solution capable of eluting components other than the noble metal composing the noble metal alloy particles is operated for the solution described above, whereby the noble metal alloy particles can be formed. Moreover, in the case where the iridium and the like, which are other than the platinum, are made to contain as the noble metals, for example, a procedure may be adopted, in which a reducer for iridium ions is added to a reversed micelle solution ($A_1$) containing the iridium ions, a reversed micelle solution ($A_2$) containing platinum ions is mixed with an obtained solution, and a reducer for the platinum ions is added to an obtained mixture. In a similar way, in the case of using a plurality of the transition metal ions, reversed micelle solutions ($B_1$) and ($B_2$) containing different transition metal ions and reducers for these transition metal ions just need to be used. Note that "the reversed micelle solution" for use in the present invention is a solution containing micelles formed in such a manner that amphiphiles such as surfactant molecules are mixed with an organic solvent, and that the amphiphiles are aggregated, and containing the noble metal ion aqueous solution and/or the transition metal ion aqueous solution in the micelles concerned. In an organic solvent phase, hydrophobic groups are directed to the outside, that is, to an organic solvent phase side, hydrophilic groups are oriented to the inside, and orientations of the hydrophobic groups and the hydrophilic groups are reverse to those in the case of an aqueous solvent phase. From such a structure as described above, the name of the reversed micelle solution is derived.

In this step, the solution containing the noble metal ions is added as the reversed micelle solution. A size of the micelles can be adjusted depending on types and loadings of the solvent and the surfactant, which are for use. For example, when the conductive support is added to a reversed micelle solution in which a diameter of the micelles is 20 to 100 nm, the micelles are uniformly adhered onto the surface of the conductive support, and when the conductive support is fired, catalyst particles can be obtained, which are uniformly supported on the surface of the conductive support at an interval of 10 to 50 nm among the adjacent metal particles.

As the organic solvent usable for forming the reversed micelles, a variety of substances are usable, and as examples thereof, there are mentioned cyclohexane, methylcyclohexane, cycloheptane, heptanol, octanol, dodecyl alcohol, cetyl alcohol, isooctane, n-heptane, n-hexane, n-decane, benzene, toluene, xylene, and the like. Moreover, alcohol and the like may be added for the purpose of adjusting a size of water droplets in the reversed micelle solution. Two or more types of the organic solvents may be used in combination, as well as one type thereof is used singly. Moreover, the organic solvent can be used for preparing both of the reversed micelle solution (A) and the reversed micelle solution (B). Furthermore, in the case of supplying, as the reversed micelle solutions, the reducer for the noble metal ions and the precipitant for the transition metal ions, the organic solvent can also be used for preparing these solutions. In this case, the organic solvent for use in either of the reversed micelle solutions and the organic solvent for use in the other reversed micelle solution may be the same or different from each other.

As the surfactant for forming the reversed micelle solution, there can be mentioned polyoxyethylene nonylphenylether, magnesium laurate, zinc caprate, zinc myristate, sodium phenylstearate, aluminum dicaprylate, tetraisoamyl ammonium thiocyanate, n-octadecyl tri-n-butyl ammonium formate, n-amyl tri-n-butyl ammonium iodide, sodium bis(2-ethylhexyl) succinate, sodium dinonylnaphthalenesulfonate, calcium cetylsulfate, dodecylamine oleate, dodecylamine propionate, cetyltrimethylammonium bromide, stearyltrimethylammonium bromide, cetyltrimethylammonium chloride, stearyltrimethylammonium chloride, dodecyltrimethylammonium bromide, octadecyltrimethylammonium bromide, dodecyltrimethylammonium chloride, octadecyltrimethylammonium chloride, didodecyldimethylammonium bromide, ditetradecyldimethylammonium bromide, didodecyldimethylammonium chloride, ditetradecyldimethylammonium chloride, (2-octyloxy-1-octyloxymethyl)polyoxyethylene ethyl ether, and the like. The surfactant can also be used for preparing any reversed micelle solution, and two or more types thereof can also be used in combination. Note that the loading of the surfactant with respect to the organic solvent is 10 to 300 mass parts with respect to 100 mass parts of the organic solvent. When the loading of the surfactant falls down below 10 mass parts, it becomes difficult to form the reversed micelles. Meanwhile, when the loading exceeds 300 mass parts, this is disadvantageous from a viewpoint that rod-like micelles are formed, which results in that the noble metal particles are not coagulated while controlling an average particle diameter thereof to a specific size.

In the method of the present invention, the type of the noble metal ions is not limited, and the above-described noble metals can be used. In conversion to metal, the noble metal ion concentrations are preferably 0.1 to 50 mass %, and more preferably 0.5 to 20 mass %. Moreover, also as the reducer for the noble metal ions, reducers of types similar to those described above can be used. In a similar way, also as the precipitant for the transition metal ions and the transition metal, the precipitants described above can be used.

When the reducer is added to the reversed micelles (A), the noble metal ions become the noble metal particles, and when the precipitant is added to the reversed micelle solution (B), the transition metal ions become the transition metal particles. Accordingly, with regard to an order of adding the reversed micelle solution (A), the reversed micelle solution (B), the reducer and the precipitant, there are: (i) a method of adding the reducer to the reversed micelle solution (A), adding the reversed micelle solution (B) to such a mixed solution, and subsequently adding the precipitant to such a further mixed solution; as well as (ii) a method of first adding the reducer to a mixed solution of the reversed micelle solution (A) and the reversed micelle solution (B), and later adding the precipitant to the mixed solution; (iii) a method of first adding the precipitant to the mixed solution of the reversed micelle solution (A) and the reversed micelle solution (B), and later adding the reducer to the mixed solution; (iv) a method of adding the precipitant to the reversed micelle solution (B), subsequently adding the reversed micelle solution (A) to such a mixed solution, and further adding the reducer to such a further mixed solution; and the like. At this time, in the case of using the transition metal in combination, when the conductive support is added to the solutions obtained through the above-described processes (i) to (iv), both of the metal particles are complexed, and particles thus complexed are adhered onto the surface of the conductive support; however, the present invention is not limited to such a mode, and the conductive support may be added to the solution concerned in any step before. Preferably, the conductive support is added to the reversed micelle solution (A), both thereof are mixed together to form a uniform solution, and the above-described solutions and the like are sequentially added to the formed solution. When the conductive support is added to the reversed micelle solution (A), the micelles containing the noble metal ion solution in the insides thereof are uniformly attached onto the surface of the conductive support, and the reducer is added to an obtained mixture in this state. Accordingly, the noble metal particles can be supported on the surface of the conductive support while maintaining the dispersivity thereof. Moreover, a method can also be adopted, in which, after adding the conductive support to the reversed micelle solution (A), alcohols such as methanol and ethanol are added to an obtained mixture, whereby the micelles are broken, and the supporting of the noble metal particles on the surface of the conductive support is accelerated.

After the conductive support is added to and combined with the reversed micelle solution (A) and/or the reversed micelle solution (B), it is preferable to support the noble metal or the noble metal alloy on the conductive support in such a manner that the solution concerned is mixed/stirred and then a reaction is caused therein at 70 to 100° C. for 3 to 12 hours. In accordance with this condition, the supporting of the noble metal particles on the surface of the conductive support can be surely performed.

A description will be made below of the step (1) by taking a specific example of supporting Pt as the metal particles on the CNT (conductive support) obtained in the above-described step (1) as shown in FIG. 1 (in a highly dispersed state); however, the present invention is not limited to this.

First, in this step, the CNT obtained in the above-described step (1) is dispersed into a mixed solution in which platinochloride (solution containing the noble metals), water and ethanol are blended together in a predetermined ratio, and thereafter, is subjected to degassing treatment.

Next, ammonia water is slowly dropped as the precipitant (reducer) onto a resultant, followed by stirring for 1 hour.

Washing and filtration are performed by using the above-described ammonia water. Thereafter, firing is performed in He gas at 350° C. for 3 hours, whereby the Pt particles can be supported (arranged) on the CNT in a highly dispersed state. In such a way, the CNT on which the Pt particles are supported (also referred to as Pt-supported CNT) can be obtained. It is desirable to confirm whether or not desired Pt-supported CNT is formed by observing the CNT by means of the transmission electron microscope (TEM) at this stage.

(3) Step of Performing Inclusion, by the Porous Inorganic Material, for the Conductive Support on which the Metal Particles are Supported (Arranged)

The step (3) of performing inclusion, by a porous inorganic material, for the conductive support on which the metal particles are arranged is not particularly limited, either, and a variety of production methods of performing the inclusion for the metal particles conventionally known in public by the porous inorganic material can be appropriately used.

In the case of performing the inclusion, by the porous inorganic material, for the above-described conductive support on which the metal particles obtained in the above-described step (2) are arranged (hereinafter, metal particle-supported conductive support), in the case where the conductive support is the carbonic material (CNT and the like), the surface thereof is hydrophobic, and accordingly, the conductive support repels a raw material of the porous inorganic material having hydrophilic groups such as Si—OH groups. Accordingly, it is preferable that hydrophilic treatment be performed in advance for the conductive support having the hydrophobic surface. Such hydrophilic treatment is not particularly limited, and for example, nitric acid treatment and the like are mentioned.

Next, the metal particle-supported conductive support that is subjected to the hydrophilic treatment is dispersed into a dispersion medium of a predetermined temperature.

As the dispersion medium, dehydrated ethanol and the like are mentioned; however, the dispersion medium is not limited to these at all, and any of water, a hydrophilic solvent, a hydrophobic solvent and mixtures of these may be used. Moreover, no particular limitations are imposed on the temperature.

Next, such an inclusion precursor is slowly dropped on a resultant solution, followed by stirred for a predetermined time, whereby the inclusion precursor can be selectively adsorbed to the metal particles of the metal particle-supported conductive support subjected to the hydrophilic treatment. In such a way, in a subsequent step, compatibility and intimate contact between the metal particles and the porous inorganic material can be enhanced, and the porous inorganic material such as $SiO_2$ can be surely subjected to the inclusion (be coated) on the metal particles.

As the above-described inclusion precursor, for example, 3-aminopropylethoxysilane (APTS) and the like are mentioned.

A stirring time just needs to be sufficient for enabling the above-described inclusion precursor to be selectively adsorbed to the metal particles, and is not particularly limited.

Thereafter, a precursor of the porous inorganic material, water, and a pH adjusting solution are added together, followed by stirring for a predetermined time, whereby the precursor of the porous inorganic material is subjected to a hydrolysis/condensation reaction. In such a way, the metal particle-supported conductive support subjected to the hydrophilic treatment can be subjected to the inclusion by the porous inorganic material.

As the precursor of the porous inorganic material, there can be mentioned silane compounds such as dialkoxysilane, dimethyldiacetyloxysilane, and dimethyldiphenoxysilane, which are such as tetramethoxysilane, tetraethoxysilane (hereinafter, also simply abbreviated as TEOS), tetra-n-propoxysilane, tetra-i-propoxysilane, tetra-n-butoxysilane, tetraacetyloxysilane, tetraphenoxysilane, methyltrimethoxysilane, methyltriethoxysilane, ethyltrimethoxysilane, ethyltriethoxysilane, n-propyltrimethoxysilane, n-propyltriethoxysilane, i-propyltrimethoxysilane, i-propyltriethoxysilane, n-butyltrimethoxysilane, n-butyltriethoxysilane, n-pentyltrimethoxysilane, n-pentyltriethoxysilane, cyclohexyltrimethoxysilane, cyclohexyltriethoxysilane, phenyltrimethoxysilane, phenyltriethoxysilane, N-(2-aminoethyl)-3-aminopropyltrimethoxysilane, N-(2-aminoethyl)-3-aminopropyltriethoxysilane, 3-glycidoxypropyltrimethoxysilane, 3-glycidoxypropyltriethoxysilane, 2-(3,4-epoxycyclohexyl)ethyltrimethoxysilane, 2-(3,4-epoxycyclohexyl)ethyltriethoxysilane, 3-(meta)

acryloxypropyltrimethoxysilane, 3-(meta)acryloxypropyltriethoxysilane, vinyltrimethoxysilane, vinyltriethoxysilane, aryltrimethoxysilane, vinyltriacetoxysilane, 3-chloropropyltrimethoxysilane, 3-chloropropyltriethoxysilane, 3-triphloropropyltrimethoxysilane, 3,3,3-triphloropropyltriethoxysilane, 3-aminopropyltrimethoxysilane, 3-aminopropyltriethoxysilane (hereinafter, also simply abbreviated as APTS), 2-hydroxyethyltrimethoxysilane, 2-hydroxyethyltriethoxysilane, 2-hydroxypropyltrimethoxysilane, 2-hydroxypropyltriethoxysilane, 3-hydroxypropyltrimethoxysilane, 3-hydroxypropyltriethoxysilane, 3-mercaptopropyltrimethoxysilane, 3-mercaptopropyltriethoxysilane, 3-isocyanatepropyltrimethoxysilane, 3-isocyanatepropyltriethoxysilane, 3-ureidepropyltrimethoxysilane, 3-ureidepropyltriethoxysilane, methyltriacetyloxysilane, methyltriphenoxysilane, dimethyldimethoxysilane, dimethyldiethoxysilane, diethyldimethoxysilane, diethyldiethoxysilane, di-n-propyldimethoxysilane, di-n-propyldiethoxysilane, di-1-propyldimethoxysilane, di-1-propyldiethoxysilane, di-n-butyldimethoxysilane, di-n-butyldiethoxysilane, n-pentyl.methyldimethoxysilane, n-pentyl.methyldiethoxysilane, cyclohexyl.methyldimethoxysilane, cyclohexyl.methyldiethoxysilane, phenyl.methyldimethoxysilane, phenyl.methyldiethoxysilane, di-n-pentyldimethoxysilane, di-n-pentyldiethoxysilane, di-n-hexyldimethoxysilane, di-n-hexyldiethoxysilane, di-n-heptyldimethoxysilane, di-n-heptyldiethoxysilane, di-n-octyldimethoxysilane, di-n-octyldiethoxysilane, dicyclohexyldimethoxysilane, dicyclohexyldiethoxysilane, diphenyldimethoxysilane, and diphenyldiethoxysilane, and the like. However, the precursor of the porous inorganic material is not limited to these. These may be used singly, or may be used as mixtures.

Moreover, for the purpose of enhancing the proton conductivity, a silane compound containing proton-dissociative functional groups may be contained as a silane compound.

As the proton-dissociative functional groups, there are mentioned sulfonic acid derivative groups, phosphonic acid derivative groups, sulfonamide derivative groups, or sulfonimide derivative groups. As the silane compound containing such proton-dissociative functional groups, for example, 2-(4-chlorosulfonylphenyl)ethyltrimethoxysilane, diethylphosphateethyltriethoxysilane, and the like are mentioned.

The above-described pH adjusting solution is not particularly limited, and for example, $HNO_3$ and the like can be mentioned; however, the pH adjusting solution is not limited to these. These may be used singly, or may be used as a mixture.

In the present invention, it is desirable that pH of such a solution in which the precursor of the porous inorganic material, the water and the pH adjusting solution are added together be adjusted within a range of 1 to 6, and preferably within a range of 2 to 4 in terms of suitably performing the hydrolysis/condensation reaction.

A stirring time here also just needs to be sufficient for enabling the metal particle-supported conductive support to be subjected to the inclusion by the porous inorganic material by performing the desired hydrolysis/condensation reaction, and is not particularly limited.

Thereafter, the solution concerned is subjected to washing, separation and drying, followed by firing, whereby the metal particle-supported conductive support is subjected to the inclusion (fixed) by the porous inorganic material. As a washing method, for example, alcohol washing and the like can be used. As a separation method, for example, the centrifugal separation and the like can be used. As a drying method, for example, the vacuum drying, the natural drying, the evaporation-to-dryness method, the drying by the rotary evaporator, the spray dryer and the drum dryer, and the like can be used. A drying time just needs to be appropriately selected in response to the method for use. Depending on the case, the drying may be performed in the firing step without performing the drying step. Micro milling is performed according to needs after the drying, and catalyst particles thus obtained are fired. Also at this time, in the case where the conductive support is a carbonic material (carbon material), the precursor of the catalyst particles is heated/fired in an inert (non-oxidizing) atmosphere of argon, nitrogen, helium or the like so as to prevent the oxidation of the carbon. Specifically, the precursor is fired at 200 to 1100° C., and more preferably 200 to 800° C. in the inert gas atmosphere.

A description will be made below of the step (2) by taking an example of performing the inclusion (coating) for the Pt-supported CNT obtained in the above-described step (2) by $SiO_2$ as the porous inorganic material; however, the present invention is not limited to this.

First, the Pt-supported CNT obtained in the above-described step (2) is treated with $1N—HNO_3$aq at 80° C. for 3 h. In such a way, the CNT becomes hydrophilic.

Next, the Pt-supported CNT subjected to the hydrophilic treatment is dispersed into the dehydrated ethanol (55° C.).

Next, the 3-aminopropylethoxysilane (APTS) is slowly dropped on a resultant solution, followed by stirring for 30 minutes. In such a way, the APTS is selectively adsorbed to the CNT (refer to FIG. 1B and FIG. 12).

Thereafter, tetraorthosiliate (TEOS), water and $1N—HNO_3$aq are added to a resultant solution, followed by stirring for 1 hour.

Thereafter, the resultant is subjected to the alcohol washing and the centrifugal separation, followed by vacuum drying, and is thereafter fired at 350° C. for 3 hours in Ar gas, whereby desired catalyst particles as shown in FIG. 1B can be obtained. It is desirable to confirm whether or not the desired catalyst particles are formed by observing the finally obtained catalyst particles by means of the transmission electron microscope (TEM).

Next, a description will be briefly made below of a specific example suitable for mass production using the above-described first preparation method.

(1) Mass Production Step of Columnar and/or Tubular Conductive Support Using the Above-Described Ni—MgO Catalyst or Co—MgO Catalyst Also in the following, a description will be made of the step (1) by taking the carbon nanotube (also abbreviated as CNT) as an example of the columnar and/or tubular conductive support; however, the present invention is not limited to this. Specifically, as described above, the other columnar and/or tubular conductive supports and the spherical conductive support can also be produced in a similar way.

In this step, first, the Ni—MgO catalyst or the Co—MgO catalyst is prepared by the citric acid method.

Next, the ethylene ($C_2H_4$) decomposition reaction is performed at 700° C. for 30 minutes, whereby the CNT is synthesized.

Figure 3A:
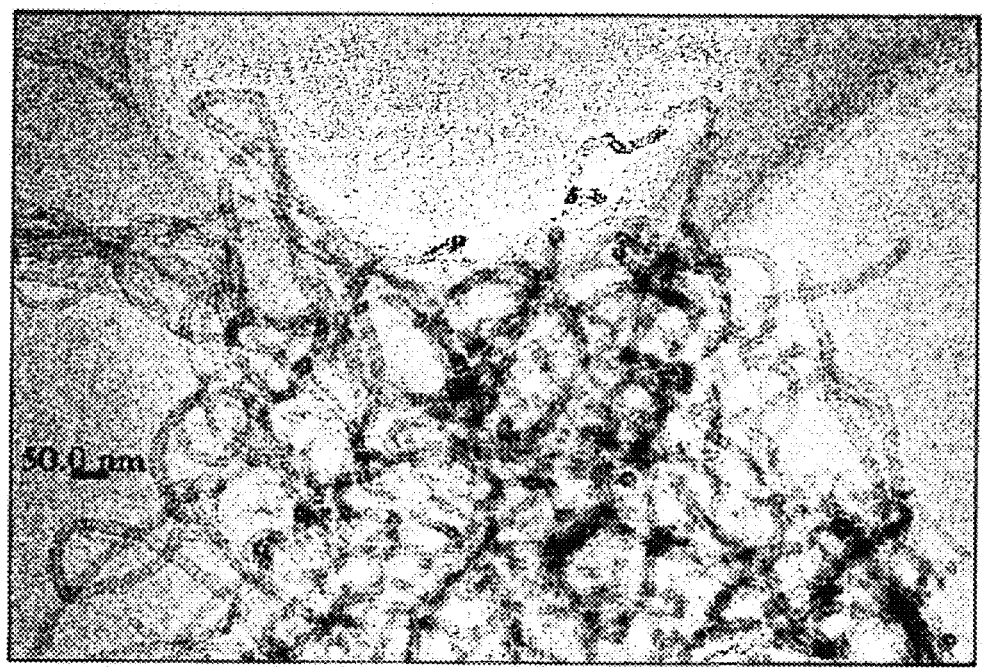
FIG. 3A shows a drawing of a CNT of a columnar and/or tubular conductive support obtained by an embodiment (first preparation method) of a production method of the catalyst particles of the electrode material for the fuel cell according to the present invention, the drawing being obtained by means of a transmission electron microscope (TEM).
Figure 3B:
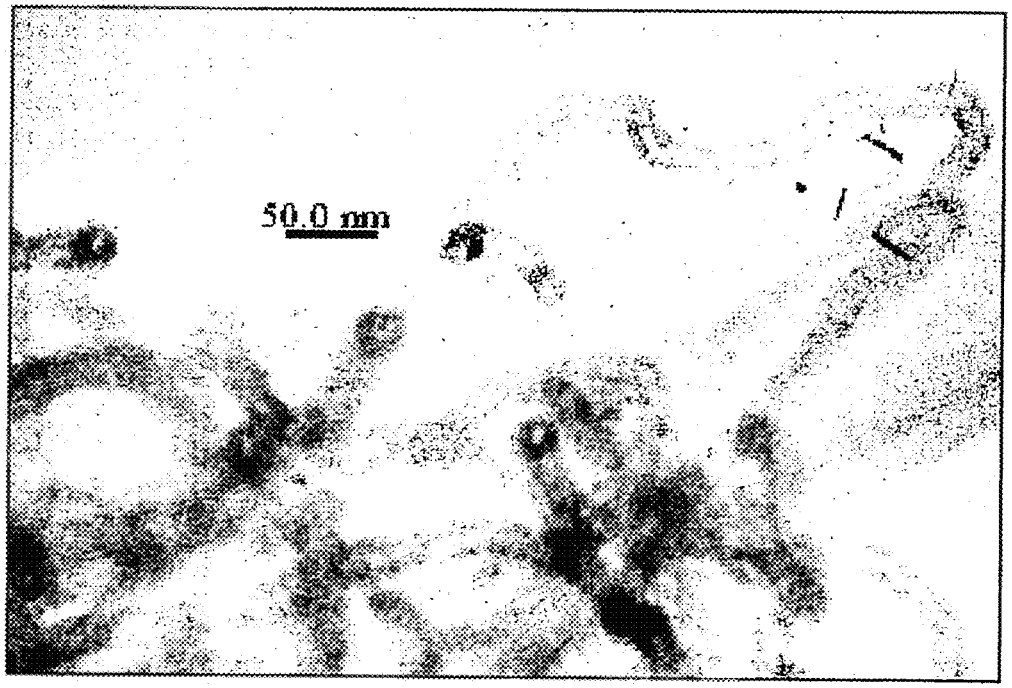
FIG. 3B is a TEM drawing in which a part of FIG. 3A is enlarged.

As post-treatment, the metal (Ni—MgO or Co—MgO) is removed from the CNT by the acid treatment, followed by drying at 200° C., whereby a large amount of CNTs with a diameter of 30 nm can be obtained. At this stage, it is confirmed whether or not the CNT is synthesized and the Ni—MgO or the Co—MgO is removed therefrom by means of the transmission electron microscope (TEM). Drawings by means of such a transmission electron microscope (TEM) are shown in FIG. 3A and FIG. 3B. Note that FIG. 3B is a TEM drawing in which a part of FIG. 3A is enlarged.

(2) Step of Arranging the Metal Particles on the Above-Described Mass-Produced Conductive Support (CNT)

In the following, a description will be made of the step (2) by using an example of supporting Pt as the metal particles on the CNTs, which are obtained in large amount in the above-described step (1), in a highly dispersed state as shown in FIG. 1A and FIG. 1B; however, the present invention is not limited to this.

First, in this step, the CNTs obtained in the above-described step (1) are dispersed in a mixed solution in which platinochloride, water and ethanol are blended in a predetermined ratio, and thereafter, are subjected to the degassing treatment.

Ammonia water is slowly dropped onto a resultant, followed by stirring for a predetermined time.

Figure 4A:
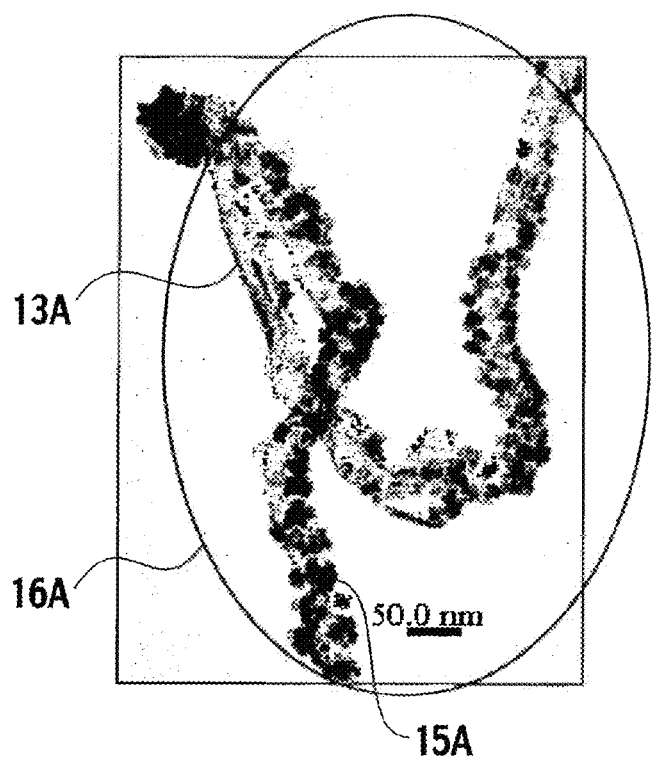
FIG. 4A shows a drawing of a CNT on which Pt particles are supported (also referred to as a Pt-supported CNT), the CNT being obtained by the embodiment (first preparation method) of the production method of the catalyst particles of the electrode material for the fuel cell according to the present invention, and the drawing being obtained by means of the transmission electron microscope (TEM).
Figure 4B:
FIG. 4B shows a drawing of the CNT on which the Pt particles are supported (also referred to as the Pt-supported CNT), the CNT being obtained by the embodiment (first preparation method) of the production method of the catalyst particles of the electrode material for the fuel cell according to the present invention, and the drawing being obtained by means of the transmission electron microscope (TEM).

Washing and filtration are performed by using the ammonia water. Thereafter, firing is performed in He gas at 350° C. for 3 hours, whereby the Pt microparticles with a diameter of approximately 10 nm can be supported (fixed) on the CNTs in a highly dispersed state. In such a way, the CNTs on which the Pt particles are supported (also referred to as Pt-supported CNTs) can be obtained. At this stage, it is desirable to confirm whether or not desired Pt-supported CNTs are formed by observing the CNTs by means of the transmission electron microscope (TEM). Drawings by means of such a transmission electron microscope (TEM) are shown in FIG. 4A and FIG. 4B. As shown in these drawings, such a Pt-supported CNT 16A in which Pt particles 15A are supported on a CNT 13A is obtained.

(3) Step of Performing Inclusion, by the Porous Inorganic Material, for Large Amount of the Conductive Supports (CNTs) on which the Above-Described Metal Particles are Arranged In the following, a description will be made of the step (3) by using an example of performing the inclusion (coating) for a large amount of Pt-supported CNTs, which are obtained in the above-described step (2), by $SiO_2$ as the porous inorganic material; however, the present invention is not limited to this.

First, the large amount of Pt-supported CNTs obtained in the above-described step (2) are treated with $1N-HNO_3$aq at 80° C. for 3 h. In such a way, the CNTs become hydrophilic.

Next, the Pt-supported CNTs subjected to the hydrophilic treatment are dispersed into the dehydrated ethanol (55° C.).

Next, 3-aminopropylethoxysilane (APTS) is slowly dropped on a resultant solution, followed by stirring for 30 minutes. In such a way, the APTS is selectively adsorbed to the CNTs.

Thereafter, TEOS, water and $1N-HNO_3$aq are added to a resultant solution, followed by stirring for 1 hour.

Thereafter, the resultant is subjected to the alcohol washing and the centrifugal separation, followed by the vacuum drying, and is thereafter fired at 350° C. for 3 hours in Ar gas, whereby desired catalyst particles as shown in FIG. 1B, in which the Pt particles supported on the CNTs and the CNTs supporting the Pt particles thereon are subjected to the inclusion by $SiO_2$, can be obtained. It is desirable to confirm whether or not the desired catalyst particles are formed by observing the finally obtained catalyst particles by means of the transmission electron microscope (TEM).

Next, in the above-described first preparation method, it is desirable to further perform the step (1') of performing affinity treatment for the surfaces of the above-described conductive support between the step (1) of forming the conductive support and the step (2) of arranging the metal particles on the above-described conductive support.

Here, the respective steps (1), (2) and (3) are as described above, and accordingly, a description thereof will be omitted here. A description will be made below of the step (1')

(1') Step of Performing Affinity Treatment for the Surface of the Above-Described Conductive Support In this step, the affinity treatment is performed for the surface of the conductive support obtained in the above-described step (1). This is excellent since the surface treatment (affinity treatment) for the conductive support (CNT) is desirable for the inclusion by the porous inorganic material ($SiO_2$), and the electrode material by the first preparation method including this step serves as a best mode in which the elution prevention performance for the metal particles (Pt and the like) and the best power generation performance can be made compatible with each other. Specifically, the contact between the porous inorganic material ($SiO_2$) and the conductive support (CNT) becomes extremely good by the surface treatment (affinity treatment) for the conductive support (CNT) (it is considered that good contact is constructed as a result that the $SiO_2$ precursor and the CNT are chemically bonded to each other as shown in FIG. 10), the porous inorganic material ($SiO_2$) layer can be thinned while preventing the elution, and the power generation performance is enhanced.

Figure 9:
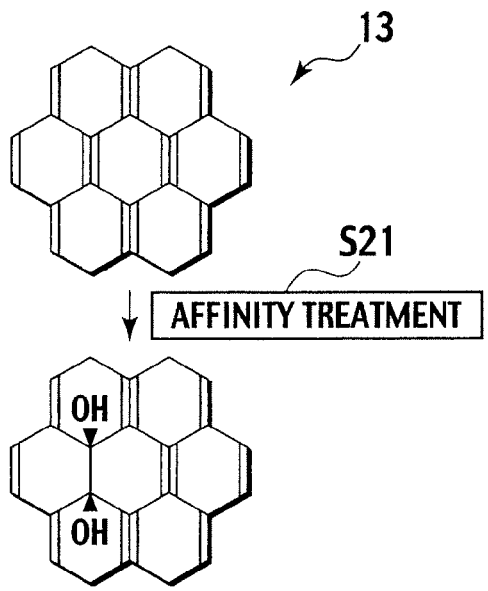
FIG. 9 is a schematic view showing a state where hydroxyl groups (—OH) are introduced onto a surface of the CNT (for convenience, a part thereof is illustrated in a planar manner) as the conductive support by affinity treatment.

Here, the affinity treatment for the conductive support (CNT) is not particularly limited as long as functional groups such as hydroxyl groups, which can be polycondensed with the TEOS and the APTS, can be introduced onto the surface of the conductive support, and surface treatment (surface modification) technologies conventionally known in public can be used appropriately. Specifically, the affinity treatment just needs to be one capable of enhancing the affinity of the surface of the conductive support (CNT) with the porous inorganic material ($SiO_2$) and the precursor (for example, TEOS+APTS) thereof, which are for use in performing the inclusion for the conductive support (CNT) concerned in a subsequent step. For example, there is mentioned such treatment that enhances affinity of a surface of a CNT 13 (for convenience, a part thereof is illustrated in a planar manner) as the conductive support by introducing the hydroxyl groups (—OH) thereonto as shown in FIG. 9; however, the affinity treatment is not limited to this at all. Here, FIG. 9 is a schematic view showing a state where the hydroxyl groups (—OH) are introduced onto the surface of the CNT 13 (for convenience, a part thereof is illustrated in a planar manner) as the conductive support by the affinity treatment (Step S21).

As a specific example of the above-described affinity treatment, for example, a method of treating the conductive support (CNT) by an oxidizing strong acid is mentioned.

Here, the above-described oxidizing strong acid is not particularly limited, and for example, mixed acid, nitric acid and the like are mentioned. Among them, the mixed acid is preferable owing to a density of the hydroxyl groups after the treatment. Moreover, in order to enhance the affinity, it is effective to perform the treatment in the mixed acid at the room temperature while applying an ultrasonic wave to the conductive support. Note that the affinity treatment for the conductive support (CNT), which is performed at first in the above-described step (3) by using the nitric acid, can be said to be one type of the affinity treatment mentioned here.

Note that the affinity treatment of the present invention is as prescribed above, and accordingly, is different from the acid treatment for removing the catalyst such as Co from the conductive support (CNT).

A description will be briefly made below of the first preparation method including the above-described step (1') by taking a specific example thereof. FIG. 10 is a process schematic view schematically showing the specific example of the first preparation method including the above-described step (1').

(1) Step of Forming the Columnar and/or Tubular Conductive Support Using the Co—MgO Catalyst A description will be made below of the step (1) by taking the carbon nanotube (also abbreviated as CNT) as an example of the columnar and/or tubular conductive support; however, the present invention is not limited to this. Specifically, as described above, the other columnar and/or tubular conductive support and the spherical conductive support can also be produced in a similar way.

In this step, first, the Co—MgO catalyst is prepared by the citric acid method.

Next, the ethylene ($C_2H_4$) decomposition reaction is performed at 700° C. for 30 minutes, whereby the CNT is synthesized.

As post-treatment, the metal (Co—MgO) is removed from the CNT by the acid treatment, followed by drying at 200° C., whereby CNTs with a diameter of 30 nm can be obtained. At this stage, it is confirmed whether or not the CNT is synthesized and the Co—MgO is removed therefrom by means of the transmission electron microscope (TEM) (refer to FIGS. 3A and 3B described above).

(1') Step of Performing Affinity Treatment for the Surface of the Above-Described Formed Conductive Support (CNT)

A description will be made of the step (1') by taking a method of treating the surface of the conductive support (CNT) by a hot mixed acid (oxidizing strong acid) as an example of the affinity treatment; however, the present invention is not limited to this.

In this step, the CNTs obtained in the above-described step (1) are immersed into the mixed acid of the room temperature, and are treated while applying an ultrasonic wave thereto. In such a way, as shown in FIGS. 9 and 10, the hydroxyl groups (OH) can be introduced onto the surface of the conductive support (CNT).

(2) Step of Arranging the Metal Particles on the Above-Described Conductive Support (CNT) Subjected to the Affinity Treatment.

In the following, a description will be made of the step (2) by using an example of supporting the Pt as the metal particles on the CNTs, which are obtained in the above-described step (1') and subjected to the affinity treatment, in a highly dispersed state as shown in FIG. 1 and FIG. 10; however, the present invention is not limited to this.

First, in this step, the CNTs which are obtained in the above-described step (1') and subjected to the affinity treatment are dispersed in a mixed solution in which platinochloride, water and ethanol are blended in a predetermined ratio, and thereafter, are subjected to the degassing treatment.

Ammonia water is slowly dropped onto a resultant, followed by stirring for a predetermined time.

Washing and filtration are performed by using the ammonia water. Thereafter, firing is performed in He gas at 350° C. for 3 hours, whereby the Pt microparticles with a diameter of approximately 10 nm can be supported (fixed) on the CNTs in a highly dispersed state. In such a way, the CNTs on which the Pt particles are supported (also referred to as Pt-supported CNTs) can be obtained. At this stage, it is desirable to confirm whether or not desired Pt-supported CNTs are formed by observing the CNTs by means of the transmission electron microscope (TEM) (refer to FIGS. 4A and 4B described above).

(3) Step of Performing Inclusion, by the Porous Inorganic Material, for the Conductive Supports on which the Above-Described Metal Particles are Arranged In the following, a description will be made of the step (3) by using an example of performing the inclusion (coating) for the Pt-supported CNTs, which are obtained in the above-described step (2), by $SiO_2$ as the porous inorganic material; however, the present invention is not limited to this.

First, the Pt-supported CNTs obtained in the above-described step (2) are dispersed into the dehydrated ethanol (55° C.)

Next, 3-aminopropylethoxysilane (APTS) is slowly dropped on a resultant solution, followed by stirring for 30 minutes. In such a way, the APTS is selectively adsorbed to the CNTs.

Thereafter, TEOS, water and 1N—$HNO_3$aq are added to a resultant solution, followed by stirring for 1 hour.

Figure 19:
FIG. 19 shows a drawing of catalyst particles, in which Pt particles supported on the CNTs and the CNTs supporting the Pt particles thereon are subjected to the inclusion by $SiO_2$, the catalyst particles being obtained by performing the affinity treatment for the CNTs and by being fired at 350° C. in the embodiment (first preparation method) of the production method of the catalyst particles of the electrode material for the fuel cell according to the present invention, and the drawing being obtained by means of the transmission electron microscope (TEM).

Thereafter, the resultant is subjected to the alcohol washing and the centrifugal separation, followed by the vacuum drying, and is thereafter fired at 350° C. for 3 hours in Ar gas, whereby desired catalyst particles as shown in FIG. 19, in which the Pt particles supported on the CNTs and the CNTs supporting the Pt particles thereon are subjected to the inclusion by $SiO_2$, can be obtained. Meanwhile, the resultant is fired at 500° C. for 3 hours in the Ar gas, whereby desired catalyst particles as shown in FIG. 18, in which the Pt particles supported on the CNTs and the CNTs supporting the Pt particles thereon are subjected to the inclusion by $SiO_2$, can be obtained. It is desirable to confirm whether or not the desired catalyst particles are formed by observing the finally obtained catalyst particles by means of the transmission electron microscope (TEM). As understood from drawings of the catalyst particles by means of the transmission electron microscope (TEM), which are shown in FIG. 18 and FIG. 19, when the firing temperature is 350° C., the catalyst particles in which the entire CNTs are subjected to the inclusion by $SiO_2$ can be obtained, and when the firing temperature is raised to 500° C., the catalyst particles in which not the entire CNTs but the peripheries of the Pt particles supported on the CNTs are subjected to the inclusion by $SiO_2$ can be obtained. In examples to be described later, the catalyst particles in which the entire CNTs are subjected to the inclusion by $SiO_2$ were able to obtain better power generation performance while preventing the elution of the metal particles (Pt). This is considered to be because, in the catalyst particles of FIG. 18, a thickness of the $SiO_2$ spherical inclusion bodies on the peripheries of the Pt particles becomes thicker than that of $SiO_2$ that performs the inclusion for the entire CNTs since $SiO_2$ that performs the inclusion for the peripheries of the Pt particles becomes spherical inclusion bodies (with a so-called unsolved powder cluster shape). Hence, even the catalyst particles in which the peripheries of the Pt particles supported on the CNTs are subjected to the inclusion by $SiO_2$ become capable of obtaining better power generation performance by controlling the amount of $SiO_2$ that performs the inclusion, and moreover, can also reduce $SiO_2$. In these points, the catalyst particles are excellent.

Moreover, in the first preparation method including the above-described step (1'), with regard to the above-described steps (2) and (3), the catalyst particles can be fabricated by preparation methods shown in preparation concept diagrams of FIG. 11 and FIG. 12. Details are as described in Example 1 and Example 2, which are to be described later.

Regarding the preparation method (refer to Example 1 to be described later) shown in the preparation concept diagram of FIG. 11

(2) Step of Arranging the Metal Particles on the Above-Described Conductive Support (CNT) Subjected to the Affinity Treatment Such a CNT (referred to as an affinity support, and denoted as CNT by reference numeral 31 in FIG. 11) obtained in the above-described step (1') is dispersed into a solvent (acetone and the like) by ultrasonic treatment/stirring. To a resultant solution, a predetermined amount (within a range of 100 to 100000 mass parts with respect to 100 mass part of the CNT) of a platinochloride solution (within a range of 0.01 to 1.0 M concentrations) is added (Step S31), and is converted into a hydroxide by $NH_3$, followed by drying at a predetermined temperature (within 50 to 80° C.), whereby the platinum is supported on the CNT (denoted as Pt precursor/CNT by reference numeral 32 in FIG. 11) (Step S32). A sample thus obtained is put into a reducer solution (for example, $NaBH_4$ solution), is subjected to reduction at a predetermined temperature (within a range of room temperature to 40° C.), followed by another dry up. In such a way, as shown in FIG. 11, the CNT that supports (fixes) the Pt particles with a diameter of approximately 10 nm thereon in a highly dispersed state (this CNT is also referred to as the Pt-supported CNT, and is denoted as Pt/CNT by reference numeral 33 in FIG. 11). At this stage, it can be confirmed whether or not the desired Pt-supported CNT is formed by the observation by means of the transmission electron microscope (TEM) (refer to FIG. 4A and FIG. 4B, which are described above).

(3) Step of Performing Inclusion, by the Porous Inorganic Material, for the Conduct Support on which the Above-Described Metal Particles are Arranged Next, the sample (Pt-supported CNT) obtained in the above-described step (2) is dispersed into a dispersion medium (for example, a water/ethanol mixed solution) held at a predetermined temperature (within a range of 40 to 60° C.) in a warm bath, a precursor (for example, ethyl silicate (TEOS)) of the porous inorganic material is added thereto, and a hydrolysis/polymerization reaction is performed for a resultant solution for a predetermined time (approximately 0.5 to 2 hours) while sufficiently stirring the solution concerned (Step S33). In such a way, a catalyst precursor (denoted as $SiO_2$/Pt/CNT by reference numeral 34 in FIG. 11) in which the surface of the Pt/CNT is subjected to the inclusion (for example, silica coat) by the porous inorganic material can be obtained. In order to remove an unreacted precursor (for example, TEOS and the like) of the porous inorganic material, the sample is filtered, is washed sufficiently by an appropriate abluent (for example, acetone and the like), and is dried for one night in a thermostatic bath of a predetermined temperature (within a range of 40 to 80° C.). The catalyst precursor concerned is fired at a predetermined temperature (300 to 600° C.) for a predetermined time (approximately 1 to 2 hours) in an atmosphere of inert gas (for example, argon gas), and thereafter, is immersed into a strong acid solution (aqua regia), whereby platinum that is not coated is removed (Step S34). After such aqua regia treatment, the catalyst precursor is subjected to hydrogen reduction one more time at a predetermined temperature (300 to 600° C.) for a predetermined time (approximately 1 to 2 hours) in a flow of reduction gas (for example, hydrogen/argon gas), whereby the catalyst particles of the present invention can be obtained. In such a way, desired catalyst particles (denoted as coat-I by reference numeral 35 in FIG. 11), in which the Pt particles supported on the CNT and the CNT that supports the Pt particles thereon are subjected to the inclusion by $SiO_2$, can be obtained. It can be confirmed whether or not the desired catalyst particles are formed by observing the obtained catalyst particles by means of the transmission electron microscope (TEM) (refer to FIG. 18).

Regarding the preparation method (refer to Example 1 to be described later) shown in the preparation concept diagram of FIG. 12

(2) Step of Arranging the Metal Particles on the Above-Described Conductive Support (CNT) Subjected to the Affinity Treatment and Step of Performing Inclusion, by the Porous Inorganic Material, for the Conductive Support on which the Above-Described Metal Particles are Arranged The CNT 41 already subjected to the affinity treatment is added to a platinochloride solution of a predetermined temperature (within a range of room temperature to 40° C.) and with a predetermined concentration (within a range of 0.01 to 1.0M), and is dispersed well thereinto by repeating ultrasonic wave treatment and stirring. To the aqueous solution thus obtained, a precipitant (reducer) (for example, ammonia water) is added, whereby a platinum hydroxide is formed on the CNT (denoted as Pt hydroxide/CNT by reference numeral 42 in FIG. 12). While keeping a resultant sample as it is, the resultant sample concerned is stirred for a predetermined time (approximately 0.5 to 2 hours), and thereafter, is taken out after unreacted platinochloride is sucked and filtered for removal thereof. Thereafter, the sample is dispersed one more time into a precipitant (reducer) (for example, ammonia aqueous solution). A container containing a resultant solution is moved into a warm bath of a predetermined temperature (40 to 60° C.), and the solution is stirred for a predetermined time (approximately 0.5 to 1 hour). Thereafter, a precursor of the porous inorganic material is added to the solution concerned (refer to concept views of FIG. 10 and FIG. 12, in which the CNT is coated with the APTS) (Step S42). Here, with reference to FIG. 10, for the precursor of the porous inorganic material, one such as aminopropyltriethoxysilane (APTS), which is capable of reacting with the hydroxyl groups introduced into the CNT by the affinity treatment, is used. Moreover, after elapse of a predetermined time (approximately 0.5 to 1 hour), a precursor (for example, TEOS and the like) of the porous inorganic material is added to the solution, and an obtained mixture is subjected to the hydrolysis/polymerization reaction for a predetermined time (approximately 0.5 to 2 hours) (Step S43). In such a way, a catalyst precursor (denoted as $SiO_2$/Pt hydroxide/CNT by reference numeral 43 in FIG. 12), in which the surface of the Pt hydroxide/CNT is subjected to the inclusion (for example, silica coat) by the porous inorganic material, can be obtained. Thereafter, the sample is taken out by the centrifugal separation, and is dried for one night in a warm bath of a predetermined temperature (40 to 80° C.). The catalyst precursor concerned is fired at a predetermined temperature (300 to 600° C. for a predetermined time (approximately 1 to 3 hours) in an atmosphere of inert gas (for example, argon gas), is thereafter subjected to aqua regia treatment similar to that described in FIG. 11, and is subjected to hydrogen reduction one more time at a predetermined temperature (300 to 600° C.) for a predetermined time (approximately 1 to 3 hours) in a flow of reduction gas (for example, hydrogen/argon gas and the like), whereby the catalyst particles of the present invention can be obtained. In such a way, desired catalyst particles (denoted as coat-II by reference numeral 45 in FIG. 12), in which the Pt particles and the CNT that supports the Pt particles thereon are subjected to the inclusion by $SiO_2$, can be obtained. It can be confirmed whether or not the desired catalyst particles are formed by observing the obtained catalyst particles by means of the transmission electron microscope (TEM) (refer to FIG. 19).

Next, in the above-described first preparation method, the contacting step (4) of mutually contacting the conductive inorganic materials which perform the inclusion for the above-described metal particles and the step (5) of further performing the inclusion for the mutually contacting conductive inorganic materials by the porous inorganic material may be performed after the step (3) of performing the inclusion, by the porous inorganic materials, for the above-described conductive support on which the above-described metal particles are arranged. Also in this case, it is more desirable to perform the above-described step (1').

In accordance with such a production method (first preparation method), the step of performing the inclusion for not only the metal particles but also the conductive support by the porous inorganic material such as $SiO_2$ is performed, whereby the contact of the conductive support (CNT) can be maintained. Moreover, a mode is formed, in which the inclusion by the porous inorganic material such as $SiO_2$ covers not only the metal particles but also the entire conductive support (refer to FIG. 1A). Hence, it is desirable that the conductive supports be subjected to the inclusion while being energized (enhancing the contact thereamong) (refer to FIG. 1A) without performing the inclusion for peripheries (sections from this electrode material to terminals) of grids by the porous inorganic material such as $SiO_2$.

The above-described respective steps (1) to (3) (including the case of performing the above-described step (1') are as described above, and accordingly, a description thereof will be omitted here. Hence, in the following, a description will be made of the steps (4) and (5).

(4) Contacting Step of Mutually Contacting the Conductive Supports in which the Above-Described Metal Particles are Subjected to the Inclusion by the Porous Inorganic Material In this step, among the plurality of catalyst particles obtained in the above-described step (3), portions of the conductive supports, which are not subjected to the inclusion by the porous inorganic material, are brought into contact with one another. In such a way, a conductive network (three-dimensional network) among the catalyst particles can be formed, and the conductivity can be further enhanced. Specifically, the conductive supports can be subjected to the inclusion while being energized (enhancing the contact thereamong) without performing the inclusion for the peripheries (sections from this electrode material to the terminals) of the grids by the porous inorganic material such as $SiO_2$.

(5) Step of Further Performing the Inclusion for the Plurality of Mutually Contacting Conductive Supports by the Porous Inorganic Material In this step, the plurality of mutually contacting conductive supports are further subjected to the inclusion by the porous inorganic material. Specifically, the reason is that the portions brought into contact with one another in the above-described step (4) are subjected to the inclusion by the porous inorganic material, and are fixed, whereby the conductive network (three-dimensional network) among the catalyst particles can be surely formed. A method of such inclusion by the porous inorganic material can be performed in a similar way to that described in the above-described step (3). Accordingly, in the following, a description will be briefly made by taking a specific example.

First, catalyst particle aggregates in which the catalyst particles obtained in the above-described step (4) are brought into contact with one another are added with TEOS, water and 1N—$HNO_3$aq, followed by stirring for 1 hour.

Thereafter, a resultant is subjected to the alcohol washing and the centrifugal separation, followed by the vacuum drying, and is thereafter fired at 350° C. for 3 hours in Ar gas. As described above, the step of performing the inclusion for not only the Pt particles but also the CNTs by $SiO_2$ is performed, whereby the contact among the CNTs can be maintained. Moreover, the aggregates of the catalyst particles, which are composed in such a manner that the $SiO_2$ inclusion covers (includes) not only the Pt particles but the entire CNTs, can be obtained.

Next, with reference to FIG. 2A, another typical embodiment (second preparation method) of the production method of the electrode material for the fuel cell according to the present invention, and particularly, of the catalyst particles thereof is characterized by including:

(1) the step of synthesizing nanoparticles containing metal (particles) and a catalyst component;

(2) the step of synthesizing spherical objects of a porous inorganic material, which perform inclusion for the above-descried nanoparticles; and (3) the step of forming columnar and/or tubular conductive supports by using a catalyst component in the nanoparticles subjected to the inclusion by the spherical objects.

In accordance with such a production method, the contact between the metal particles and the conductive supports can be surely performed by the inclusion by the porous inorganic material such as $SiO_2$, and the elution of the metal particles can be prevented. Moreover, the contact of the conductive supports (CNTs) can be maintained. Moreover, conductive support portions which grow and extend from each spherical object of the porous inorganic material to the outside thereof are not subjected to the inclusion by the porous inorganic material, and accordingly, the production method is excellent in that the electron conduction in the sections from the metal particles having the catalytic activity to the current collector can be more surely ensured (refer to FIG. 2). Moreover, the production method can be said to be excellent also in that it is easy to control the length of the conductive supports, which is necessary for the sections from the metal particles to the current collector.

(1) Step of Synthesizing Nanoparticles Containing Metal (Particles) and a Catalyst Component The step of synthesizing nanoparticles containing metal (particles) and a catalyst component is not particularly limited, and a variety of synthesis methods of the nanoparticles, which are conventionally known in public, can be appropriately used.

In this step, for example, (i) a procedure may be adopted, in which a reversed micelle solution containing a (noble) metal ion aqueous solution in micelle insides and a reversed micelle solution containing a catalyst metal ion aqueous solution in micelle insides are mixed with each other, microparticle formers (containing reducers) for (noble) metal ions concerned and catalyst metal ions concerned is added to a mixed solution, and nanoparticles containing metal (particles) and nanoparticles containing a catalyst are synthesized with each other. Alternatively, (ii) a procedure may be adopted, in which such a solution in which the microparticle former (containing the reducer) for the (noble) metal particles is added to the reversed micelle solution containing the (noble) metal ion aqueous solution in the micelle insides and another solution in which the microparticle former (containing the reducer) for the catalyst metal is added to the reversed micelle solution containing the catalyst metal ion aqueous solution in the micelle insides are mixed together, and the nanoparticles containing the (noble) metal (particles) and the nanoparticles containing the catalyst component are synthesized with each other. Note that "the reversed micelle solution" for use in the present invention is a solution containing micelles formed in such a manner that amphiphiles such as surfactant molecules are mixed with an organic solvent, and that the amphiphiles are aggregated, and containing a noble metal ion aqueous solution and/or a transition metal ion aqueous solution in the micelles concerned. In an organic solvent phase, hydrophobic groups are directed to the outside, that is, to an organic solvent phase side, hydrophilic groups are oriented to the inside, and orientations of the hydrophobic groups and the hydrophilic groups are reverse to those in the case of an aqueous solvent phase. From such a structure as described above, the name of the reversed micelle solution is derived.

In the present invention, the solution containing the above-described (noble) metal ions and the solution containing the above-described catalyst metal ions are used as the reversed micelle solutions, and a size of the micelles can be adjusted depending on types and loadings of a solvent and a surfactant, which are for use. For example, when a reversed micelle solution in which a diameter of the micelles is 20 to 100 nm is used, nanoparticles containing (noble) metal having a desired average particle diameter and nanoparticles containing catalyst metal having a desired average particle diameter can by synthesized with each other.

A variety of substances are usable as the organic solvent usable for forming the reversed micelles. Mentioning examples, there are cyclohexane, methylcyclohexane, cycloheptane, heptanol, octanol, dodecyl alcohol, cetyl alcohol, isooctane, n-heptane, n-hexane, n-decane, benzene, toluene, xylene, and the like. Moreover, alcohol and the like may be added for the purpose of adjusting a size of water droplets in the reversed micelle solution. Two or more types of the organic solvents can be used in combination, as well as one type thereof is used singly. Moreover, the organic solvent can be used for preparing both of the reversed micelle solution (A) and the reversed micelle solution (B). Furthermore, in the case of supplying, as the reversed micelle solutions, the reducer for the noble metal ions and the precipitant for the transition metal ions, the organic solvent can also be used for preparing these solutions. In this case, the organic solvent for use in either of the reversed micelle solutions and the organic solvent for use in the other reversed micelle solution may be the same or different from each other.

As the surfactant for forming the reversed micelle solution, there can be mentioned polyoxyethylene nonylphenylether, magnesium laurate, zinc caprate, zinc myristate, sodium phenylstearate, aluminum dicaprylate, tetraisoamyl ammonium thiocyanate, n-octadecyl tri-n-butyl ammonium formate, n-amyl tri-n-butyl ammonium iodide, sodium bis(2-ethylhexyl) succinate, sodium dinonylnaphthalenesulfonate, calcium cetylsulfate, dodecylamine oleate, dodecylamine propionate, cetyltrimethylammonium bromide, stearyltrimethylammonium bromide, cetyltrimethylammonium chloride, stearyltrimethylammonium chloride, dodecyltrimethylammonium bromide, octadecyltrimethylammonium bromide, dodecyltrimethylammonium chloride, octadecyltrimethylammonium chloride, didodecyldimethylammonium bromide, ditetradecyldimethylammonium bromide, didodecyldimethylammonium chloride, ditetradecyldimethylammonium chloride, (2-octyloxy-1-octyloxymethyl)polyoxyethylene ethyl ether, and the like. The surfactant can also be used for preparing any reversed micelle solution, and two or more types thereof can also be used in combination. Note that the loading of the surfactant with respect to the organic solvent is 10 to 300 mass parts with respect to 100 mass parts of the organic solvent. When the loading of the surfactant falls down below 10 mass parts, it becomes difficult to form the reversed micelles. Meanwhile, when the loading exceeds 300 mass parts, this is disadvantageous from a viewpoint that rod-like micelles are formed, which results in that the noble metal particles are not coagulated while controlling an average particle diameter thereof to a specific size.

In the method of the present invention, the type of the noble metal ions is not limited, and the above-described noble metals can be used. In conversion to metal, the noble metal ion concentrations are preferably 0.1 to 50 mass %, and more preferably 0.5 to 20 mass %. Moreover, also as the reducer for the noble metal ions, reducers of similar types to those described above can be used. In a similar way, also as the precipitant for the transition metal ions and the transition metal, the precipitants described above can be used.

When the reducer is added to the reversed micelles (A), the (noble) metal ions become the (noble) metal particles, and when the precipitant is added to the reversed micelle solution (B), the catalyst metal ions become the catalyst (metal) particles. Accordingly, with regard to an order of adding the reversed micelle solution (A), the reversed micelle solution (B), the reducer and the precipitant, there are: (i) a method of adding the reducer to the reversed micelle solution (A), adding the reversed micelle solution (B) to such a mixed solution, and subsequently adding the precipitant to such a further mixed solution; as well as (ii) a method of first adding the reducer to a mixed solution of the reversed micelle solution (A) and the reversed micelle solution (B), and later adding the precipitant to the mixed solution; (iii) a method of first adding the precipitant to the mixed solution of the reversed micelle solution (A) and the reversed micelle solution (B), and later adding the reducer to the mixed solution; (iv) a method of adding the precipitant to the reversed micelle solution (B), subsequently adding the reversed micelle solution (A) to such a mixed solution, and further adding the reducer to such a further mixed solution; and the like. At this time, when the conductive support is added to the solutions obtained through the above-described processes (i) to (iv), both metal particles of the (noble) metal and the catalyst metal are complexed in the micelles, and as a result, nanoparticles in which the (noble) metal and the catalyst metal are complexed can be synthesized.

It is preferable to synthesize the nanoparticles in such a manner that the reversed micelle solution (A) and/or the reversed micelle solution (B) is mixed/stirred with the conductive support and then a reaction is caused in an obtained solution at 70 to 100° C. for 3 to 12 hours. In accordance with this condition, the synthesis of the nanoparticles can be surely performed.

The above-described microparticle former is not particularly limited as long as it can effectively exert a desired function to form the microparticles, and for example, CTAC and the like are mentioned. A usage amount of the above-described microparticle former is not particularly limited, and an amount by which the microparticle former can effectively exert the desired function to form the microparticles just needs to be appropriately decided.

The reducer for the above-described metal (particles) is not particularly limited as long as it can effectively exert a desired function to reduce the metal, and for example, hexanol and the like are mentioned. A usage amount of the above-described reducer is not particularly limited, and an amount by which the reducer can effectively exert the desired function to reduce the metal just needs to be appropriately decided.

The reducer for the above-described catalyst component is not particularly limited as long as it can effectively exert a desired function to reduce the catalyst metal component, and for example, hydrazine, triethylamine and the like are mentioned. A usage amount of the above-described catalyst reducer is not particularly limited, and an amount by which the reducer can effectively exert the desired function to reduce the catalyst just needs to be appropriately decided.

In the following, a description will be made of an example of using Pt as the metal particles, and using a nickel (Ni) compound as the catalyst metal compound; however, the present invention is not limited to this.

In this step, as shown by Step S11 in FIG. 5A, for example, as (i) $H_2PtCl_6$aq/$Ni(NO_3)_2$aq-series ME, microparticle formers as illustrated in the following (a) to (c) are further added to a mixture of $H_2PtCl_6$aq and $Ni(NO_3)_2$aq, whereby nanoparticles of the Ni compound containing desired Pt particles can be synthesized.

Here, as the above-described microparticle former (containing the reducer), for example, there are mentioned: (a) CTAC+hexanol (reducer for Pt), hydrazine (reducer for Ni) (minimum) (NP-1); (b) CTAC+hexanol (reducer for Pt), hydrazine (reducer for Ni) (molar amount 10 times the above-described NP-1) (NP-4); (c) CTAC+hexanol (reducer for Pt), triethylamine (reducer for Ni) (NP-3); and the like.

Alternatively (ii) $H_2PtCl_6$aq-series ME and $Ni(NO_3)_2$aq-series ME are prepared separately, and both of the MEs are combined with each other, whereby the nanoparticles of the Ni compound containing the Pt particles can be synthesized.

Here, for example, the above-described $H_2PtCl_6$aq-series ME can be prepared by adding, to $H_2PtCl_6$aq, microparticle formers as illustrated in the following (d) and (e).

As the above-described microparticle formers, for example, there are mentioned: (d) ammonia (NP-2); (e) CTAC+hexanol (NP-5); and the like.

For example, the above-described $Ni(NO_3)_2$aq-series ME can be prepared by adding, to $Ni(NO_3)_2$aq, microparticle formers as illustrated in the following (f) and (g).

As the above-described microparticle formers, for example, there are mentioned: (f) hydrazine (NP-2); triethylamine (NP-5); and the like.

Note that the $H_2PtCl_6$aq-series ME and the $Ni(NO_3)_2$aq-series ME are prepared separately, and the NP-2 of both of the MEs is mutually combined or the NP-5 thereof is mutually combined in the case of combining both of the MEs, whereby the nanoparticles of the Ni compound containing the Pt particles just need to be synthesized.

(2) Step of Synthesizing the Spherical Objects of the Porous Inorganic Material, which Perform Inclusion for the Above-Described Nanoparticles In this step, a precursor of the porous inorganic material, a basic catalyst for hydrolysis of the precursor, and water are added to the above-described nanoparticles, and hydrolysis/polycondensation is performed for an obtained mixture, whereby the spherical objects of the porous inorganic material, which perform the inclusion for the above-described nanoparticles, can be synthesized.

Here, as the precursor of the above-described porous inorganic material, the silane compounds as described above, and the like can be mentioned (details thereof will be omitted since they are as already illustrated). A loading of the precursor of the above-described porous inorganic material is not particularly limited, and an amount by which a desired porous inorganic material can be formed just needs to be used.

The basic catalyst for the hydrolysis of the precursor differs depending on a synthesis procedure of the nanoparticles, and accordingly, it is desirable to use a basic catalyst suitable for each of the precursors. Specifically, ammonia, triethylamine and the like are mentioned; however, the basic catalyst is not limited to these. A usage amount of the above-described basic catalyst is not particularly limited, and an amount by which a desired catalytic function can be effectively exerted just needs to be used.

In the following, a description will be made of an example of using $SiO_2$ as the porous inorganic material; however, the present invention is not limited to this.

Figure 5A:
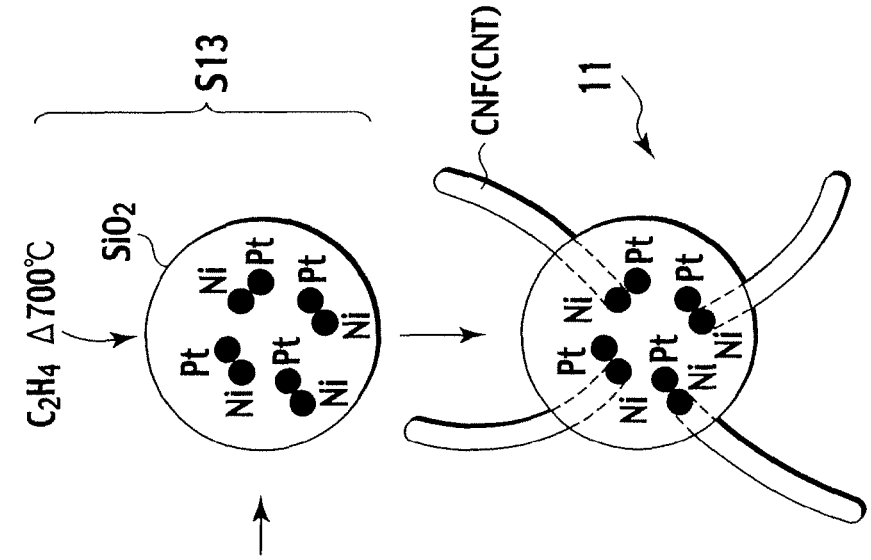
FIG. 5A is a process schematic view specifically showing another embodiment (second preparation method) of the production method of the catalyst particles of the electrode material for the fuel cell according to the present invention.
Figure 5B:
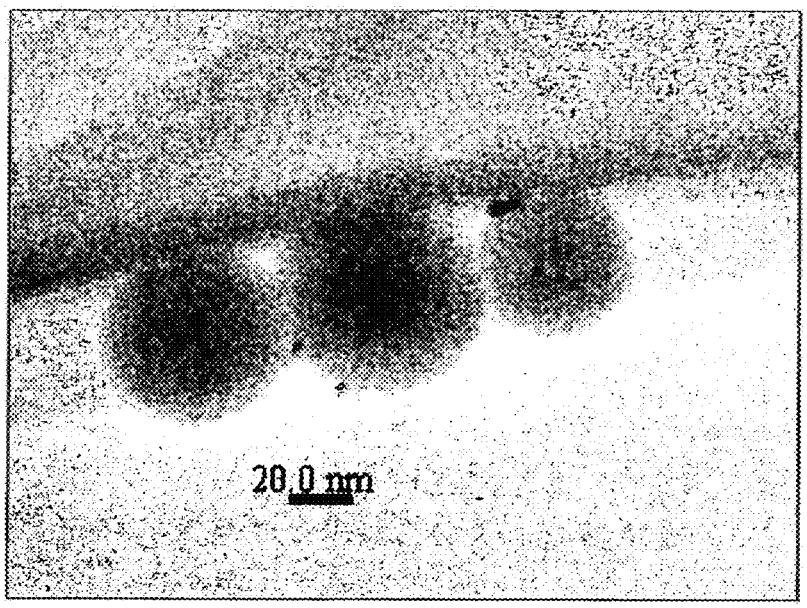
FIG. 5B shows a drawing of spherical silica-coat Pt—Ni particles (NP-1) after being fired in an air atmosphere, which are obtained by the another embodiment (second preparation method) of the production method of the catalyst particles of the electrode material for the fuel cell according to the present invention, the drawing being obtained by means of the transmission electron microscope (TEM).
Figure 5C:
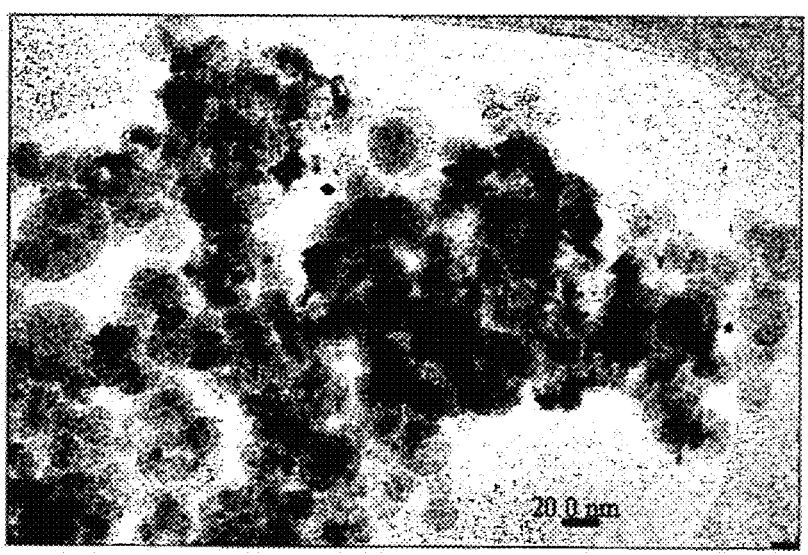
FIG. 5C shows a drawing of spherical silica-coat Pt—Ni particles (NP-2) after being fired in the air atmosphere, which are obtained by the another embodiment (second preparation method) of the production method of the catalyst particles of the electrode material for the fuel cell according to the present invention, the drawing being obtained by means of the transmission electron microscope (TEM).
Figure 5D:
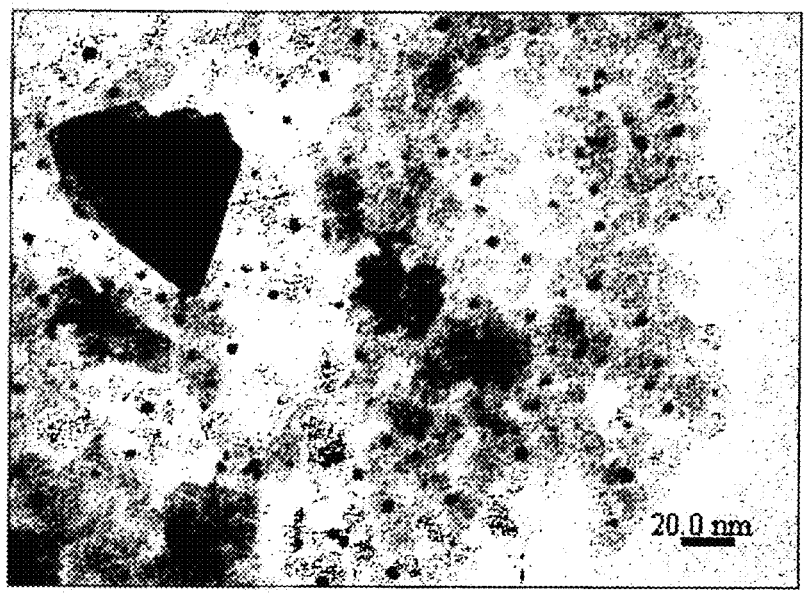
FIG. 5D shows a drawing of spherical silica-coat Pt—Ni particles (NP-3) after being fired in the air atmosphere, which are obtained by the another embodiment (second preparation method) of the production method of the catalyst particles of the electrode material for the fuel cell according to the present invention, the drawing being obtained by means of the transmission electron microscope (TEM).
Figure 5E:
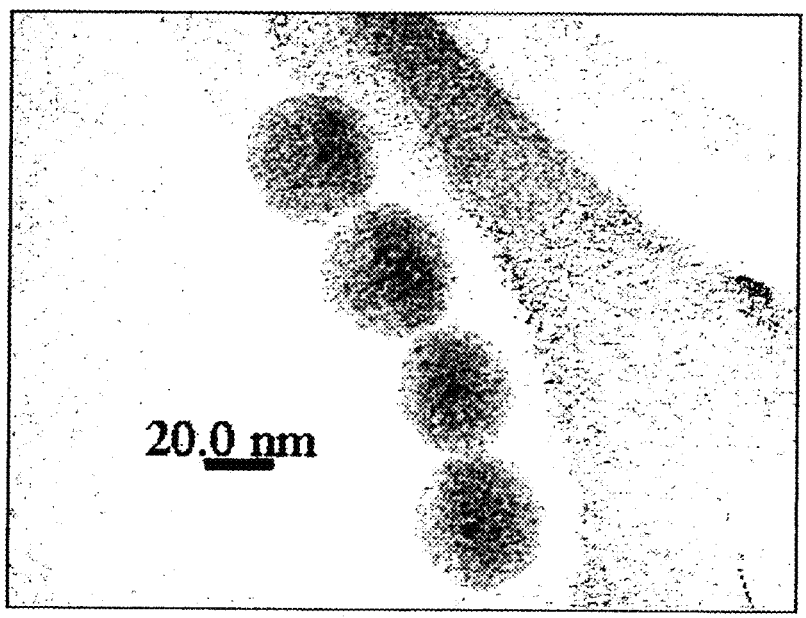
FIG. 5E shows a drawing of spherical silica-coat Pt—Ni particles (NP-4) after being fired in the air atmosphere, which are obtained by the another embodiment (second preparation method) of the production method of the catalyst particles of the electrode material for the fuel cell according to the present invention, the drawing being obtained by means of the transmission electron microscope (TEM).
Figure 5F:
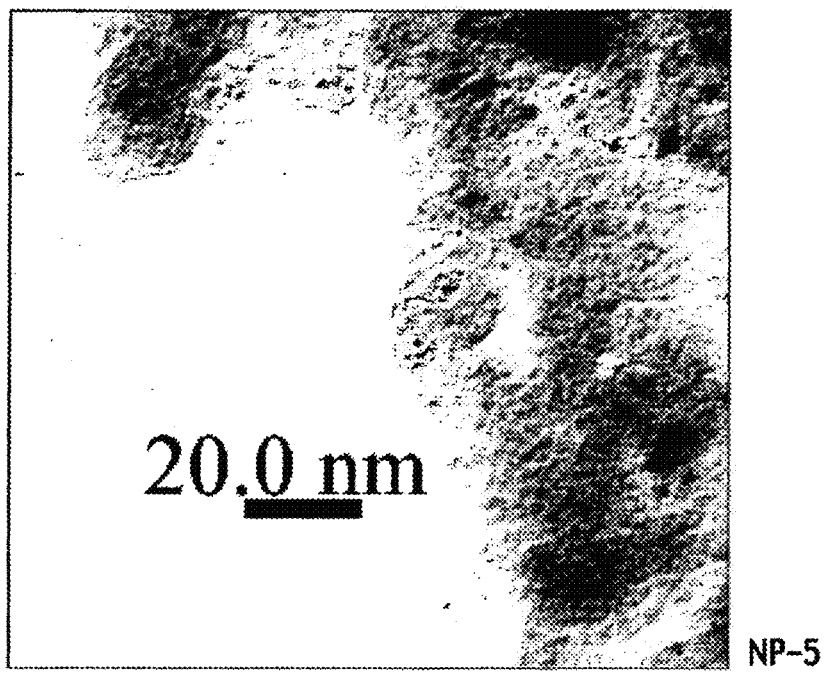
FIG. 5F shows a drawing of spherical silica-coat Pt—Ni particles (NP-5) after being fired in the air atmosphere, which are obtained by the another embodiment (second preparation method) of the production method of the catalyst particles of the electrode material for the fuel cell according to the present invention, the drawing being obtained by means of the transmission electron microscope (TEM).

In this step, as shown by Step S12 in FIG. 5A, to the above-described solution containing the nanoparticles, which is obtained in the above-described step (1), there are added: the TEOS as the precursor of the porous inorganic material; and the (above-described NP-1,3,4) ammonia and the (above-described NP-2,5) trithylamine, which are the basic catalysts for the hydrolysis of the TEOS, and the hydrolysis/condensation reaction is performed for an obtained mixture, whereby spherical silica-coat Pt—Ni particles are synthesized. Drawings of the obtained spherical silica-coat Pt—Ni particles (NP-1 to NP-5) after being fired in an air atmosphere, which are obtained by the transmission electron microscope (TEM), are shown in FIG. 5B to FIG. 5F. In the NP-1 shown in FIG. 5B, a Pt supported amount was 4.2 wt %, and a Ni supported amount was 0.2 wt %. In the NP-2 shown in FIG. 5C, a Pt supported amount was 1.0 wt %, and a Ni supported amount was 1.3 wt %. In the NP-3 shown in FIG. 5D, a Pt supported amount was 1.9 wt %, and a Ni supported amount was 13.3 wt %. In the NP-4 shown in FIG. 5F, a Pt supported amount was 4.0 wt %, and a Ni supported amount was 2.0 wt %. In the NP-5 shown in FIG. 5F, a Pt supported amount was 0.6 wt %, and a Ni supported amount was 6.3 wt %.

(3) Step of Forming the Columnar and/or Tubular Conductive Support by Using the Catalyst Component in the Nanoparticles Subjected to Inclusion by the Above-Described Spherical Objects The step of forming the columnar and/or tubular conductive support by using the catalyst component in the nanoparticles subjected to the inclusion by the above-described spherical objects is not particularly limited, and the columnar and/or tubular conductive support can be formed by a similar method to that shown in the step (1) of the above-described first preparation method, and accordingly, a detailed description thereof will be omitted here.

In the following, the description will be made of the step (3) by using an example of forming the CNTs as the conductive supports; however, the present invention is not limited to this at all.

In this step, as shown by Step S13 in FIG. 5A, by using Ni (catalyst) in the spherical silica-coat Pt—Ni particles obtained in the above-described step (2), the ethylene ($C_2H_4$) decomposition reaction is performed at 700° C. for 30 minutes, whereby the CNTs are synthesized. In such a way, as shown in FIG. 2A, the CNTs are gradually formed on the Pt—Ni particles 15 in the spherical silica-coat Pt—Ni particles (for the spherical silica, refer to reference numeral 17, and for the Pt—Ni particles coated with the spherical silica 17, refer to reference numeral 15), and then the catalyst particles 11 are formed, which are composed in such a manner that the CNTs 13 are formed to the outside of the spherical silica 17.

Figure 6A:
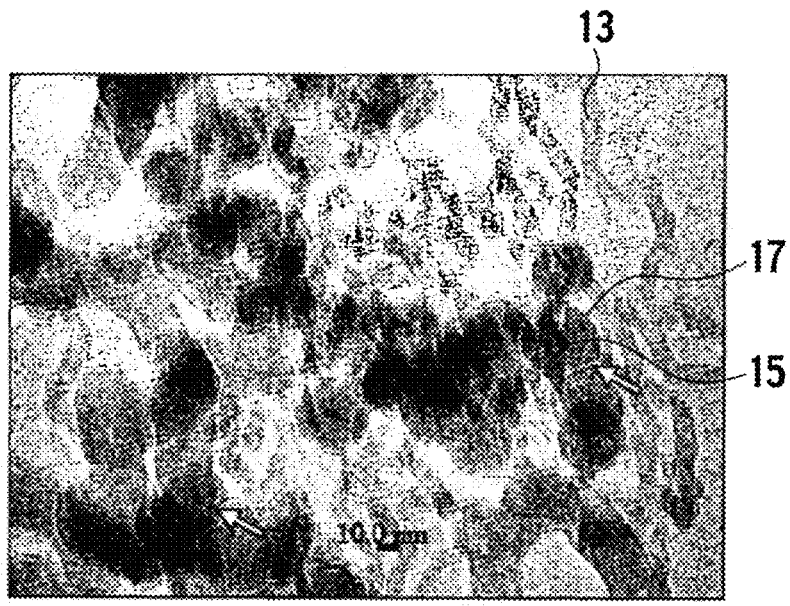
FIG. 6A shows a drawing of catalyst particles (NP-2), which are composed by creating the CNTs to an outside of the spherical silica, and are obtained by the another embodiment (second preparation method) of the production method of the catalyst particles of the electrode material for the fuel cell according to the present invention, the drawing being obtained by means of the transmission electron microscope (TEM).
Figure 6B:
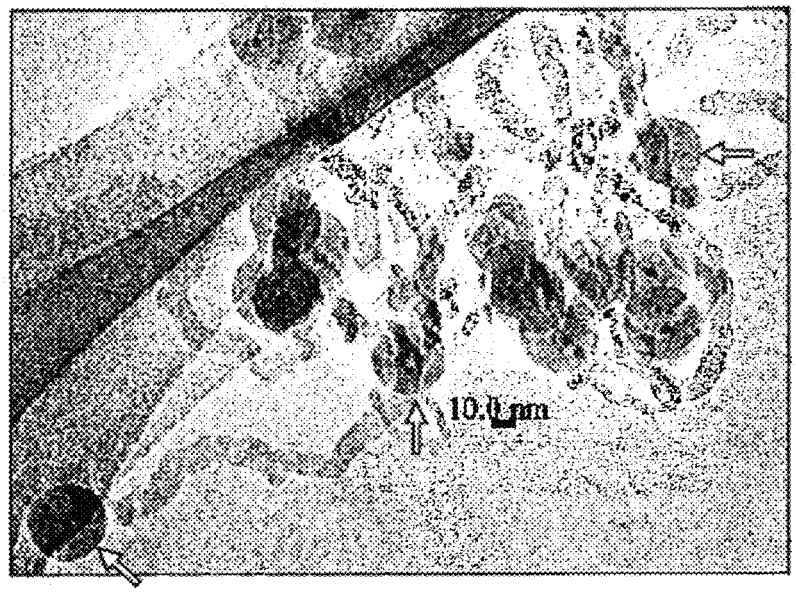
FIG. 6B shows a drawing of the catalyst particles (NP-2), which are composed by creating the CNTs to the outside of the spherical silica, and are obtained by the another embodiment (second preparation method) of the production method of the catalyst particles of the electrode material for the fuel cell according to the present invention, the drawing being obtained by means of the transmission electron microscope (TEM).

A state of the obtained catalyst particles can be confirmed by means of the transmission electron microscope (TEM) Drawings of NP-2 samples of the obtained catalyst particles, which are obtained by means of the transmission electron microscope (TEM), are shown in FIG. 6A and FIG. 6B. Tip points of arrows in the drawings indicate the spherical silica-coat Pt—Ni particles (NP-2), and black points in the spherical silica-coat Pt—Ni particles correspond to the Pt—Ni particles, and it is understood that the carbon is formed and grown from the Ni catalyst of the black points as starting points. In particular, a state can be clearly observed, where the carbon nanotubes are formed from the portions of the black points (Ni catalyst particles) indicated by the arrows in two spots of FIG. 6B.

Next, another typical embodiment (third preparation method) of the production method of the electrode material for the fuel cell according to the present invention, and particularly, of the catalyst particles thereof is characterized by including:

(1) the step of synthesizing a columnar porous inorganic material; and
(2) the step of introducing metal particles into the columnar porous inorganic material.

In accordance with such a production method, a form can be made, in which the metal (series of particles) such as Pt filled into a hollow inside of the columnar and hollow porous inorganic material (for example, $SiO_2$) composes the columnar and/or tubular conductive support, and in addition, composes the metal particles (catalyst), and the metal particles are subjected to the inclusion by the columnar and hollow porous inorganic material (for example, $SiO_2$) as the porous inorganic material. The third preparation method is excellent in the above-described point, as well as in that the production steps can be reduced. A description will be made below of each of the steps.

(1) Step of Synthesizing the Columnar Porous Inorganic Material

The step of synthesizing the columnar porous inorganic material is not particularly limited, and the columnar porous inorganic material can be produced by a method conventionally known in public.

In the following, a description will be made of such a synthesis step by taking, as an example, synthesis of a hexagonal column-like hollow $SiO_2$ tube as the columnar conductive support; however, the present invention is not limited to this.

Figure 7A:
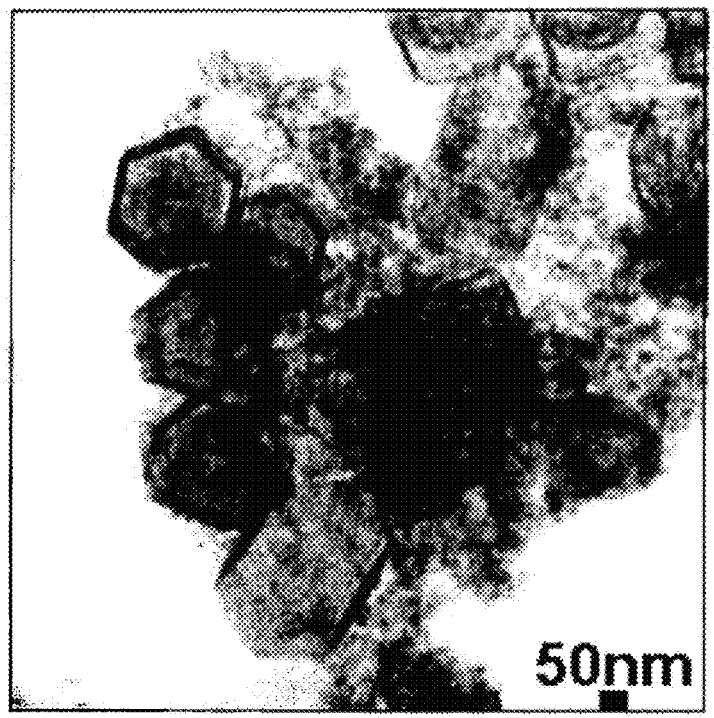
FIG. 7A shows a drawing of a hexagonal column-like hollow $SiO_2$ tube, the drawing being obtained by means of the transmission electron microscope (TEM).
Figure 7B:
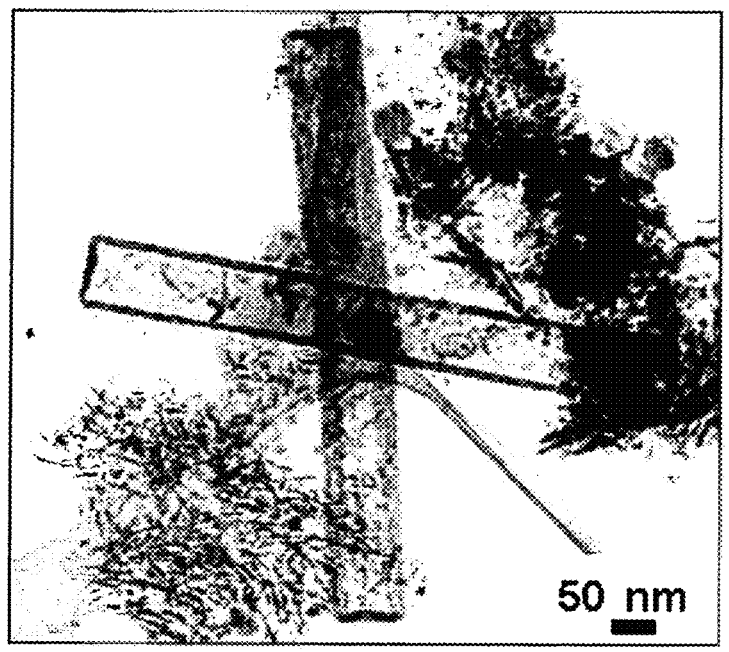
FIG. 7B shows a drawing of a hexagonal column-like hollow $SiO_2$ tube, the drawing being obtained by means of the transmission electron microscope (TEM).

In this step, appropriate amounts of cobalt nitrate ($Co(NO_3)_3$), hydrazine ($NH_2$—$NH_2$), TEOS, triethanolamine (TEA) and ammonia ($NH_3$) are added together, are made to react with one another, and are fired at a predetermined temperature in an air atmosphere, whereby the hexagonal column-like hollow $SiO_2$ tube can be synthesized. Drawings of the obtained hexagonal column-like hollow $SiO_2$ tube, which are obtained by means of the transmission electron microscope (TEM), are shown in FIG. 7A and FIG. 7B. The above-described production conditions are controlled appropriately, whereby an inner diameter and tube length of a hollow tube of the hexagonal column-like hollow $SiO_2$ tube can be adjusted appropriately.

(2) Step of Introducing the Metal Particles into the Columnar Porous Inorganic Material The step of introducing the metal particles into the columnar porous inorganic material is not particularly limited, and the catalyst particles can be produced by using a method conventionally known in public.

In the following, a description will be made of such an introduction step by taking, as an example, a method of forming desired catalyst particles by a Pt post-impregnation method by using Pt as the metal particles; however, the present invention is not limited to this.

First, a solution containing the hexagonal column-like hollow $SiO_2$ tube synthesized in the above-described step (1) is treated with alcohol (for example, ethanol), whereby the surfactant is removed (alcohol washing treatment).

Next, the hexagonal column-like hollow $SiO_2$ tube is degassed and dried.

The hexagonal column-like hollow $SiO_2$ tube after being degassed and dried is impregnated into the $H_2PtCl_6$ solution, and is subjected to vacuum degassing, whereby $H_2PtCl_6$ is introduced into the hollow inside of the hexagonal column-like hollow $SiO_2$ tube.

Figure 7C:
FIG. 7C shows a drawing of catalyst particles composed by supporting (performing inclusion) Pt on a hollow inside of the hexagonal column-like hollow $SiO_2$ tube, the drawing being obtained by means of the transmission electron microscope (TEM).
Figure 7D:
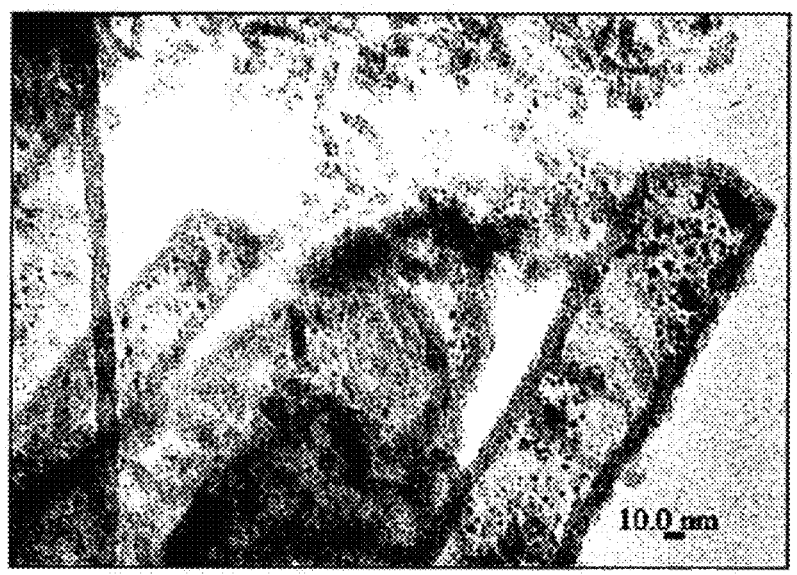
FIG. 7D shows a drawing of catalyst particles composed by supporting (performing inclusion) Pt on the hollow inside of the hexagonal column-like hollow $SiO_2$ tube, the drawing being obtained by means of the transmission electron microscope (TEM).

Next, the hexagonal column-like hollow $SiO_2$ tube is fired at 500° C. for 5 hours in inert gas (for example, argon gas), whereby the Pt particles are supported on the hollow inside of the hexagonal column-like hollow $SiO_2$ tube. In such a way, a form is made, in which the series of the Pt (metal) particles introduced into the hollow inside of the hexagonal column-like hollow $SiO_2$ tube composes the columnar conductive support, and in addition, composes the metal particles (catalyst), and the metal particles are subjected to the inclusion by such prism-like hollow $SiO_2$ as the porous inorganic material. Moreover, the Pt (metal) particles may be filled into the entire hollow inside of the hexagonal column-like hollow $SiO_2$ tube, or may be supported on an inner wall of the hollow inside to form an inner wall membrane. In any of the cases, during an operation of the fuel cell, supply and discharge of the fuel gas to the Pt catalyst are possible through pores of the hexagonal column-like hollow $SiO_2$. However, from a viewpoint of preventing the elution of the Pt (metal) particles, it can be said that a configuration of the former case is more desirable. Drawings of the catalyst particles composed by supporting (performing inclusion) Pt on the hollow inside of the obtained hexagonal column-like hollow $SiO_2$ tube, which are obtained by means of the transmission electron microscope (TEM), are shown in FIG. 7C and FIG. 7D.

The above-described step (2) is not particularly limited. For example, as another method of the Pt post-impregnation method, a method may be adopted, in which the above-described alcohol washing treatment is omitted, $H_2PtCl_6$ as a type of a metal particle raw material, and the like are impregnated into the hexagonal column-like hollow $SiO_2$ tube while leaving the surfactant, followed by vacuum degassing and firing, whereby Pt is supported on the hexagonal column-like hollow $SiO_2$ tube, and the desired catalyst particles are formed.

Moreover, besides the above-described Pt post-impregnation method, a Pt ion pre-introduction method can be used. In the Pt pre-introduction method, at the time of forming the hexagonal column-like hollow $SiO_2$ tube in the above-described step (1), $H_2PtCl_6$ as a type of the metal particle raw material, and the like are added in advance in addition to the above-described $Co(NO_3)_3$, hydrazine ($NH_2$—$NH_2$), TEOS, TEA and $NH_3$ as the above-described raw materials for forming the hexagonal column-like hollow $SiO_2$ tube. Then, at the same time when the hexagonal column-like hollow $SiO_2$ tube is formed, Pt is reduced and precipitated by hydrazine ($NH_2$—$NH_2$). In this method, Pt is precipitated not only on the hollow inside of the hexagonal column-like hollow $SiO_2$ tube but also on an outer surface of the tube concerned. Therefore, it is more desirable to form one including only such noble metal that effectively functions as the electrode catalyst for the fuel cell in such a manner that the Pt particles on the outer surface of the tube are removed. The Pt particles on the outer surface of the tube are removable, for example, by aqua regia treatment.

Moreover, a Pt particle pre-introduction method can also be used. As the Pt particle pre-introduction method, a method can be adopted, in which, at the time of forming the hexagonal column-like hollow $SiO_2$ tube of the above-described (1), $H_2PtCl_6$ as a type of the metal particle raw material, and the like are added in advance in addition to $Co(NO_3)_3$, hydrazine ($NH_2$—$NH_2$), TEOS, TEA and $NH_3$, which are raw materials of the above-described hexagonal column-like hollow $SiO_2$ tube, whereby Pt and Co particles are formed in advance, and slim $SiO_2$ particles are formed from these particles as starting points. In this method, Pt and Co particles coated with SiO$_2$ can be formed (hexagonal column is not formed). In this case, in a similar way to the above-described second preparation method of the present invention, the carbon nanotube just needs to be formed from, as a starting point, the Co particle of the Pt and Co particles coated with SiO$_2$.

Moreover, as the above-described Pt particle pre-introduction method, a method can also be adopted, in which, at the time of forming the hexagonal column-like hollow SiO$_2$ tube of the above-described (1), H$_2$PtCl$_6$ as a type of the metal particle raw material, and the like and CTAC are added in advance in addition to Co(NO$_3$)$_3$, hydrazine (NH$_2$—NH$_2$), TEOS, TEA and NH$_3$, which are the raw materials of the above-described hexagonal column-like hollow SiO$_2$ tube, whereby Pt and Co particles are formed in advance, and the hexagonal column-like hollow SiO$_2$ tube is formed so as to perform the inclusion for these particles.

Note that, in the above-described Pt particle pre-introduction method, at the time of firing the hexagonal column-like hollow SiO$_2$ tube in an air atmosphere, such a hexagonal column is sometimes collapsed. Therefore, in a similar way to the above, as the columnar and/or tubular conductive support, the carbon nanotube may be formed according to needs from the Co particle of the Pt and Co particles, which are coated with SiO$_2$ concerned, as a starting point in a similar way to the above-described second preparation method of the present invention. In such a way, in the entireties of the obtained catalyst particles, exertion of desired characteristics can be ensured. In particular, the Pt particles as the electrode catalyst for the fuel cell are subjected to the inclusion by SiO$_2$ as the porous inorganic material, and accordingly, the elution of the Pt particles can be prevented. Moreover, a form is imparted, which has the major axis such as in the formed carbon nanotube and the hexagonal column-like hollow SiO$_2$ tube filled with the Pt particles, whereby the electron conduction in the section from the catalyst to the electrode can be ensured.

Next, the fuel cell of the present invention is characterized by including the electrode for the fuel cell, which is formed of the electrode material for the fuel cell according to the present invention, on a front surface and/or back surface of an electrolyte membrane.

Figure 8:
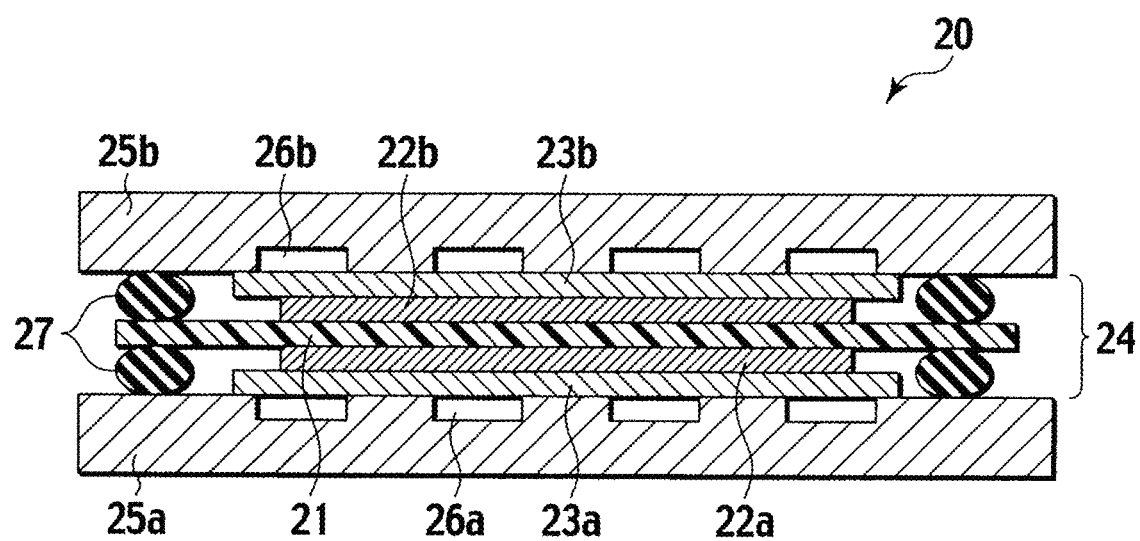
FIG. 8 is a schematic cross-sectional view schematically showing a basic configuration (single cell configuration) of the present invention.

Next, a description will be made of the fuel cell for use in the present invention by using the drawings. FIG. 8 is a schematic cross-sectional view schematically showing a basic configuration (single cell configuration) of the fuel cell of the present invention. The present invention is not limited to this.

In FIG. 8, in a fuel cell (single cell) 20, on both sides (front surface and back surface) of an electrolyte membrane 21, an anode-side catalyst layer 22a and a cathode-side catalyst layer 22b are arranged opposite to each other. The present invention is characterized in that, on at least one of these anode-side catalyst layer 22a and cathode-side catalyst layer 22b, the electrode for the fuel cell, which is formed of the electrode material for the fuel cell according to the present invention, is used. More preferably, it is desirable that the electrodes for the fuel cell, which are formed of the electrode material for the fuel cell according to the present invention, be used for both of the anode-side catalyst layer 22a and the cathode-side catalyst layer 22b.

Moreover, on both sides (outsides) of the anode-side catalyst layer 22a and the cathode-side catalyst layer 22b, an anode-side gas diffusion layer (hereinafter, the gas diffusion layer is also referred to as GDL) 23a and a cathode-side GDL 23b are arranged opposite to each other, and compose an electrode-membrane assembly (hereinafter, also referred to as MEA) 24. On both sides (outsides) of the respective GDLs 23a and 23b, anode and cathode separators 25a and 25b are arranged. In insides of the separators 25a and 25b, gas flow passages (grooves) 26a and 26b are provided, respectively. Through the gas flow passages (grooves) 26a and 26b, hydrogen-containing gas (for example, H$_2$ gas and the like) and oxygen-containing gas (for example, the air and the like) are supplied to the catalyst layers 22a and 22b through the anode-side and cathode-side GDLs 23a and 23b, respectively. Moreover, in order to prevent the gas from leaking to the outside, gaskets 27 are individually arranged between outer circumferential regions of the electrolyte membrane 21 and the separators 25a and 25b.

A description will be made below of the fuel cell of the present invention for each of constituents.

(A) Electrolyte Membrane 21

The electrolyte membrane 21 usable for the fuel cell according to the present invention just needs to have high proton conductivity. As the membrane having the high proton conductivity, there can be used: a membrane composed of a publicly known material such as a polymer or copolymer of monomers having ion exchange groups such as —SO$_3$H groups; or a polymer of the monomers having the ion exchange groups and other monomers. As a material of such an electrolyte membrane 21, specifically, there are mentioned: an electrolyte that is made of fluorine resin in which the entirety or a part of a polymer skeleton is fluorinated, and includes the ion exchange groups; an electrolyte that is made of aromatic hydrocarbon resin in which fluorine is not contained in the polymer skeleton, and includes the ion exchange groups; or the like.

The above-described ion exchange groups are not particularly limited, and there are mentioned: cation exchange groups such as —SO$_3$H, —COOH, —PO(OH)$_2$, —POH (OH), —SO$_2$NHSO$_2$—, and -Ph(OH) (Ph represents a phenyl group); anion exchange groups such as —NH$_2$, —NHR, —NRR', —NRR'R''$^+$, and —NH$_3^+$ (R, R' and R'' represent an alkyl group, a cycloalkyl group, aryl group, and the like); and the like.

As suitable examples of the electrolyte that is made of the above-described fluorine resin and includes the ion exchange groups, specifically, there are mentioned: a perfluorocarbon-sulfonic acid polymer such as Nafion (registered trademark, made by DuPont Corporation), Aciplex (registered trademark, made by Asahi Kasei Corporation), and Flemion (registered trademark, made by Asahi Glass Co., Ltd.); a polytrifluorostyrene sulfonic acid polymer; a perfluorocarbon phosphonic acid polymer; a trifluorostyrene sulfonic acid polymer; an ethylene tetrafluoroethylene-g-styrene sulfonic acid polymer; an ethylene-tetrafluoroethylene copolymer; a polytetrafluoroethylene-g-polystyrene sulfonic acid polymer; a polyvinylidene fluoride-g-polystyrene sulfonic acid polymer; and the like.

As suitable examples of the electrolyte that is made of the above-described aromatic hydrocarbon resin and includes the ion exchange groups, specifically, there are mentioned: a polysulfone sulfonic acid polymer; a polyetheretherketone sulfonic acid polymer; a polybenzimidazole alkylsulfonic acid polymer; a polybenzimidazole alkylphosphonic acid polymer; a crosslinked polystyrene sulfonic acid polymer; a polyethersulfone sulfonic acid polymer; and the like.

As the material of the electrolyte membrane 21, it is preferable to use electrolytes each of which is made of the above-described fluorine polymer and includes the ion exchange groups since the electrolyte concerned is excellent in chemical durability, dynamical durability and the like. Among them, there can be more preferably used Nafion (registered trademark, made by DuPont Corporation), Aciplex (registered trademark, made by Asahi Kasei Corporation), and the like.

A membrane thickness of the electrolyte membrane 21 can be decided appropriately in consideration for characteristics of the obtained fuel cell; however, is preferably 5 to 300 µm, more preferably 10 to 200 µm, and particularly preferably 15 to 150 µm. The fact that the membrane thickness of the electrolyte membrane is 5 µm or more is preferable in terms of strength at the time of membrane formation and durability at the time of fuel cell operation, and the fact that the membrane thickness is 300 µm or less is preferable in terms of output characteristics at the time of the fuel cell operation.

Note that, though a constituent member that is composed by containing an electrolyte component and is interposed between both of the anode and cathode electrodes of the fuel cell is referred to as the electrolyte membrane in the present invention, the constituent member is not limited to that name at all, and it is needless to say that, for example, even the cases where the constituent member is referred to as an electrolyte layer, an electrolyte and the like in terms of a usage purpose of the constituent member concerned in the fuel cell are sometimes incorporated in the electrolyte membrane mentioned in the present invention. The other constituents are also similar to the above, and are not limited to names thereof, and identities thereof just need to be determined with reference to usage purposes thereof.

(B) Catalyst Layer 22

The anode-side catalyst layer 22a and the cathode-side catalyst layer 22b, which are usable for the fuel cell of the present invention, are characterized in that the electrode for the fuel cell, which is formed of the electrode material for the fuel cell according to the present invention, is used for at least either one thereof. It is desirable that the electrode for the fuel cell, which is formed of the electrode material for the fuel cell according to the present invention, be used preferably for the cathode-side catalyst layer 22b, and more preferably for both of the anode-side catalyst layer 22a and the cathode-side catalyst layer 22b.

The electrode material for the fuel cell according to the present invention, which is used for forming these electrodes for the fuel cell, is as already described, and accordingly, the description thereof will be omitted here.

A thickness of the electrode (catalyst layer) for the fuel cell, which is formed by using the electrode material for the fuel cell according to the present invention, is not particularly limited; however, is preferably 0.1 to 100 µm, and more preferably 1 to 20 µm. The fact that the thickness of the catalyst layer is 0.1 µm or more is preferable since a desired power generation amount can be obtained, and the fact that the thickness is 100 µm or less is preferable since a high output can be maintained.

Moreover, a structure can also be adopted, in which the electrode for the fuel cell, which is formed by using the electrode material for the fuel cell according to the present invention, is used only for either one of the anode-side catalyst layer 22a and the cathode-side catalyst layer 22b, and a catalyst layer conventionally known in public is used for the other. The catalyst layer conventionally known in public in such a case is mainly composed of: an electrode catalyst composed by supporting metal particles on a conductive support; and an electrolyte (also referred to as a binder or an ionomer) having proton conductivity. These constituent members are as described above, and accordingly, the description thereof will be omitted here. Furthermore, a thickness of the catalyst layer conventionally known in public is not particularly limited, either, and can be set within a similar thickness range to that of the electrode (catalyst layer) for the fuel cell, which is formed by using the electrode material for the fuel cell according to the present invention.

(C) Gas Diffusion Layer (GDL) 23

The gas diffusion layers (also simply referred to as GDLs) 23a and 23b may be included in the constituent members of the MEA 24, or may be constituent members of the fuel cell 20, which are other than those of the MEA 24. The GDLs 23a and 23b are not particularly limited; however, there are mentioned porous base members including, as base members, sheet-like materials having conductivity and porosity, such as fabric, paper, felt and nonwoven fabric, which are made of carbon, and the like. Moreover, also in the GDLs 23a and 23b, in order to enhance the water repellency and to prevent a flooding phenomenon in a similar way to the catalyst layers 22a and 22b, by using publicly known means, the above-described GDLs 23a and 23b may be subjected to the water-repellent treatment, or layers composed of carbon particle aggregates may be formed on the above-described GDLs 23a and 23b.

In a polymer electrolyte fuel cell having a configuration of the MEA of the present invention, it is desirable that thicknesses of the catalyst layers 22, the GDLs 23 and the electrolyte membrane 21 be thinner in order to enhance diffusibility of the fuel gas, and the like; however, a sufficient electrode output cannot be obtained when the thicknesses are too thin. Hence, the thicknesses just need to be appropriately decided so that an MEA 24, and further a polymer electrolyte fuel cell, which have desired characteristics, can be obtained.

(D) Separator 25

The anode and cathode separators 25a and 25b are not particularly limited, and those conventionally known in public can be used, which are those made of carbon, such as carbon paper, carbon cloth, dense carbon graphite, and a carbon plate, those made of metal such as stainless steel, and the like. Moreover, the above-described separators 25a and 25b are those having a function to separate the air and the fuel gas, and it is desirable that the gas flow passages (grooves) 26a and 26b processed into a desired shape be formed therein in order to ensure flow passages of the air and the fuel gas. For forming the separators 25a and 25b and the gas flow passage grooves 26a and 26b, technologies conventionally known in public can be used appropriately. A thickness and size of the separators 25a and 25b, shapes of the gas flow passage grooves 26a and 26b, and the like are not particularly limited, and just need to be appropriately decided in consideration for the output characteristics of the obtained fuel cell, and the like.

(E) Gasket 27

The above-described gaskets 27 just need to be impermeable to gas, and particularly to oxygen and hydrogen gases; however, in general, just need to be composed of single impermeable portions such as O-rings composed of gas-impermeable material. Moreover, according to needs, the gaskets 27 may have complex configurations such as gas seal tapes attached with adhesives, which are composed by providing adhesive joints provided for the purpose of adhering the gaskets 27 onto edges of the electrolyte membrane 21 and the oxygen electrode and fuel electrode catalyst layers 22a and 22b. Materials composing the impermeable members of the O-rings and the gas seal tapes are not particularly limited as long as they exhibit impermeability to the oxygen and hydrogen gases in a state where a predetermined pressure is applied thereto after the gaskets 27 are placed.

Among the materials composing the impermeable portions as described above, as materials composing the O-rings, for example, there are mentioned: rubber materials such as fluorine rubber, silicon rubber, ethylene propylene rubber (EPDM), and polyisobutylene rubber; a fluorine polymer material such as polytetrafluoroethylene (PTFE), polyvinylidene fluoride (PVDF), polyhexafluoropropylene, tetrafluoroethylene-hexafluoropropylene copolymer (FEP); thermoplastic resin such as polyolefin and polyester; and the like.

Meanwhile, as materials composing the impermeable portions of the gas seal tapes and the like, for example, there are mentioned polyethylene naphthalate (PEN), polyethylene terephthalate (PET), polytetrafluoroethylene (PTFE), polyvinylidene fluoride (PVDF), and the like. Moreover, materials composing the adhesive joints of the gas seal tapes and the like are not particularly limited as long as they can intimately adhere the gaskets 27 onto the electrolyte membrane 21 and the oxygen electrode and fuel electrode catalyst layers 22a and 22b. As these materials, there can be used: hot melt adhesives such as polyolefin, polypropylene, and thermoplastic elastomer; an acrylic adhesive; olefin adhesives such as polyester and polyolefin; and the like.

A forming method of the above-described gaskets 27 is not particularly limited, and publicly known methods can be used. For example, a method can be used, in which the above-described adhesive is applied on the electrolyte membrane 21, or on the electrolyte membrane 21 while coating the edges of the catalyst layers 22 so that a thickness thereof can be 5 to 30 μm, thereafter the gas impermeable materials as described above are applied on the adhesive so that a thickness thereof can be 10 to 200 μm, and an obtained resultant is cured by being heated at 25 to 150° C. for 10 seconds to 10 minutes. Alternatively, a method may be used, in which the gas impermeable materials are molded in advance into a sheet shape, thereafter the adhesive is applied on such impermeable membranes to form the gaskets 27, and the obtained gaskets 27 are pasted onto the electrolyte membrane 21, or onto the electrolyte membrane 21 while partially coating the gaskets 27. In this case, though a thickness of the impermeable portions is not particularly limited, it is preferable that the thickness be 15 to 40 μm. Moreover, though a thickness of the adhesive portions is not particularly limited, it is preferable that the thickness be 10 to 25 μm.

As the above-described gaskets 27, those commercially available may be purchased and used. Those commercially available, which are defined to also include such ordered and specially ordered articles as manufactured by a manufacturer in response to specifications (dimension, shape, material, characteristics and the like) of a purchaser's side.

In the fuel cell having the configuration of the MEA 24 of the present invention, it is desirable that the thicknesses of the catalyst layer 22, the GDLs 23 and the electrolyte membrane 21 be thinner in order to enhance the diffusibility of the fuel gas, and the like; however, a sufficient electrode output cannot be obtained when the thicknesses are too thin. Hence, the thicknesses just need to be appropriately decided so that the MEA having desired characteristics can be obtained.

Moreover, in the fuel cell of the present invention, the MEA 24 can be fabricated in such a manner that the above-described catalyst layers 22 are placed in the inside, the GDLs 23 are placed in the outside, the electrolyte membrane 21 is used, the electrolyte membrane 21 is sandwiched by the catalyst layers 22 from both sides, and hot press is appropriately performed therefor.

As conditions of such hot press, it is desirable to set appropriate temperature and pressure. Specifically, it is desirable to perform heating at 130 to 200° C., preferably 140 to 160° C., and to perform the hot press with 1 MPa to 5 MPa, preferably 2 MPa to 4 MPa for 1 to 10 minutes, preferably 3 to 7 minutes. When such a hot press temperature is 130° C. or more, it is observed that the membrane is softened, and it is easy to bond the constituents of the MEA to one another. Meanwhile, when the hot press temperature is 200° C. or less, decomposition of the membrane can be prevented. Moreover, when such a hot press pressure is 1 MPa or more, it is easy to bond the constituents of the MEA to one another. Meanwhile, when the hot press pressure is 5 MPa or less, malfunctions such as perforation of the membrane can be prevented. Furthermore, when such a hot press time is 1 minute or more, it is easy to bond the constituents of the MEA to one another. Meanwhile, when the hot press time is 10 minutes or less, malfunctions such as the perforation of the membrane can be prevented. Moreover, with regard to an atmosphere at the time of the hot press, it is desirable to perform the hot press in an atmosphere that does not affect the MEA, and it is desirable to perform the hot press in an atmosphere of nitrogen or the like.

Moreover, a manufacturing method of the fuel cell of the present invention is not particularly limited, and the fuel cell can be assembled by using manufacturing technologies conventionally known in public.

EXAMPLES

Next, a description will be specifically made of the present invention by taking examples; however, these examples do not limit the present invention at all. Note that, in the descriptions of the first preparation method and the second preparation method, which are the typical embodiments of the production method of the electrode material, and particularly of the catalyst particles of the present invention, the description has been already made of the present invention by specifically taking the examples. Therefore, since the electrode material composed by the first preparation method including the step (1') of performing affinity treatment for the surfaces of the conductive support becomes the best mode in which the elution prevention performance for the metal particles (Pt) and the best power generation performance can be made compatible with each other, a description will be made here of performance evaluation results of electrodes using production methods and electrode materials thereby obtained, with which such a first preparation method is concerned.

Example 1

(1) Step of Forming a Columnar and/or Tubular Conductive Support Using a Co—MgO Catalyst First, a Co—MgO catalyst was prepared by the citric acid method. Next, the ethylene ($C_2H_4$) decomposition reaction was performed for the Co—MgO catalyst at 700° C. for 30 minutes, and a CNT was synthesized. As post treatment, metal (Co—MgO) was removed by acid treatment using hydrochloric acid, followed by drying at 200° C., whereby CNTs with a diameter of 30 nm were obtained. At this stage, it was confirmed whether or not the CNT was synthesized and the Co—MgO was removed by means of a transmission electron microscope (TEM) (refer to FIG. 3A and FIG. 3B, which are described above).

(1') Step of Performing Affinity Treatment for Surfaces of the Above-Described Formed Conductive Support The CNTs obtained in the above-described step (1) were immersed into hot mixed acid heated to 55° C., and were treated (boiled) for 2 hours. In such a way, hydroxyl groups or carboxyl groups were introduced onto the surfaces of the conductive support (CNT).

(2) Step of Arranging Metal Particles on the Above-Described Conductive Support (CNT) Subjected to the Affinity Treatment A brief concept of preparation in the following steps (2) and (3) is shown in FIG. 11.

The CNT subjected to the affinity treatment, which is obtained in the above-descried step (1') (referred to as an affinity CNT, and written as a CNT in FIG. 11), was dispersed into acetone by ultrasonic treatment/stirring. To a solution thus obtained, there was added a predetermined amount (6000 mass parts with respect to 100 mass parts of the CNT) of a platinochloride aqueous solution (concentration: 0.1 M), followed by drying at 80° C., whereby platinochloride was supported on the CNT (written as Pt precursor/CNT in FIG. 11). A sample thus obtained was put into a $NaBH_4$ aqueous solution, was reduced at room temperature, and thereafter was dried up one more time. In such a way, as shown in FIG. 11, a CNT on which Pt particles with a diameter of approximately 10 nm were supported (fixed) in a highly dispersed state (also referred to as a Pt-supported CNT, written as Pt/CNT in FIG. 11) was obtained. At this stage, it was confirmed whether or not a desired Pt-supported CNT was formed by performing observation by means of the transmission electron microscope (TEM) (refer to FIG. 4A and FIG. 4B, which are described above).

(3) Step of Performing Inclusion, by a Porous Inorganic Material, for the Conductive Support (CNT) on which the Above-Described Metal Particles are Arranged Next, the sample (Pt-supported CNT) obtained in the above-described step (2) was dispersed into a water/ethanol mixed solution (water:ethanol=1:1 (volumetric mixing ratio)) held at 60° C. in a warm bath. Then, to a resultant solution, ethyl silicate (TEOS) of which weight parts were 300 with respect to 100 weight parts of the CNT was added, and a hydrolysis/polymerization reaction was performed for an obtained mixture for 1 hour. In such a way, a catalyst precursor in which Pt/CNT surfaces were coated with silica (written as $SiO_2$/Pt/CNT in FIG. 11) was obtained. In order to remove unreacted TEOS, the sample thus obtained was filtered and was sufficiently washed by acetone, followed by drying for one night in a thermostatic bath of 60° C. The catalyst precursor concerned was fired at 500° C. for 2 hours in an argon atmosphere, and thereafter was immersed into aqua regia, whereby platinum that was not coated was removed. After such aqua regia treatment, hydrogen reduction at 500° C. for 2 hours was performed one more time for the treated catalyst precursor in a flow of hydrogen/argon, whereby a catalyst was formed. In such a way, desired catalyst particles (written as coat-I in FIG. 11), in which the Pt particles supported on the CNT and the CNT that supported the Pt particles thereon were subjected to the inclusion by $SiO_2$, were obtained. It was confirmed that the desired catalyst particles were formed by observing the obtained catalyst particles by means of the transmission electron microscope (TEM) (refer to FIG. 18). Moreover, with regard to the obtained catalyst particles, a composition thereof was measured by using fluorescent X-ray and thermogravimetric analyses, and an average particle diameter of the PT particles was measured by using the transmission electron microscope. Obtained results are shown in the following Table 1. Furthermore, a thickness of such an inclusion (coating) layer of $SiO_2$ was measured by using the transmission electron microscope, and as a result, the thickness was approximately 10 to 20 nm.

Example 2

(1) Step of Forming a Columnar and/or Tubular Conductive Support Using a Co—MgO Catalyst and (1') Step of Performing Affinity Treatment for Surfaces of the Above-Described Conductive Support (CNT)

In a similar way to the steps (1) and (1') of Example 1, a CNT subjected to the affinity treatment (simply written as a CNT in FIG. 12) was obtained.

(2) Step of Arranging Metal Particles on the Above-Described Conductive Support (CNT) Subjected to the Affinity Treatment and Step of Performing Inclusion, for the Conductive Support on which the Above-Described Metal Particles are Arranged A brief concept of preparation in the following steps (2) and (3) is shown in FIG. 12.

The affinity CNT was dispersed into water by ultrasonic treatment/stirring at room temperature. To a solution thus obtained, there was added a predetermined amount (6000 mass parts with respect to 100 mass parts of the CNT) of a platinochloride aqueous solution (concentration: 0.1 M), and a resultant solution was stirred well for approximately 1 hour. Ammonia water was added to this solution, whereby a hydroxide of platinum was formed on the CNT (written as Pt hydroxide/CNT in FIG. 12). After a sample thus obtained was stirred for 2 hours while keeping the sample as it was, the sample was taken out after unreacted platinochloride is sucked and filtered for removal thereof. Thereafter, the sample was dispersed one more time into an ammonia aqueous solution. A container containing a resultant solution was moved into a warm bath of 60° C., and the solution was stirred for 30 minutes. Thereafter, aminopropyltriethoxysilane (APTS) of which weight pars were 100 with respect to 100 mass parts of the CNT was added to the solution concerned (refer to the concept view of FIG. 12, in which the CNT was coated with the APTS). Moreover, after elapse of 30 minutes, TEOS of which weight parts was 450 with respect to 100 mass parts of the CNT was added to the solution, and an obtained mixture was subjected to a hydrolysis/polymerization reaction for 1 hour while being radically stirred. In such a way, a catalyst precursor (written as $SiO_2$/Pt hydroxide/CNT in FIG. 12), in which the surface of the Pt hydroxide/CNT was coated with silica, was obtained. Thereafter, the sample was taken out by centrifugal separation, and was dried for one night in a warm bath of 60° C. The catalyst precursor concerned was fired at 350° C. for 3 hours in an argon atmosphere, was thereafter subjected to aqua regia treatment similar to that of Example 1, and was subjected to hydrogen reduction one more time at 350° C. for 3 hours in a flow of hydrogen/argon, whereby a catalyst was formed. In such a way, desired catalyst particles (written as coat-II in FIG. 12), in which Pt particles and the CNT that supports the Pt particles thereon were subjected to the inclusion by $SiO_2$, were obtained. It was confirmed whether or not the desired catalyst particles were formed by observing the obtained catalyst particles by means of the transmission electron microscope (TEM) (refer to FIG. 19). Moreover, with regard to the obtained catalyst particles, a composition thereof was measured by using fluorescent X-ray and thermogravimetric analyses, and an average particle diameter of the PT particles was measured by using the transmission electron microscope. Obtained results are shown in the following Table 1. Furthermore, a thickness of such an inclusion (coating) layer of $SiO_2$ was measured by using the transmission electron microscope, and as a result, the thickness was approximately 2 to 5 nm.

Comparative Example 1

Commercially available catalyst particles (made by TKK Company Limited; article name: TEC10E10A; those in which Pt particles are supported on a particulate carbon black support (average particle diameter: 100 nm)), were used. The catalyst particles concerned have a composition and average particle diameter of the Pt particles, which are shown in the following Table 1.

Example 3

In the following, a description will be made of Example 3 while taking a specific example where Ketjen Black (Ketjen Black EC made by Ketjen Black International Company Ltd.; BET specific surface area: 800 $m^2/g$) was used as a conductive support, and Pt was supported as metal particles on the Ketjen Black; however, the present invention is not limited to these.

First, in this step, the Ketjen Black was dispersed in a mixed solution in which platinochloride (solution containing metal particles), water and ethanol were blended in a predetermined ratio, followed by degassing treatment.

Next, ammonia water was slowly dropped as a precipitant (reducer) on a resultant solution, followed by stirring for 1 hour.

Washing and filtration were performed by using the above-described ammonia water. Thereafter, firing was performed in He gas at 350° C. for 3 hours, whereby such Pt particles were able to be supported (arranged) on the Ketjen Black in a highly dispersed state. In such a way, the Ketjen Black on which the Pt particles were supported (also referred to as Pt-supported Ketjen Black) was able to be obtained. At this stage, it is desirable to confirm whether or not desired Pt-supported Ketjen Black is formed by observing the Ketjen Black by means of the transmission electron microscope (TEM).

Subsequently, a description will be made of Example 3 by using an example of performing inclusion (coating), by $SiO_2$ as a porous inorganic material, for the Pt-supported Ketjen Black obtained in the above-described step; however, the present invention is not limited to these.

First, the Pt-supported Ketjen Black obtained in the above-described step was treated with 1N—$HNO_3$aq at 80° C. for 3 hours. In such a way, this carbon black became hydrophilic.

Next, the Pt-supported Ketjen Black which became hydrophilic was dispersed into dehydrated ethanol (55° C.).

Next, 3-aminopropylethoxysilane (APTS) was slowly dropped onto a resultant solution, followed by stirring for 30 minutes. In such a way, the APTS was selectively adsorbed to the carbon black.

Thereafter, tetraorthosiliate (TEOS), water and 1N—$HNO_3$aq were added to a resultant solution, followed by stirring for 1 hour.

Thereafter, the resultant was subjected to the alcohol washing and centrifugal separation, followed by vacuum drying, and was thereafter fired at 350° C. for 3 hours in Ar gas, whereby desired catalyst particles were obtained. It is desirable to confirm whether or not the desired catalyst particles are formed by observing the finally obtained catalyst particles by means of the transmission electron microscope (TEM).

A test for Pt elution durability was performed in a similar way to Example 1.

Example 4

Example 4 was made to conform to Example 3 except that Ketjen Black (Ketjen Black EC600JD made by Ketjen Black International Company Ltd.; BET specific surface area: 1270 $m^2/g$) was used as the carbon black.

Example 5

Example 5 was made to conform to Example 3 except that Black Pearl (Black Pearl 2000 made by Cabot Corporation; BET specific surface area: 2000 $m^2/g$) was used as the carbon black.

Example 6

Example 6 was made to conform to Example 3 except that Vulcan (Vulcan XC-72 made by Cabot Corporation; BET specific surface area: 280 $m^2/g$) was used as the carbon black.

Example 7

Example 7 was made to conform to Example 3 except that acetylene black (acetylene black made by Denki Kagaku Kogyo Kabushiki Kaisha; BET specific surface area: 80 $m^2/g$) was used as the carbon black.

Example 8

Example 8 was made to conform to Example 3 except that acetylene black (acetylene black made by Denki Kagaku Kogyo Kabushiki Kaisha; BET specific surface area: 250 $m^2/g$) was used as the carbon black.

Example 9

Example 9 was made to conform to Example 3 except that acetylene black (acetylene black made by Denki Kagaku Kogyo Kabushiki Kaisha; BET specific surface area: 850 $m^2/g$) was used as the carbon black.

Example 10

Example 10 was made to conform to Example 3 except that Ketjen Black (BET specific surface area: 150 $m^2/g$) subjected to graphitization treatment was used in place of the carbon black.

An average interplanar spacing $d_{002}$ of a [002] plane of the Ketjen Black subjected to the graphitization treatment, which was calculated from X-ray diffraction, ranged from 3.45 to 3.55.

Example 11

Example 11 was made to conform to Example 3 except that a carbon nanohorn (BET specific surface area: 300 $m^2/g$) as a tubular and columnar conductive support was used in place of the carbon black as a spherical conductive support. An average interplanar spacing $d_{002}$ of a [002] plane of the carbon nanohorn, which was calculated from the X-ray diffraction, ranged from 3.40 to 3.53.

TABLE 1

Composition of Catalyst Particles and Average Particle Diameter of Pt Particles

| | Composition (wt %) [*1] | | | Pt/(Pt + C) (%) | Average particle diameter of Pt particles (nm) | Power generation performance mV @0.1 Acm$^{-2}$ | ECA decreasing rate % after 2k cycl. |
|---|---|---|---|---|---|---|---|
| | Pt | SiO$_2$ | C | | | | |
| Example 1 | 2.4 | 81.3 | 15.9 | 13.1 | 5 | 200 | <1 |
| Example 2 | 2.4 | 81.3 | 15.9 | 13.1 | 1.5 | 320 | <1 |
| Comparative example 1 | 8.8 | — | 91.2 | 8.8 | 1.5 | | 61 |
| Example 3 | 7.5 | 36.4 | 57.8 | 9.1 | 1.3 | | <1 |
| Example 4 | 8.3 | 45.9 | 45.8 | 15.3 | 1.4 | | <1 |
| Example 5 | 12.9 | 54.6 | 32.5 | 28.4 | 1.3 | | <1 |
| Example 6 | 5.8 | 36.4 | 57.8 | 9.1 | 1.5 | | <1 |
| Example 7 | 3.7 | 67.2 | 29.1 | 11.2 | 1.5 | | <1 |
| Example 8 | 5.4 | 59.1 | 35.5 | 13.2 | 1.5 | | <1 |
| Example 9 | 8.7 | 46.2 | 45.1 | 16.2 | 1.2 | | <1 |
| Example 10 | 3.6 | 75.3 | 21.1 | 14.6 | 1.9 | | <1 |
| Example 11 | 4.4 | 70.4 | 25.2 | 14.9 | 1.4 | | <1 |

[*1] Both residues of compositions of Examples 1 and 2 in Table 1 were 0.4 wt % of Co.

<Fabrication of Membrane-Electrode Assembly (MEA)>

Anode and cathode electrodes were obtained by applying catalyst paste on pieces of carbon paper and drying the paste. A Nafion membrane was sandwiched by the pieces of the carbon paper attached with the catalyst, and these constituents were bonded to one another by hot press, whereby a membrane-electrode assembly (MEA) was fabricated. A procedure of such fabrication is as follows.

1) A predetermined amount (0.04 g) of each catalyst was weighed. For cathode catalysts, the catalyst particles obtained in Examples 1 to 11 and Comparative example 1 were individually used. Moreover, for all of anode catalysts, the catalyst particles obtained in Comparative example 1 were used.

2) Each weighed catalyst was mixed with 3.2 ml of a mixed solution in which a mass ratio of butyl acetate, a 5 wt % Nafion solution and ion exchange water was 5:10:1, whereby the catalyst paste was prepared.

3) On the pieces of the carbon paper, the catalyst pastes were applied so that an applied amount thereof could be 0.008 g/cm$^2$, followed by drying at 60° C. for one night, whereby the pieces of the carbon paper attached with the catalysts were fabricated.

4) The Nafion membrane (Nafion 117) was sandwiched by the pieces of the carbon paper attached with the catalysts, and these constituents were bonded to one another by performing the hot press therefor with 10 MPa at 130° C. for 3 minutes, whereby a desired membrane-electrode assembly (MEA) was fabricated.

<Fabrication of Polymer Electrolyte Fuel Cell (PEFC) Single Cell>

Figure 13:
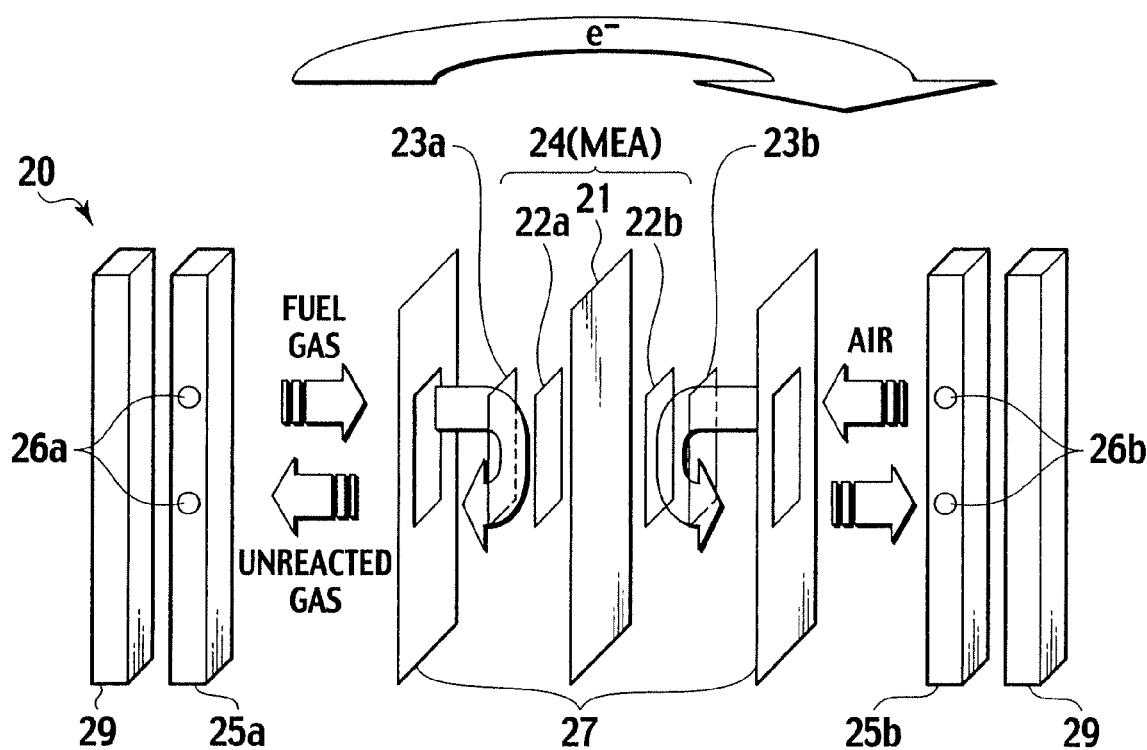
FIG. 13 is a development view schematically showing a structure of a PEFC single cell for use in examples.
Figure 14:
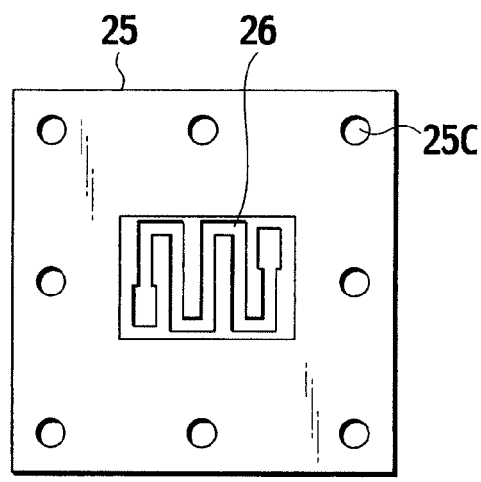
FIG. 14 is a plan view showing a gas flow passage of the PEFC single cell for use in the examples.

For the PEFC single cell, a PEFC single cell made by ElectroChem, Inc. was used. Structure and gas flow passage views of the PEFC single cell are shown in FIG. 13 and FIG. 14, respectively. As shown in FIG. 13, the MEA previously prepared was mounted on the PEFC single cell, and a power generation test was performed. An electrode area is 5 cm$^2$, and a flow pattern of a gas flow passage is a serpentine flow as shown in FIG. 14. Note that, in FIG. 14, holes 25c for fastening bolts are formed on peripheral edge portions of the separators 25.

<Power Generation Test Method>

(Measurement of I-V Curve by Using PEFC Cell)

Figure 15:
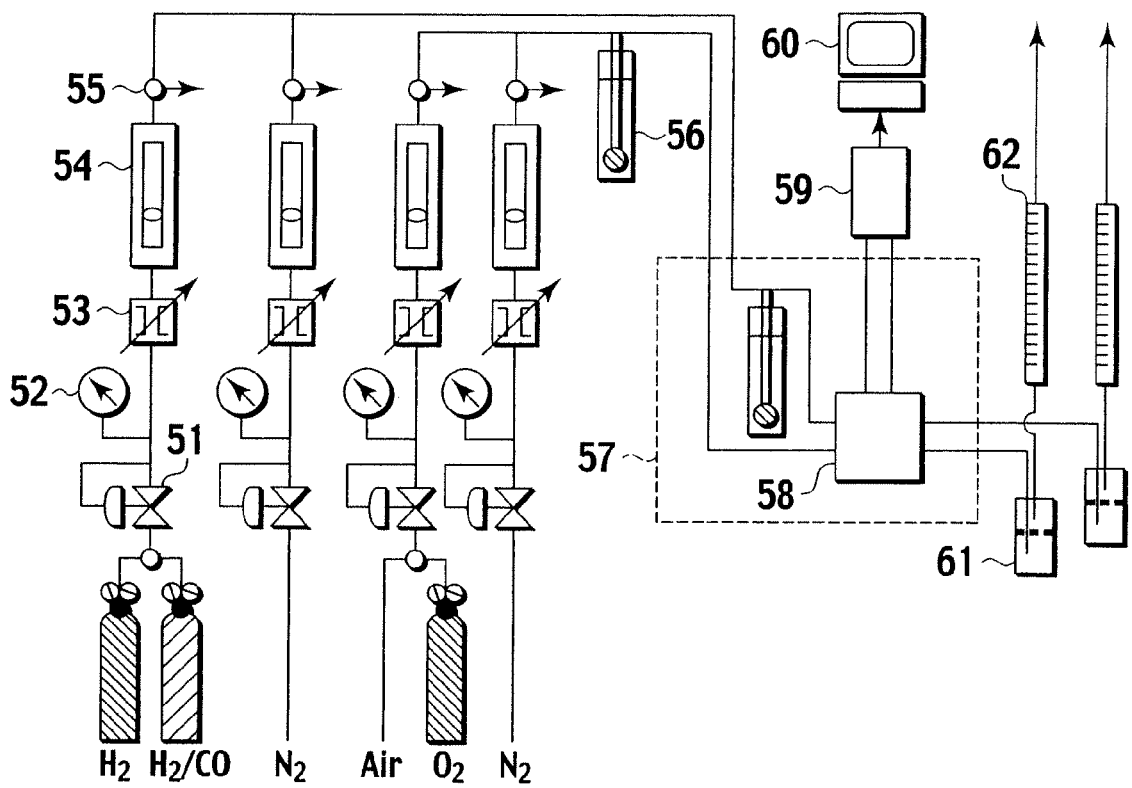
FIG. 15 is a view of equipment for use in a measurement of an I-V curve by using the PEFC cell.

An I-V curve was measured in the PEFC single cell obtained by the above-described fabrication method in order to investigate power generation characteristics and durability in the case of using, for the cathode catalyst, each of the Pt catalysts (coat-I, coat-II), which were subjected to the inclusion (coating) by silica and were prepared in Examples 1 and 2, and the catalyst of Comparative example 1 for comparison. A view of equipment for use in this measurement is shown in FIG. 15. This equipment includes pressure regulation valves 51, pressure gauges 52, mass flow rate controllers 53, mass flow rate meters 54, three-way valves 55, a gas washing bottle 56, a thermostatic bath 57, a PEFC cell 58, a potentiostat 59, a personal computer 60, water traps 61, soap film flow meters 62. Moreover, conditions at the time of such an I-V measurement are as follows.

[Conditions at the Time of the I-V Measurement]
Anode gas: hydrogen 0.2 MPa (gauge) 25 ml/min
Cathode gas: air 0.2 MPa (gauge) 28 ml/min
Cell temperature: 80° C.
Bubbling temperature: anode 80° C./cathode room temperature

[Cycle Test Conditions]
Anode gas: hydrogen 0.2 MPa (gauge) 25 ml/min
Cathode gas: nitrogen 0.2 MPa (gauge) 28 ml/min
Potential scanning range: 0.05 V to 1.2 V (vs RHE)
Potential scanning speed: 50 mV/s at the CV measurement time 500 mV/s at the cycle time Results of the power generation performance, which were obtained in the power generation tests for Examples 1 and 2, were summarized in Table 1 described above.

Figure 20:
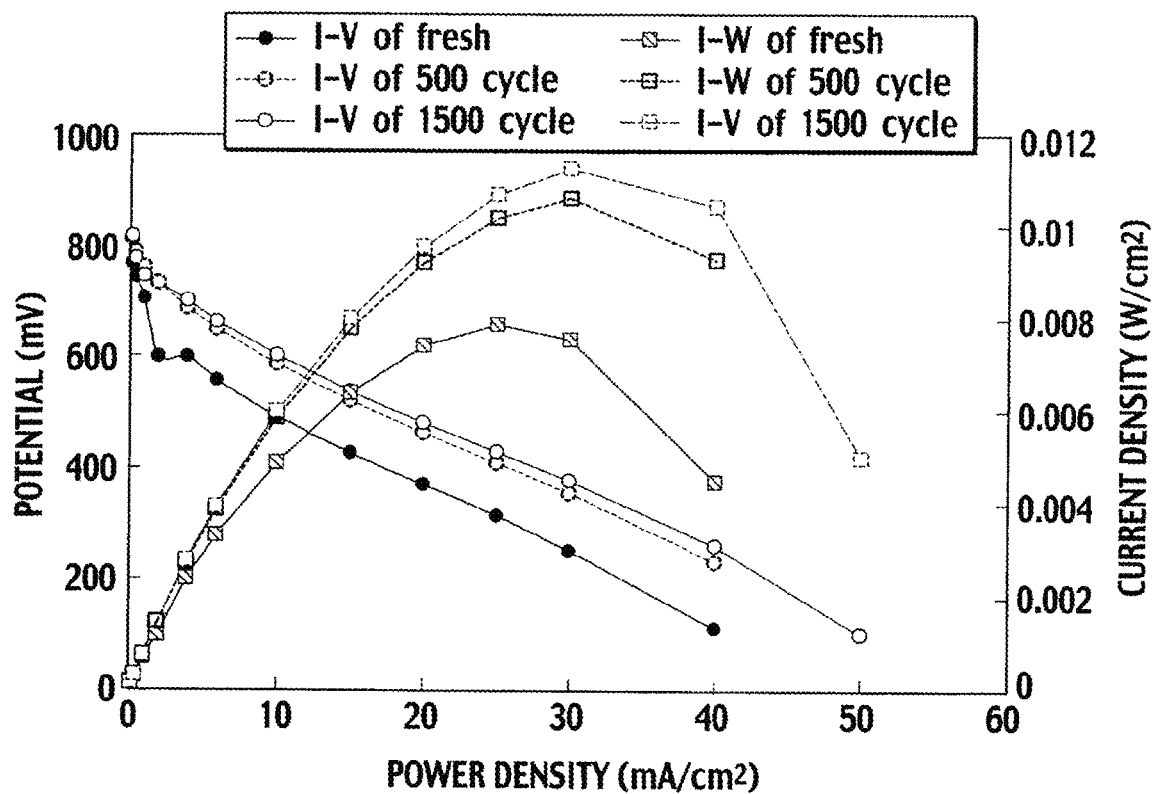
FIG. 20 is a graph showing I-V characteristics in a case of using, as a cathode catalyst, a silica-inclusion (coating) Pt catalyst (coat-I) prepared in Example 1.
Figure 21:
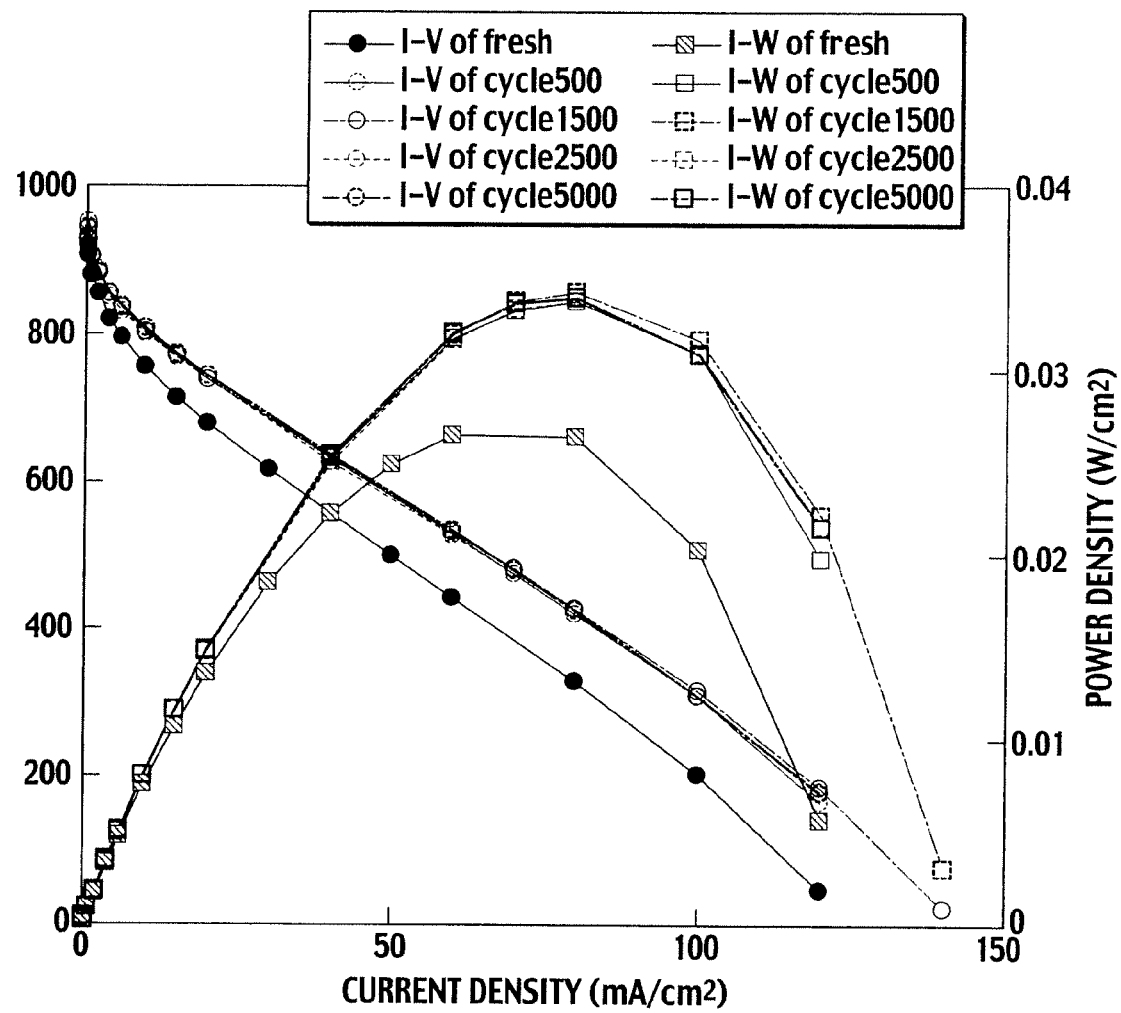
FIG. 21 is a graph showing I-V characteristics in a case of using, as the cathode catalyst, a silica-inclusion (coating) Pt catalyst (coat-I) prepared in Example 2.

Moreover, among the obtained I-V measurement results, power generation characteristics in the case of using, as the cathode catalyst, the silica-inclusion (coating) Pt catalyst (coat-I) prepared in Example 1 are shown in FIG. 20, and power generation characteristics in the case of using, as the cathode catalyst, the silica-inclusion (coat) Pt catalyst (coat-I) prepared in Example 2 are shown in FIG. 21.

From FIG. 20 and FIG. 21, it was able to be confirmed that, even if the number of power generation cycles was increased, no large change was recognized in the I-V characteristics among 500 to 5000 cycles, and Examples 1 and 2 had stable power generation performance and durability. It was understood that, in particular, the current was able to be more highly densified in Example 2 using the silica-inclusion (coat) Pt catalyst prepared at the firing temperature of 350° C.

<Pt Elution Durability Evaluation Test>

(CV Measurement by Three-Electrode Cell)

Figure 16:
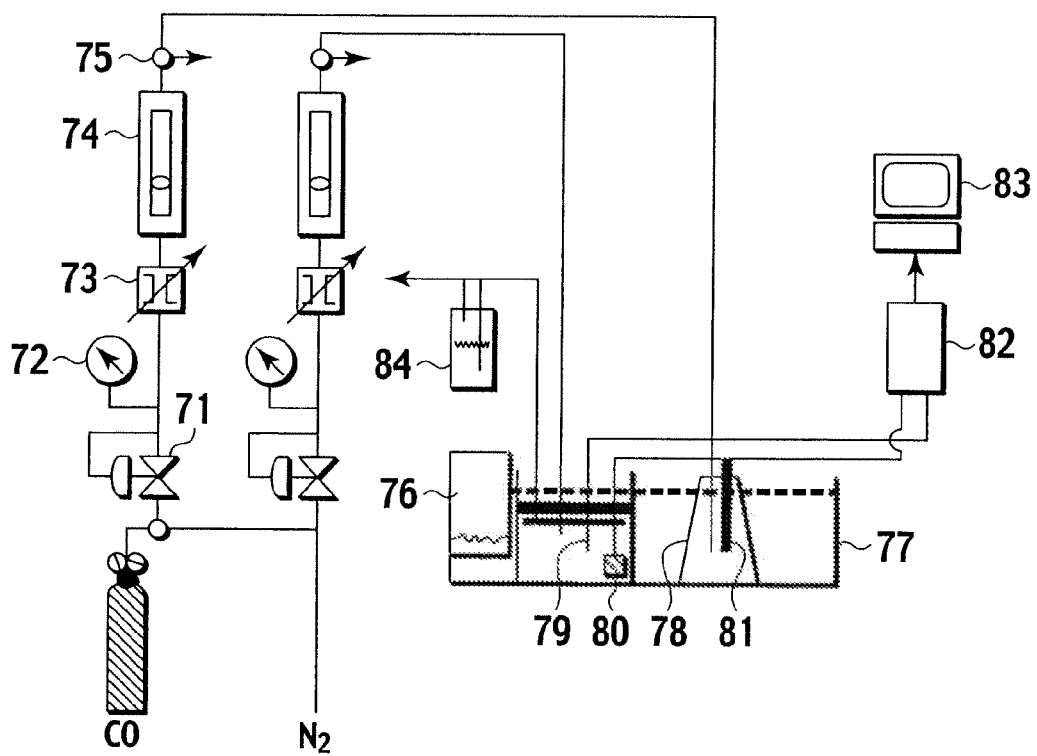
FIG. 16 is a schematic view of entire equipment (potentiostat HZ5000A made by Hokuto Denko Corporation) for use in a CV measurement by means of a three-electrode cell.

In order to clarify the electrode activities of the silica-inclusion (coat) Pt catalysts (coat-I, coat-II) prepared in Examples 1 to 11, a CV (cyclic voltamograph) measurement was performed by means of a three-electrode cell. As measurement equipment, a potentiostat HZ5000A made by Hokuto Denko Corporation was used. A schematic view of the entire equipment is shown in FIG. 16. This equipment includes pressure regulation valves 71, pressure gauges 72, mass flow rate controllers 73, mass flow rate meters 74, three-way valves 75, a thermostatic bath 76, a thermostatic bath 77, a three-necked flask 78, a working electrode 79, an opposite electrode 80, a reference electrode 81, a potentiostat 82, a personal computer 83, and a water trap 84.

A fabrication method of the electrodes for the CV measurement by means of the three-electrode cell is as follows. The unfired silica-coat Pt catalysts (catalyst precursors before being fired in the step (3) in Examples 1 to 11) and the catalyst particles of Comparative example 1 for comparison, which were dispersed into methanol, were dropped on polished/washed glassy carbon, and were dried at 333 K. Thereafter, a mixed solution of a 5 wt % Nafion solution and methanol was dropped on obtained resultants, followed by drying, whereby such working electrodes were formed. A 0.5 M-$H_2SO_4$ solution was used as the electrolyte solution, a Pt mesh was used as the opposite electrode, and an Ag/AgCl electrode was used as the reference electrode. In order to remove dissolved oxygen in the electrolyte (electrolytic) solution, bubbling was performed by $N_2$ for 40 min., and thereafter potential scanning was repeated 50 times, whereby the electrode catalysts were stabilized, and then this measurement was performed. The measurement was performed at 333 K, at a scanning speed of 50 mVs$^{-1}$, and within a scanning range of 0.05 V to 1.2 V vs. RHE.

Figure 17:
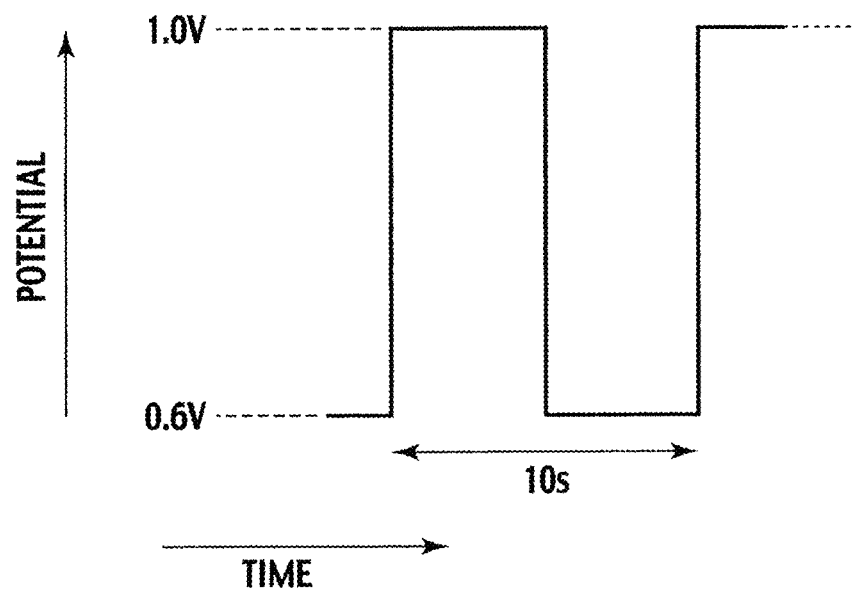
FIG. 17 is a schematic view showing a potential waveform cycle (potential profile) applied in a potential cycle test by an electrochemical cell for use in the examples.

Specifically, cyclic voltammetry was performed at 50 mVs$^1$ within the range of 0.05 V to 1.2V, and an ECA as an electrochemical surface area of each catalyst was calculated from a hydrogen adsorption wave. Next, as shown in FIG. 17, potential cycles of a rectangular wave, in each of which 0.6 V was held for 5 seconds and 1.0 V was held for 5 seconds, were applied to each obtained sample. The cyclic voltammetry was performed every 400 cycles, and the ECAs were calculated. These rectangular wave cycles were performed 2000 cycles in total, and a change of the ECAs and an eluted amount of catalyst species were investigated. Note that such an "ECA" is an electrochemical surface area of platinum as the catalyst, which is measured in a potential range of 0.4 to 0.05 V by a cyclic voltammetry method. Specifically, the ECA is a calculated value of a specific surface area (m$^2$/g) of platinum that has adsorbed hydrogen per unit platinum mass.

[Test Conditions]
   Electrolyte: 0.5 M $H_2SO_4$ aqueous solution
   Applied waveform: rectangular wave (refer to FIG. 17)
   Cycle: 10 s/cycle (refer to FIG. 17)
   Potential: 0.6 to 1.0 V vs. RHE
   Measurement temperature: 30° C.

In a potential range from 0.6 V to 0.85 V, Pt is likely to be ionized, and to be eluted as Pt ions. Accordingly, the test conditions, and in particular the potential, was decided so as to include this range from 0.6 V to 0.85 V.

From results of an experiment described above, ECA decreasing rates of Examples 1 to 11 and Comparative example 1 after elapse of 2000 (=2K) cycles were summarized in Table 1 described above. In Examples 1 to 11, the ECA decreasing rates were less than 1% (<1%) as described in Table 1 described above.

Figure 22:
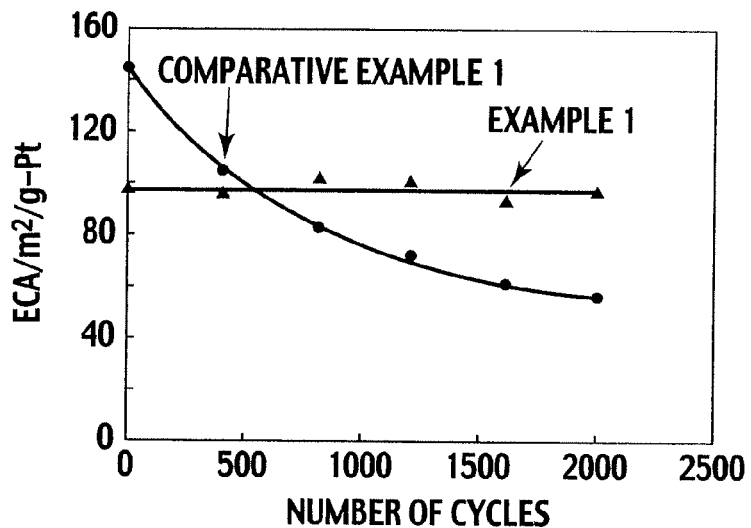
FIG. 22 is a graph showing states of ECA changes of sample electrodes created by using the catalyst particles of Example 1 and Comparative example 1.
Figure 23:
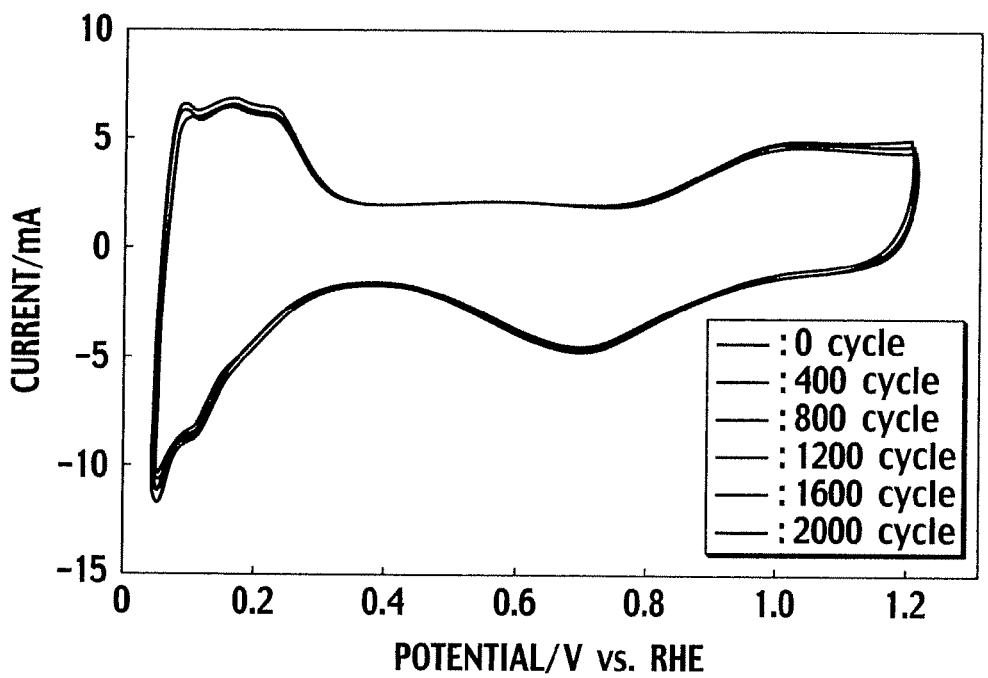
FIG. 23 is a graph showing states of CV (cyclic voltammograph) changes of the sample electrode created by using the catalyst particles of Example 1.
Figure 24:
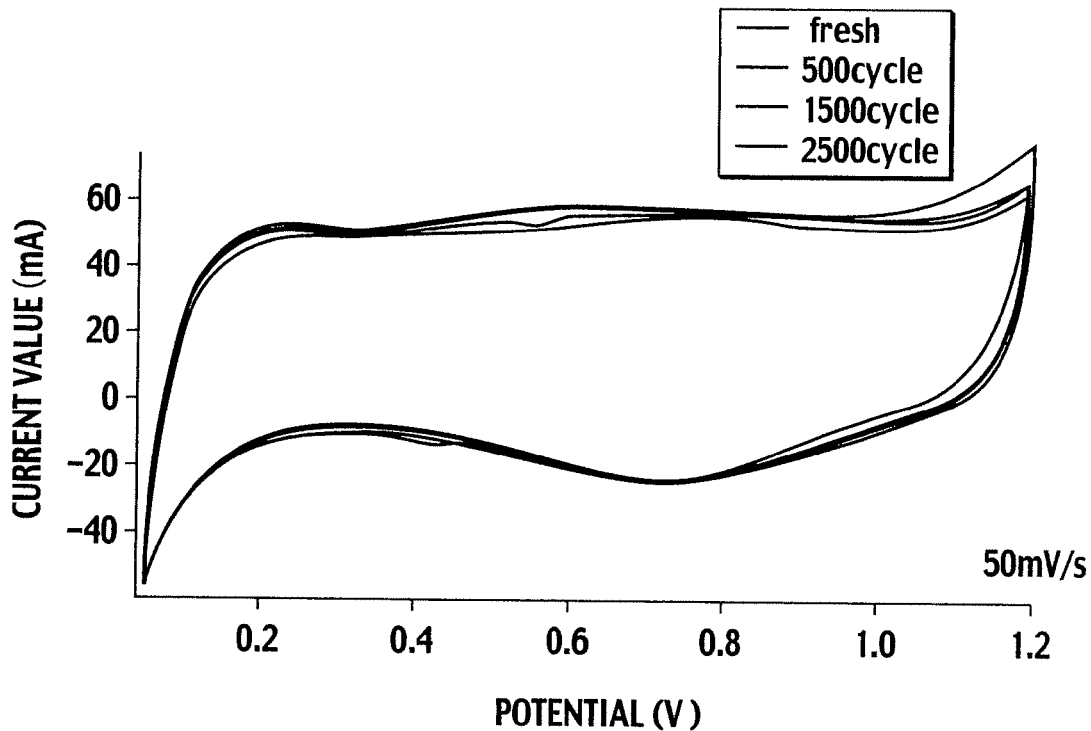
FIG. 24 is a graph showing states of CV changes of a sample electrode created by using the catalyst particles of Example 2.

Moreover, a state of the ECA change is shown in FIG. 22 from the above-described results of the experiment. Furthermore, among the above-described results of the experiment, a state of the CV change of the working electrode fabricated by using the unfired silica-coat Pt catalyst of Example 1 is shown in FIG. 23. In a similar way, a state of the CV change of the working electrode fabricated by using the unfired silica-coat Pt catalyst of Example 2 is shown in FIG. 24. In a similar way, a state of the CV change of the working electrode fabricated by using the catalyst particles of Comparative example 1 is shown in FIG. 25.

From FIG. 22, the ECA change of the working electrode fabricated by using the unfired silica-coat Pt catalyst of Example 1 was hardly observed, and it was able to be confirmed that a high ECA was maintained. On the contrary, in the working electrode fabricated by using the catalyst particles of Comparative example 1, it was able to be confirmed that the ECA change owing to the potential cycles was significant, and though the working electrode initially had a higher ECA than in Example 1, the ECA was radically decreased as the number of cycles was increased, fell down below the ECA of Example 1 when the cycles exceeded around 500, and was largely decreased also thereafter. The following was understood. As shown in FIG. 22, while the ECA decreasing rate after 2000 cycles was less than 1% in Example 1, the ECA decreasing rate in Comparative example 1 was decreased to as much as 61%.

Figure 25:
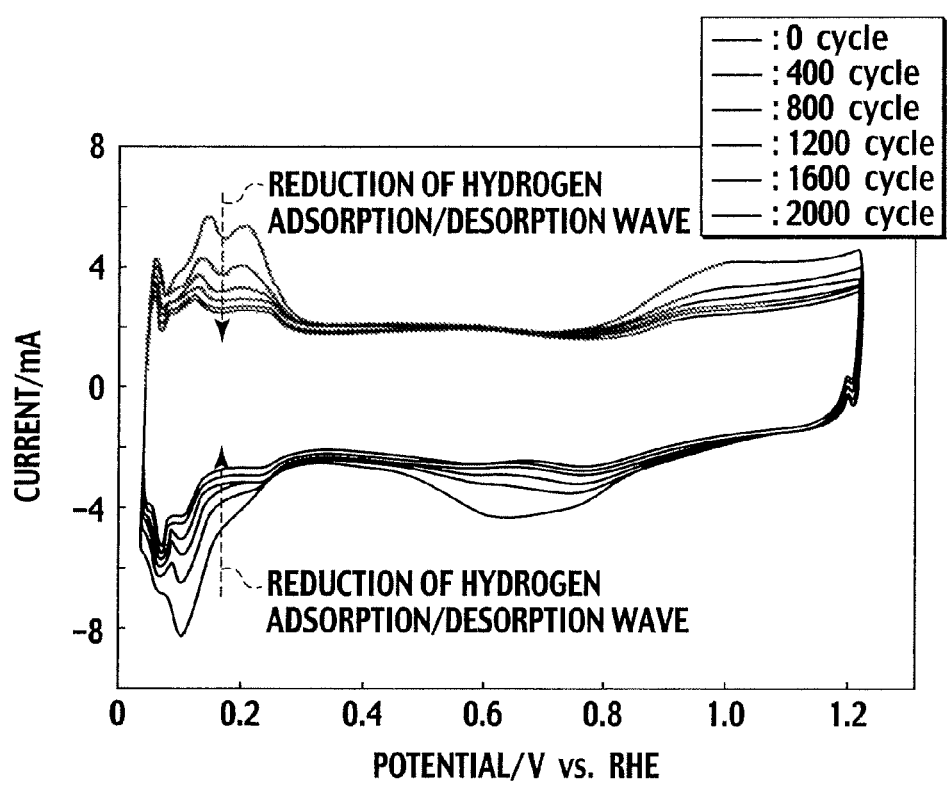
FIG. 25 is a graph showing states of CV changes of the sample electrode created by using the catalyst particles of Comparative example 1.

From FIGS. 23 to 25, in the catalyst particles of Examples 1 and 2, a change of the CV shape owing to the application of the potential cycles, that is, a reduction of the hydrogen adsorption/desorption wave was hardly observed. Also from this fact, it was able to be confirmed that the elution of the particles of the metal (Pt) hardly occurred. Meanwhile, in the catalyst particles of Comparative example 1, from FIG. 25, as shown by arrows in the graph, the change of the CV shape owing to the application of the potential cycles, that is, the reduction of the hydrogen adsorption/desorption wave was observed as the number of cycles was increased. The ECA was decreased, and from these facts, it was suggested that the elution of Pt occurred.

Moreover, from FIGS. 23 and 24, it was able to be confirmed that, in the catalyst particles of Examples 1 and 2, high ECA values were exhibited though the entire surfaces of the CNTs were subjected to the inclusion (coating) by $SiO_2$.

From the above, it was suggested that, as functions of $SiO_2$ that performed the inclusion (coating) for the surface of the CNT, $SiO_2$ had: (1) a proton conduction path function (caused by the impregnation of the electrolyte or acid points of the $SiO_2$ surface); (2) an oxygen supply function (caused by the porous structure); (3) a formed water discharge function (caused by the porous structure/hydrophilicity); and (4) an elusion suppression function (caused by the Pt particle inclusion/coating structure) for soluble metal species (Pt species). It is considered that various factors such as porosity (pore diameter, pore distribution) and a surface shape (number of acid points, type of surface functional groups) of $SiO_2$ that performs the inclusion (coating) and a thickness of $SiO_2$ that performs the inclusion (coating) contribute to the exertion of the functions.

The entire contents of Japanese Patent Application No. 2006-145929 (filed on: May 25, 2006) and Japanese Patent Application No. 2007-138371 (filed on: May 24, 2007) are incorporated herein by reference.

The description has been made above of the embodiments to which the invention made by the inventors is applied; however, the present invention is not limited to the descriptions and the drawings, which are in accordance with the embodiments and form a part of the disclosure of the present invention. It is additionally noted here that, specifically, other embodiments, examples and application technologies and the like, which are made by those skilled in the art and the like based on the above-described embodiments, are naturally incorporated in the scope of the present invention.

The invention claimed is:

1. An electrode material, comprising:
    catalyst particles, each comprising:
        a conductive support which has electron conductivity, and is columnar or tubular;
        metal particles which are supported on a side surface of the columnar or tubular conductive support; and
        a porous inorganic material which coats and contacts both of the metal particles and the surface of the conductive support,
        wherein portions of the conductive supports of the catalyst particles, which are not coated with the porous inorganic material, are brought into contact with one another in order to form an electrically-conductive network.

2. The electrode material according to claim 1, wherein the metal particles comprise Pt, Rh, Pd, Au or Ir, or any combination thereof.

3. The electrode material according to claim 1, wherein the porous inorganic material comprises silica ($SiO_2$), zirconia ($ZrO_2$) or titania ($TiO_2$), or any combination thereof.

4. The electrode material according to claim 1, wherein an average pore diameter of the porous inorganic material is 1 to 100 nm.

5. The electrode material according to claim 1, wherein the conductive support comprises any one of a carbon nanotube, a carbon nanohorn, or a carbon fibril.

6. The electrode material according to claim 1, wherein a combination of the metal particles and the porous inorganic material that coats the metal particles is any combination of: Pt and $SiO_2$; Pd and $SiO_2$ or a titania-silica composite oxide; Rh and $SiO_2$ or $ZrO_2$; or Au and $SiO_2$.

7. The electrode material according to claim 1, wherein the metal particles comprise any one of platinum, gold, iridium, rhodium, palladium, tungsten, lead, iron, nickel, manganese, vanadium, molybdenum, gallium, aluminum or lithium.

8. The electrode material according to claim 1, wherein an average particle diameter of the metal particles is 1 to 30 nm.

9. The electrode material according to claim 1, wherein a supported amount of the metal particles is 10 to 80 mass % with respect to a total amount of the catalyst particles.

10. The electrode material according to claim 1, wherein a ratio (L1/L2) of a major-axis length (L1) and a minor-axis length (L2) of the conductive support is 2 to 50 times, and
    the major-axis length (L1) of the conductive support is 10 nm or more.

11. The electrode material according to claim 1, wherein a BET specific surface area of the conductive support is 1 to 2000 $m^2/g$.

12. The electrode material according to claim 1, wherein at least one-side end portion of the conductive support is not coated with the porous inorganic material.

13. The electrode material according to claim 1, wherein the metal particles are electrically connected to the conductive support.

14. The electrode material according to claim 1, wherein the metal particles are in contact with the side surface of the conductive support, and peripheries of the metal particles are included by the porous inorganic material.

15. The electrode material according to claim 1, wherein a content of the porous inorganic material is 10 to 90 mass % with respect to a total amount of the catalyst particles.

16. The electrode material according to claim 1, further comprising: anyone of an electrolyte having proton conductivity, or a water-repellent polymer.

17. An electrochemical cell comprising:
    an electrode formed of the electrode material according to claim 1.

* * * * *